(12) United States Patent
Glaser

(10) Patent No.: US 9,065,893 B2
(45) Date of Patent: Jun. 23, 2015

(54) CREDIT CARD FORM FACTOR SECURE MOBILE COMPUTER AND METHODS

(71) Applicant: Lawrence F. Glaser, Fairfax Station, VA (US)

(72) Inventor: Lawrence F. Glaser, Fairfax Station, VA (US)

(*) Notice: Subject to any disclaimer, the term of this patent is extended or adjusted under 35 U.S.C. 154(b) by 0 days.

(21) Appl. No.: 14/021,772

(22) Filed: Sep. 9, 2013

(65) Prior Publication Data

US 2014/0074696 A1    Mar. 13, 2014

Related U.S. Application Data

(60) Provisional application No. 61/698,529, filed on Sep. 7, 2012.

(51) Int. Cl.
| | |
|---|---|
| *G06K 19/06* | (2006.01) |
| *H04M 1/02* | (2006.01) |
| *G06F 21/32* | (2013.01) |
| *G06Q 20/34* | (2012.01) |
| *G06K 19/00* | (2006.01) |

(52) U.S. Cl.
CPC ............ *H04M 1/0266* (2013.01); *G06F 21/32* (2013.01); *G06Q 20/34* (2013.01); *G06Q 20/341* (2013.01); *G06Q 20/3415* (2013.01); *G06K 19/00* (2013.01); *G06K 19/06196* (2013.01)

(58) Field of Classification Search
CPC ............... G06K 19/07749; G06K 19/0775
USPC .......................... 235/497, 487, 492
See application file for complete search history.

(56) References Cited

U.S. PATENT DOCUMENTS

| | | | | |
|---|---|---|---|---|
| 5,805,098 | A * | 9/1998 | McCorkle | 342/25 F |
| 6,394,343 | B1 | 5/2002 | Berg et al. | |
| 6,828,556 | B2 * | 12/2004 | Pobanz et al. | 250/336.1 |
| 7,386,150 | B2 * | 6/2008 | Fleisher | 382/103 |
| 8,204,703 | B2 * | 6/2012 | Govil et al. | 702/64 |
| 2006/0145365 | A1 | 7/2006 | Halls et al. | |
| 2007/0175983 | A1 | 8/2007 | Klug | |
| 2008/0248191 | A1 * | 10/2008 | Daniels | 427/66 |
| 2011/0007048 | A1 | 1/2011 | Fratti et al. | |
| 2011/0140841 | A1 | 6/2011 | Bona et al. | |
| 2013/0222333 | A1 | 8/2013 | Miles et al. | |

FOREIGN PATENT DOCUMENTS

| | | |
|---|---|---|
| WO | 2010114499 A2 | 10/2010 |
| WO | 2013039395 A1 | 3/2013 |

OTHER PUBLICATIONS

International Search Report and the Written Opinion of the International Searching Authority; PCT/US2013/058653, issued on Feb. 10, 2014.
Notification of Transmittal of the International Search Report and the Written Opinion of the International Searching Authority, Or the Declaration; PCT/US2014/022190; issued on Sep. 16, 2014.

* cited by examiner

*Primary Examiner* — Daniel St Cyr
(74) *Attorney, Agent, or Firm* — Studebaker & Brackett PC

(57) ABSTRACT

A communication device is provided and includes a first major surface including a display and a mixed array. The mixed array includes at least two different types of array units and occupies an area coinciding with, in plan view as viewed perpendicular to the major surface, at least substantially the entire major surface.

25 Claims, 13 Drawing Sheets

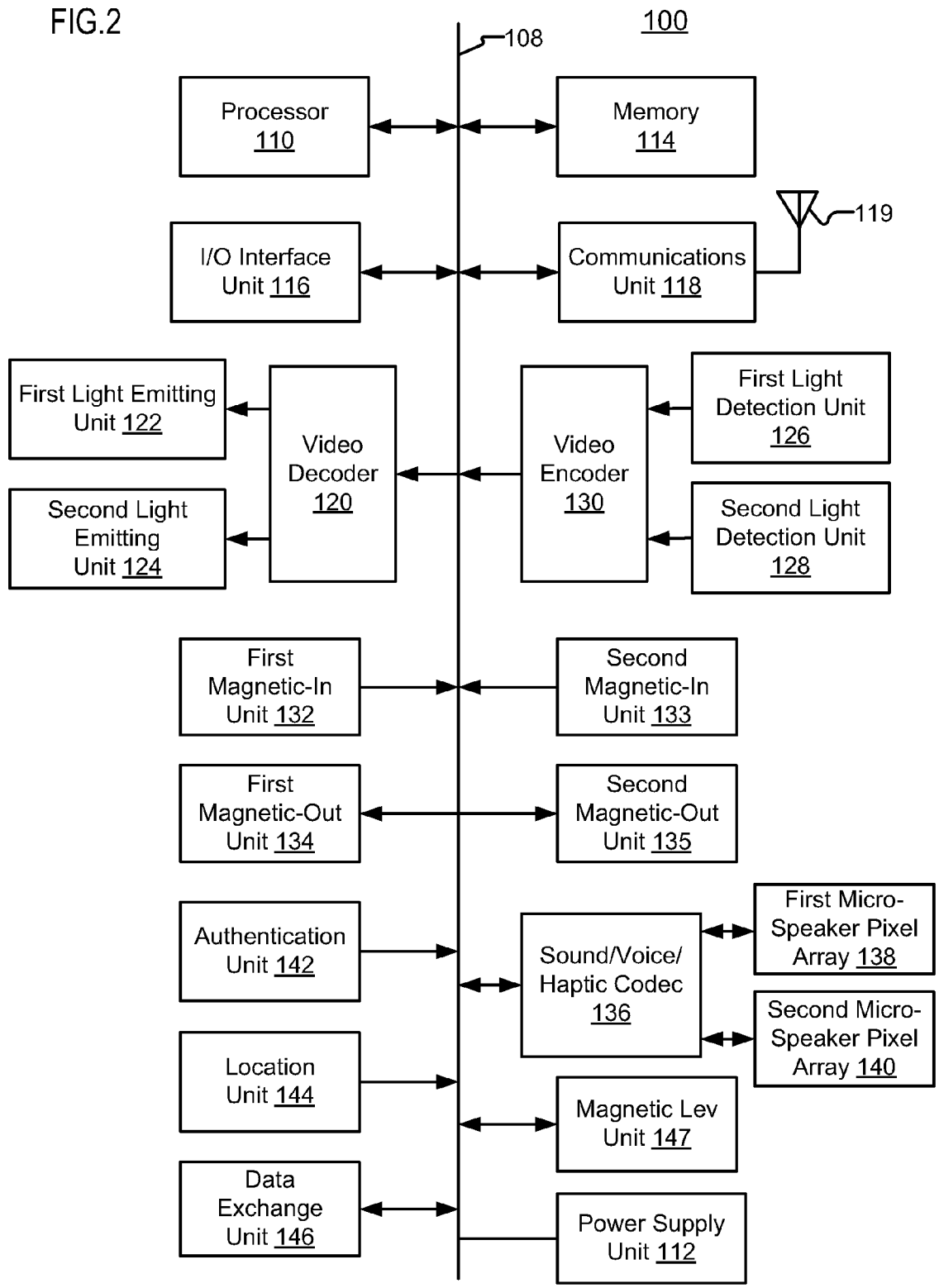

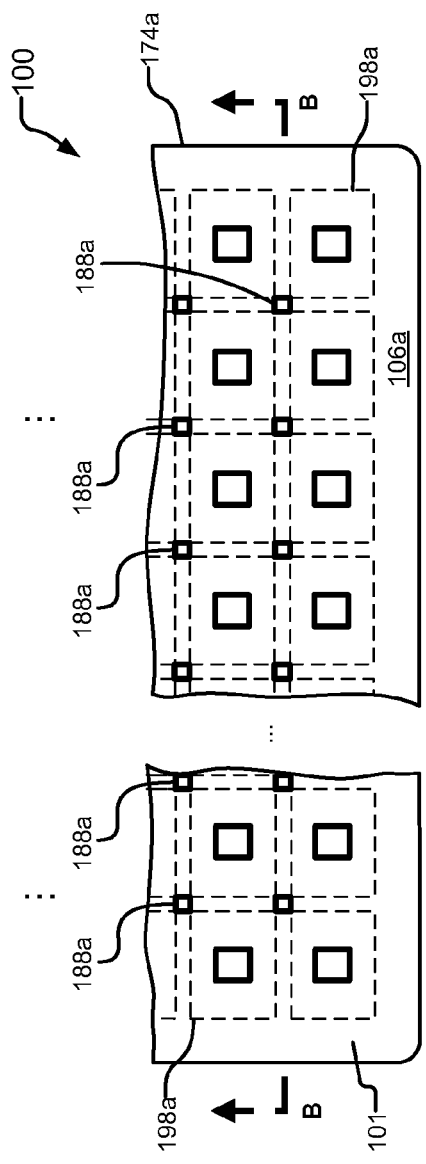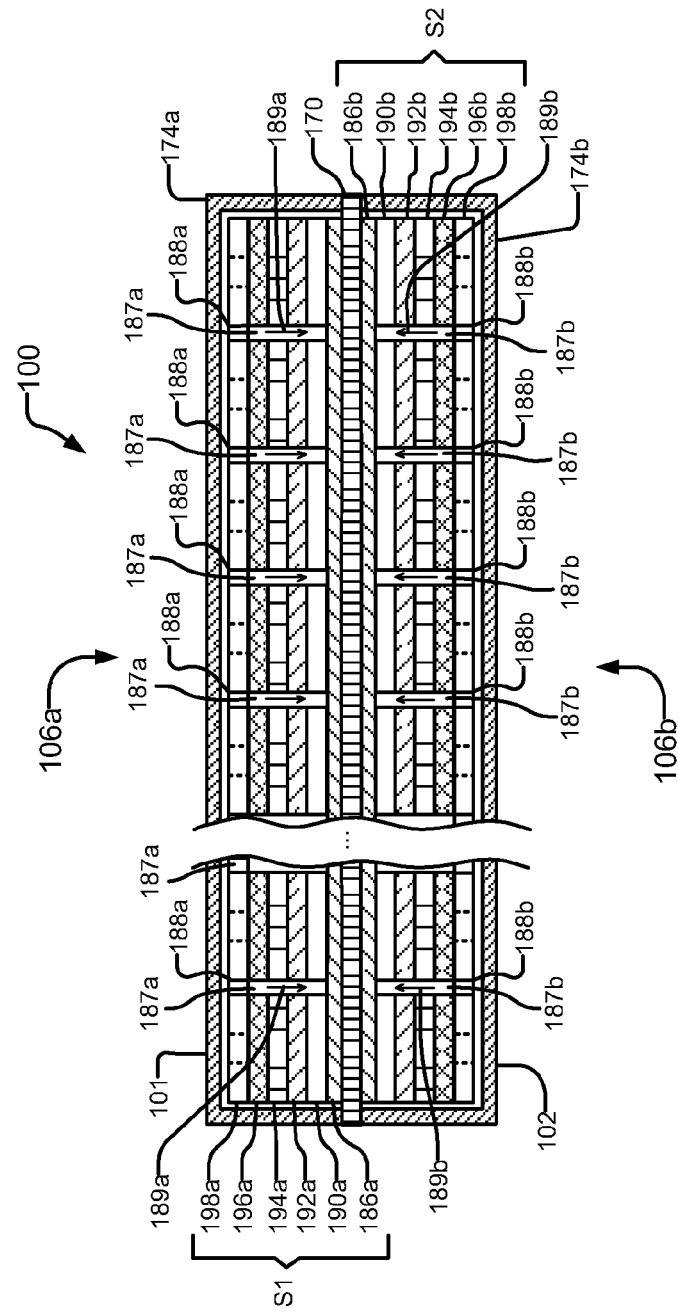

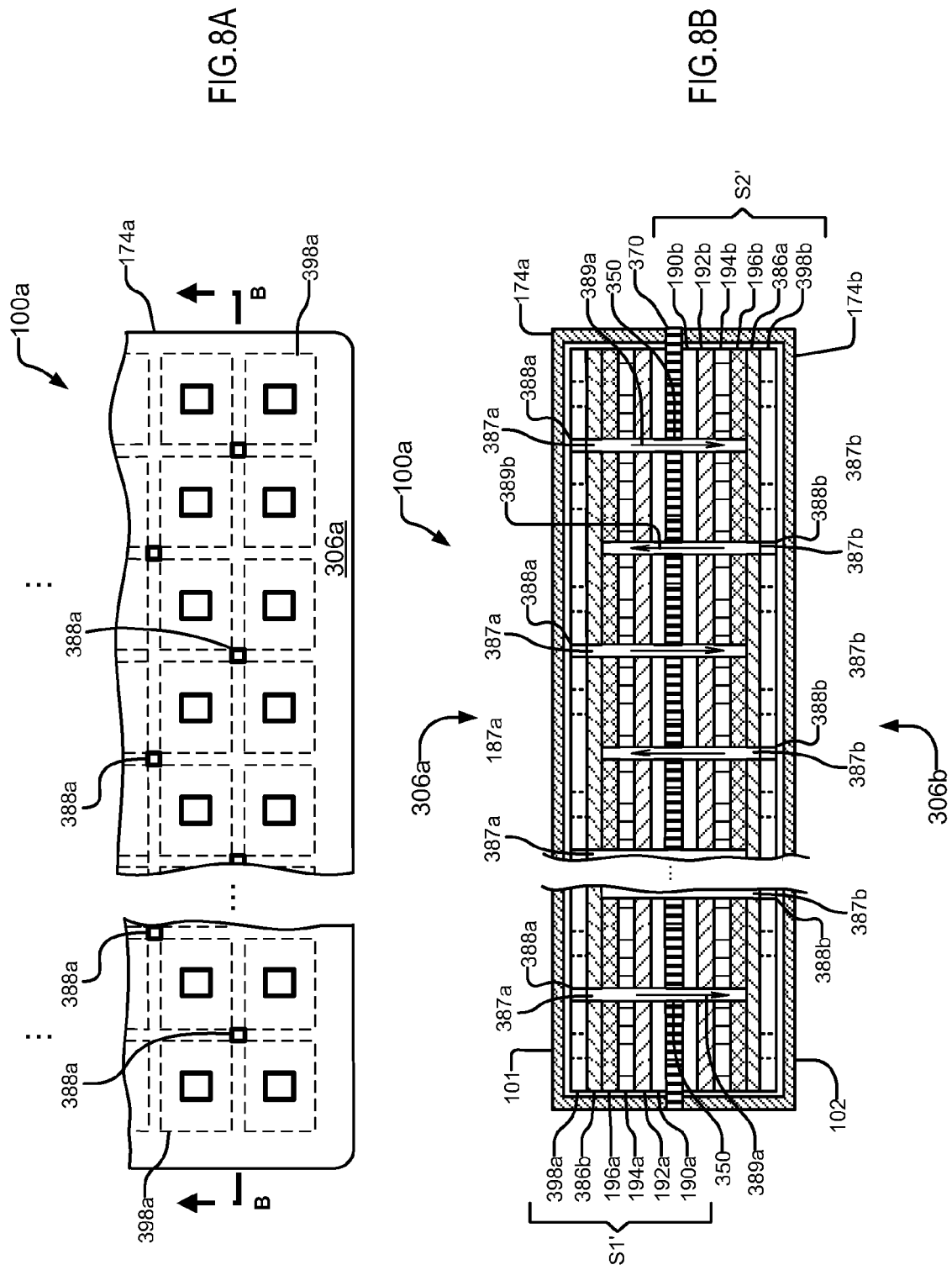

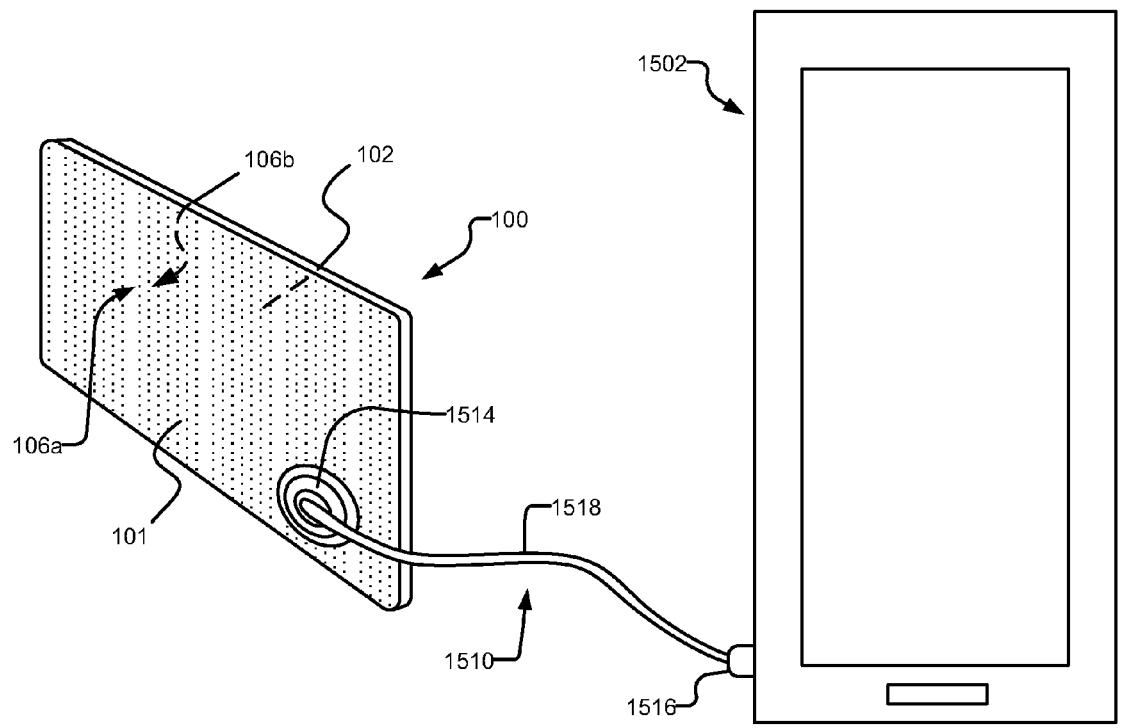
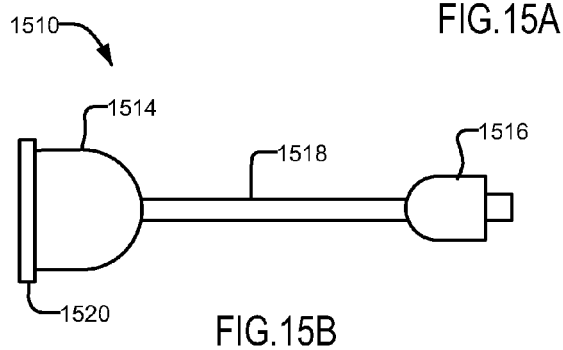
FIG.15B
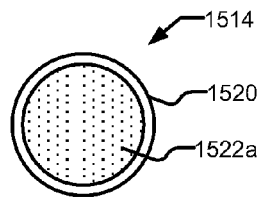
FIG.15C
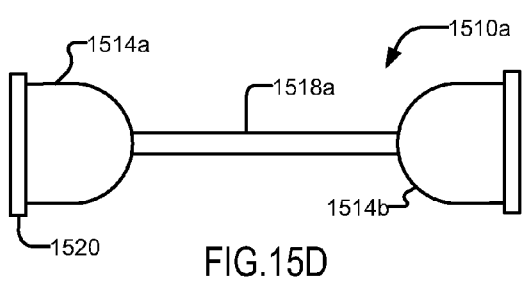
FIG.15D
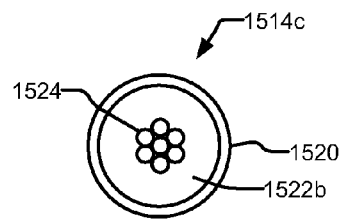
FIG.15E

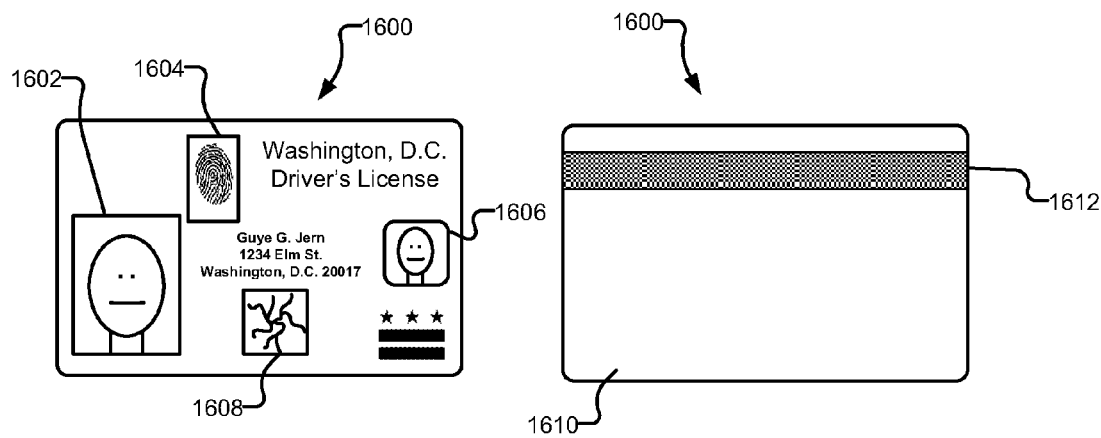
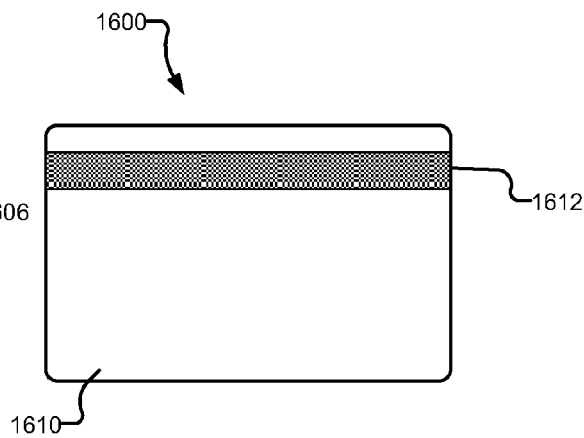
FIG.16A  FIG.16B
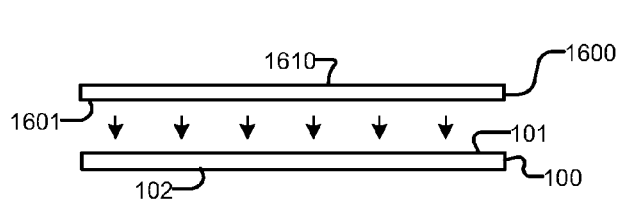
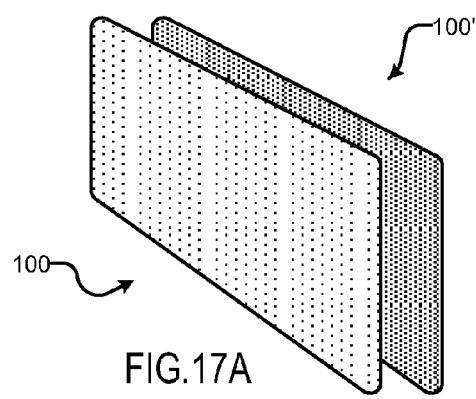
FIG.16C  FIG.17A
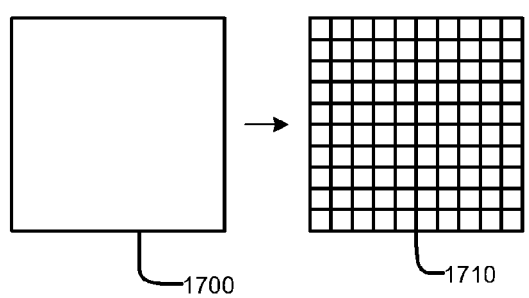
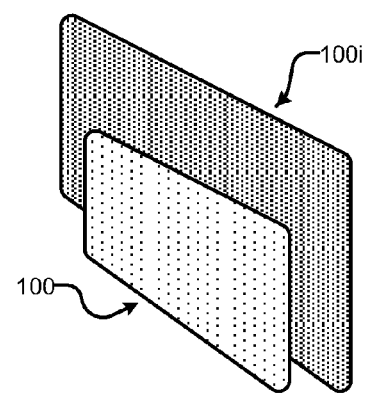
FIG.17B  FIG.17C

CREDIT CARD FORM FACTOR SECURE MOBILE COMPUTER AND METHODS

CROSS-REFERENCE TO RELATED APPLICATIONS

This application claims the benefit of U.S. Provisional Application Ser. No. 61/698,529, filed on Sep. 7, 2012, the content of which is incorporated herein by reference in its entirety.

TECHNICAL FIELD

The technical field relates to electronic devices, and more specifically to portable electronic devices that can perform identification, secure transactions, and other user oriented services.

BACKGROUND

Magnetic cards have many purposes. Examples include credit cards, debit cards, medical and insurance cards, drug payment cards, health care service cards, stored value cards, identification cards, access entry cards, and the like. Many of these cards have information stored in a magnetic stripe, for provision to a POS (point of sale) system.

At the same time, portable user devices such as smart mobile phones and wireless computers, offer a wide variety of information and communication capabilities to the user. Some portable user devices augment the use of magnetic cards by allowing, for example, the modification of information in the magnetic strip of the cards. There are also mobile devices which interface to magnetic stripe readers through the use of a card slot. Additionally, there are card readers that are completely internal to a secure facade, such as that which you typically find at an ATM (automated teller machine).

SUMMARY

In a first aspect of the disclosure, a communication device includes a major surface having a display and first mixed array including at least two different types of array units. The first mixed array occupies an area coinciding with, in plan view as viewed perpendicular to the first major surface, at least substantially the entire first major surface.

In a second aspect of the disclosure is a method of communicating between first and second communication devices. Each communication device includes a major surface including a display and a mixed array including at least two different array units, and each of the mixed arrays occupy area of the respective communication device coinciding, in plan view perpendicular to the major surfaces, with at least substantially the entire major surface. Each major surface includes at least one emitting pixel and one emission detecting pixel provided to emit and detect emission at respective angles relative a line normal to the major surfaces. Each communication device also includes at least one controllable magnetic element. The method includes magnetically levitating the second communication device over the first communication device such that the first and second communication devices are substantially aligned with one another in the plan view, controlling the at least controllable magnetic element to adjust an angular position of the second communication device such that the at least one emitting pixel of the first communication device and the at least one emission detecting pixel of the second communication device substantially align such the at least one emission detecting pixel detects emission from the at least one emitting pixel, and communicating data between the aligned at least one emission detecting pixel detects emission from the at least one emitting pixel.

In a third aspect of the present disclosure, a method of authentication uses a communication device including a major surface including a display and a mixed array including at least two different array units, each said mixed array occupying area of the respective communication device coinciding, in plan view perpendicular to the major surfaces, with at least substantially the entire major surface. The method includes sensing, using the at least two different array units, at least two types of biometric characteristics from a single target adjacent the major surface to generate biometric data related to the two characteristic types, comparing the generated data to stored biometric data, and determining whether to authenticate based on the comparison.

In a fourth aspect of the disclosure, a method of performing a transaction uses a communication device that includes a major surface including a display and a mixed array including at least two different array units, each said mixed array occupying area of the respective communication device coinciding, in plan view perpendicular to the major surfaces, with at least substantially the entire major surface. The method includes scanning, using the at least one of the two different array units, at least one item to be purchased, creating a list including data identifying each scanned item, transmitting the list to a remote computer using the communication device, finalizing the transaction based on each item on the list, wherein the transaction amount is adjusted based on a search and retrieval for best value performed by the remote computer for each item on the list.

BRIEF DESCRIPTION OF THE DRAWINGS

FIG. 2 is a diagram of a card system according to an exemplary embodiment.

FIGS. 7A and 7B are diagrams of portions of an exemplary card. FIG. 7A is a plan view of a portion of the card and FIG. 7B is a cross section view of a portion of the card taken along B-B of FIG. 7A.

FIGS. 8A and 8B are diagrams of portions of an exemplary card. FIG. 8A is a plan view of a portion of the card and FIG. 8B is a cross section view of a portion of the card taken along B-B of FIG. 8A.

FIG. 9A is a plan view of a card including embedded magnetic elements. FIG. 9B is a side view of first and second cards, where the second card is magnetically levitating over the first card. FIG. 9C is a side view of the first and second cards of FIG. 9B illustrating the first card controlling a position of the second card.

FIGS. 15A to 15E are diagrams of exemplary tethers. FIG. 15A is a diagram shows a tether connected to a communication device; FIG. 15B is a side view diagram showing details of the tether shown in FIG. 15A; FIG. 15C is a front view diagram of the head of the tether shown in FIGS. 15A and 15B; FIG. 15D is a side view diagram of another exemplary tether; and FIG. 15E is a front or rear view diagram of a tether head according to another exemplary embodiment.

FIGS. 16A and 16B are diagrams showing an exemplary legacy card. FIG. 16C is a diagram showing an exemplary legacy card being cloned on to a card according to an exemplary embodiment.

FIG. 17A is a diagram showing two cards with different pixel densities. FIG. 17B is a diagram illustrating and pixel assignment to maintain compatible communications backwards through iterations of card design. FIG. 17C is a diagram showing overlapping different sized cards according to an exemplary embodiment.

DETAILED DESCRIPTION

Figure 1:
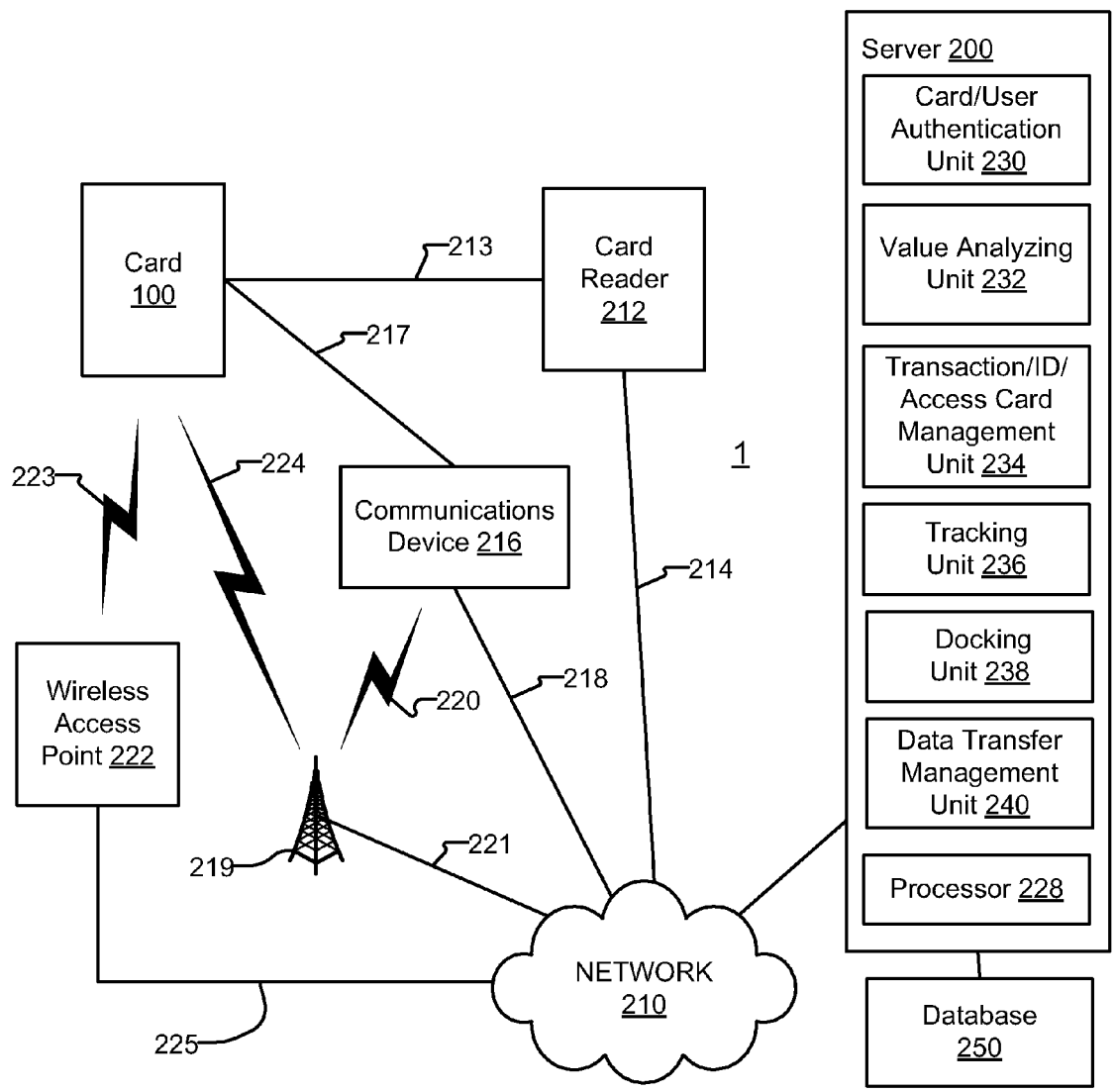
FIG. 1 is a diagram of a communication system according to an exemplary embodiment.

The inventor realized that many capabilities of portable user devices such as smart mobile phones and wireless computers, which offer a wide variety of information and communication capabilities, can be closely related to activities which also involve user devices, such as magnetic or smart cards.

In an embodiment according to the present disclosure, a system includes a seamless combination of card and mobile platform to provide a user with a network-connected secure, truly portable device that can provide information and interact with the market-place and its associated environment.

The present disclosure provides a mobile computerized platform that can conduct secure transactions by emulating a standard credit card or bank card in a manner that can transact with the embedded legacy readers, such as those used at POS or inside physically secure machines, such as an ATM. Thus, applications of a card according to the present disclosure can include legacy card readers and readers provided internally in an ATM machine, just as a bank card would be processed.

Electronic devices, as compared with plastic cards, already come with the cost of reduced resistance to environmental factors, such as impact and moisture but also exhibit sensitivity to their exposed magnetic stripe material by way of direct damage or magnetic inducted damage. By contrast, an embodiment of the present disclosure provides a card having robust resistance to such environmental factors.

A card according to the present disclosure can emit light, sense light, and collect information related to the sensed light across at least substantially the entire major planar surfaces of the card. That is, a substantial portion of the major surfaces throughout their entire extent. Sound can be provided as an energy source which can be emitted and/or collected across at least one surface of the card. In some embodiments, one or more entire major surfaces of a card can emit and sense an energy source, such as one or more of light, sound, tactile energy sources and feedback (e.g., haptic). By combining magnetic, optic, and/or aural output and input, across the major surfaces of the card, with magnetic-in and magnetic-out capability across these same surface(s) acting protected and invisibly from behind the optic and aural components, a card according to the present disclosure can scan and interact with the real world dynamically, and hence allow for a very broad set of new functionality and security for individual users, groups of users, institutions, and governments.

A card as a user device according to the present disclosure can be incorporated with other electronic devices already carried by a user in the interest of reducing the total number of such devices, if a single smart card is to gain a foothold in all possible domains including but not limited to the domain of proof of identity and POS use. For instance, a user is much more likely to accept environmental and weight savings if one benefit is to leave, for example, a cell phone, portable computing device, vehicle smart key or PDA/tablet behind, so as to be efficient in carrying only one convenient and multifunctional item.

An exemplary embodiment of a card user device will now be described with reference to the figures. Unless indicated otherwise, descriptions of elements having the same reference numbers may not be repeated for the sake of brevity.

FIG. 1 is a diagram of an exemplary system 1 in which the card 100 communicates with a server computer 200 including plural units and memory for performing the various functions of the system via a network 210, which can be a wide area network (WAN) such as the Internet, an ad hoc network, a local area network (LAN), a metropolitan network (MAN), a cellular network, a wireless wide area network (WWAN), a wireless personal area network (WPAN), and a public switched telephone network (PSTN), a terrestrial wireless network or another network or combinations thereof. Card 100 can connect to network 210 via a card reader 212, such as a credit card reader located at a POS, an ATM, secure entry device etc., via wireless connection (e.g., magnetic, electromagnetic) or wired connection 213, and from the card reader 212 to the network 210 through a wireless or wired communication channel 214. Card 100 can communicate with server 200 via a communications device 216, such as a cell phone, PDA, electronic tablet, laptop computer, desktop computer through one or more wireless or wired communication channels 217, and via communication connection 218 between communications device 216 and network 210. In an embodiment, communications device 216 can connect to network 210 and server 200 through a wireless connection 220 to an antenna 219 of a wireless network base station (e.g., Node B or eNodeB) communicating with network 210 via communications connection 221. In an embodiment, with additional energy expenditure, card 100 can connect server 200 through base station antenna 219 through wireless connection 224 without any intermediary communications device 216, or through one or more wireless repeaters. In an embodiment, card 100 can connect to server 200 via a wireless access point 222 utilizing Wi-Fi or other wireless protocol, communications connection 225, and network 210.

FIG. 2 is a diagram of exemplary system elements of card 100. As shown in FIG. 2, card 100 includes an address/data bus 108 through which system components communicate with processor or controller 110 (e.g., CPU) and are powered by power supply unit 112. System components of card 100 include memory 114, such as volatile and nonvolatile memory; an input/output (I/O) interface unit 116; a communications unit 118 and antenna 119; a video decoder 120 that decodes video data for display on a first light emitting unit 122 communicatively coupled to video decoder 120, and that decodes video data for display on a second light emitting unit 124 communicatively coupled to video decoder 120; a first light detection unit 126 and a second light detection unit 128 communicatively coupled to a video encoder 130 that encodes video data generated in the first and second light detection units 126, 128; a first magnetic-in unit 132 and a second magnetic-in unit 134 that detect magnetic fields at respective first and second major surfaces of card 100; a first magnetic-out unit 134 and a second magnetic-out unit 135 that generate magnetic fields at respective first major and second major surfaces of card 100; sound/voice/haptic encoder/decoder (codec) 136 that receives and encodes a signal including aural information generated by a first or second microphone/speaker (micro-speaker) pixel array 138, 140 and provides the encoded signal to bus 108, and decodes coded data received from bus 108 and generates a decoded signal including sound, voice or haptic information and provide the decoded signal to the first or second micro-speaker pixel array 138, 140 to thereby produce sound, reproduce voice, or provide haptic feedback; an authentication unit 142; a location unit 144; a data exchange unit 146, and a levitation/positioning controller unit, or Mag Lev unit 147 (to be described later).

Processor 110 of card 100 can include one or more processors such as at least one microprocessor, micro-controller, a central processing unit (CPU), application specific integrated circuits (ASICs), digital signal processors (DSPs), digital signal processing devices (DSPDs), programmable logic devices (PLDs), field programmable gate arrays (FPGAs), and other devices designed to perform the functions described herein, and/or by a combination of any of the above.

In an embodiment providing true N+1 redundancy, elements of the hardware design, would be provided in duplicity and cross interfaced such that the failure of any one of these elements will not result in the failure of the card 100. These elements can include and are not limited to; processors, memory, power, busses, pixels, etc. The user will not experience any interruption of service when a redundant element fails. The card will attempt to reboot its down element(s) and report the results of hardware fault recovery, resynchronize and then report the overall success or failure to the user and to the servers and operators of the overall system. With a complete redundant solution, each processor representing an independent survivable processor can be controlled with an additional element, such as a redundancy control processor, that exists to synchronize each processor to the next. Even the element which does synchronization to achieve redundancy can be duplicated and suffer a failure without disruption of service to the user. A first processor (not shown) can control mainly elements on one side of the card 100, while a second processor (not shown) can control mainly elements on the opposing side of the card 100. In the event either processor fails, both sides of the card 100 can continue to function with all services offered and uninterrupted.

Memory 114 a non-transitory machine-readable medium such as a storage medium or other storage(s) and stores instructions related to programs, routines, and other code executable by processor 110 and data structures such as encrypted user personal and financial information. Memory 114 can include random access memory (RAM), read-only memory (ROM), erasable programmable read-only memory (e.g., EPROM, EEPROM, or Flash memory), or any other tangible medium capable of storing information and combinations of the above. Memory can also include buffer memory that holds transmission data to be transmitted by the transmitter of communications unit 118 until the data is transmitted and/or data received by the receiver of the communications unit 118 until the received data can be processed. Although FIG. 2 shows memory 114 as separate or external to processor or controller 110, memory may be implemented within processor or controller 110 or another processing unit.

Many capabilities and other aspects of the card 100 and system 1 are described herein in terms of processes and sequences of processes. It is to be understood that these processes and sequences of processes can be performed by a processor or controller 110 carrying out programmed instructions, although some processes can be carried out using other hardware capable of executing programmed instructions. For example, embodiments can be implemented in hardware, software, firmware, middleware, microcode, or any combination thereof. The programmed instructions can be program code or code segments that perform necessary tasks and can be stored in memory 114. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or contents of memory 114.

Input/output (I/O) interface unit 116 can connect another device to card 100 either directly or through intervening I/O controllers (not shown). In an embodiment, I/O interface unit 116 allows communication between card 100 and other devices using optical, wireless (e.g., RF or magnetic), or wired channels. For example, an I/O interface can include a portion of the first or second light detection units 126, 128 and a respective corresponding portion of one of the first and second light emitting units 122, 124 present on the same side of card 100 and a tether including optical communication paths can be magnetically attached to the portions to exchange data via optical signals. In another embodiment, I/O interface 134 can include physical ports, such as HDMI, VGA/SVGA, 100fASE-T, IEEE 1394 (FireWire™) and/or USB type ports.

Communications unit 118 includes a transmitter and receiver that can communicate in a wireless network element via transmitting and receiving radio waves via antenna 119. Communications unit 118 and antenna 119 are configured to modulate a data signal, up-convert the modulated data signal to an RF frequency, and transmit a signal containing data information received from bus 108 via processor 110 from the antenna 119 as a radio wave over a wireless network to a remote device. Communications unit 118 and an antenna 119 are also configured to receive a radio wave containing modulated signal information transmitted from a remote device over a wireless network, down-convert the received radio wave and demodulate the down-converted modulated signal and provide the output as reproduced data transmitted from the remote device to bus 108 and processor 110.

A wireless network element can include, for example, an access point (e.g., a Wi-Fi access point), a femtocell, a cellular phone or personal communication or data device, a desktop computer, a portable computing device such as a laptop, a tablet, etc., and may allow wireless communication devices to connect to a wireless network using Wi-Fi, Bluetooth, an element such as a base station using a cellular communication technology such as Code Division Multiple Access (CDMA), Time Division Multiple Access (TDMA), Frequency Division Multiple Access (FDMA), Orthogonal Frequency Division Multiple Access (OFDMA), Single-Carrier Frequency Division Multiple Access (SC-FDMA), or another wireless technology and/or standard. A wireless network can utilize one or more technologies, for example, technologies such as Universal Mobile Telecommunications System (UTMS), Long Term Evolution (LTE), Evolution-Data Optimized or Evolution-Data only (EV-DO), Global System for Mobile communications (GSM), Worldwide Interoperability for Microwave Access (WiMAX), Code division multiple access (CDMA)-2000, or Time Division Synchronous Code Division Multiple Access (TD-SCDMA).

Figure 3A:
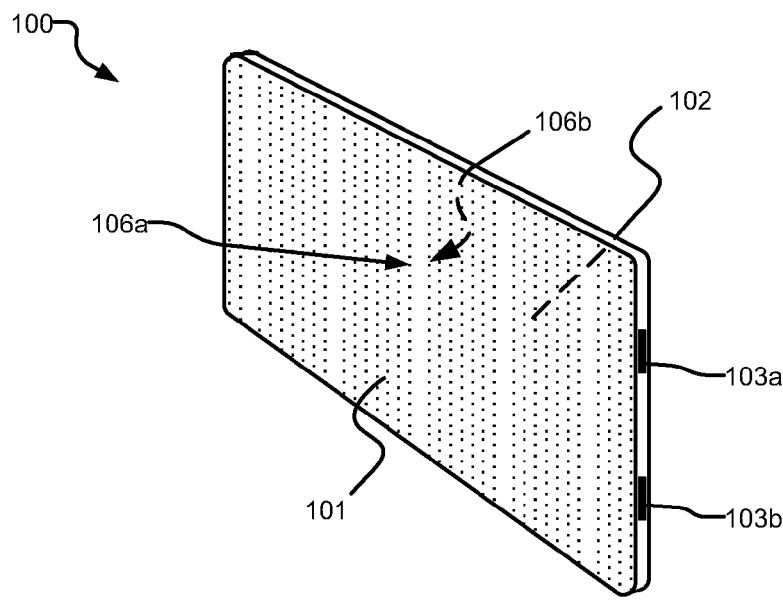
FIGS. 3A-3C respectively shows perspective, plan, and side views of a card according to an exemplary embodiment.
Figure 3B:
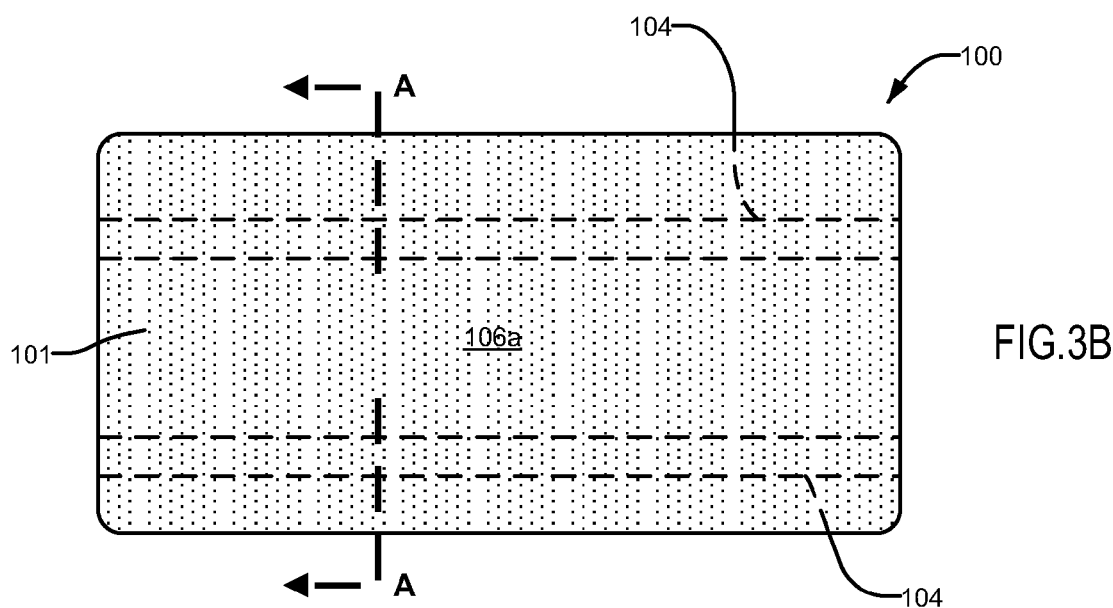
Figure 3C:
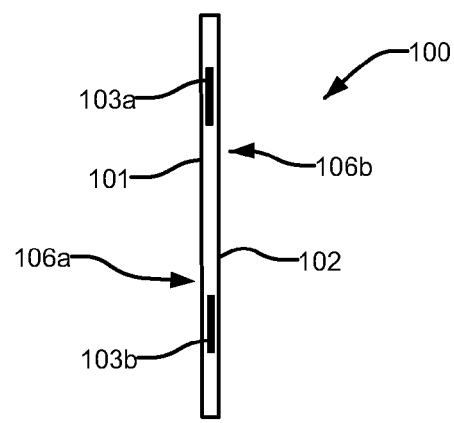
Figure 4A:
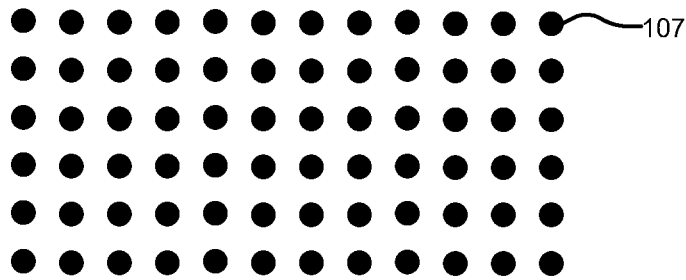
FIGS. 4A to 4D are diagrams showing exemplary pixel arrays and pixel elements.
Figure 4B:
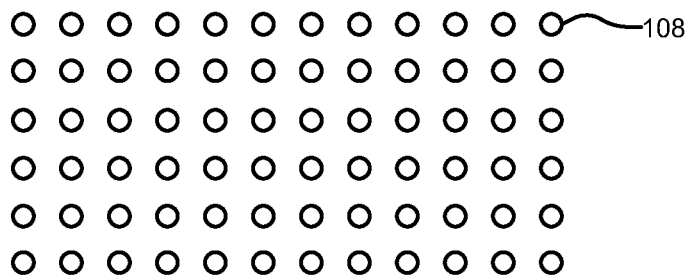
Figure 4C:
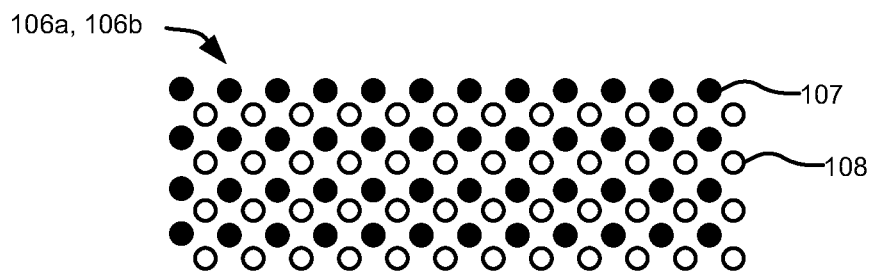

Each of the first light emitting unit 122 and the second light emitting unit 124 of card 100 include plural light emitting devices, such as semiconductor light emitting diodes (LEDs), organic light emitting diodes (OLEDs), monochrome LCDs (LCM), a multi-mode display capable of both monochrome and color display modes, or thin film transistor (TFT) controlled backlit or edge-lit liquid crystal display (LCD) devices which are arrayed across respective major surfaces of card 100 (see, FIGS. 3A, 3C and 4C). These light emitting arrays of card 100 allow for not only a display to display images on the card's major surfaces, but also to function as a light source, such that it can illuminate any object within its power limitations, and do so with any frequency of light the card has been equipped to emit, which may include one or more frequencies from infra-red and ultra violet. As can be seen from FIG. 2, video decoder 120 receives a coded signal provided on bus 108 from processor 110, decodes the signal and the first light emitting unit 122 and/or the second light emitting unit 124 control light emissions according to the decoded signal.

First light emitting unit 122 and/or the second light emitting unit 124 can serve as displays such as a cell phone display or to present identification, either for a POS operator (or anyone asking for it) or for scanning. Display features can be provided, such as magnification of an image on the display, with a control to do so. Because there is a display, boundaries associated with conventional cards become "unbounded." For example, it becomes unnecessary to display the credit card number, for example, just perhaps the last four digits only. If a user selects a function of the card, he can see all of the information normally present on a card, if and when needed, as a guard. In an embodiment, the card can emulate plural hard cards a user may carry, front and back, first through scanning face to face, then, by way of the display.

Watermarks, (e.g., see FIG. 16) could be visible on at least one of the major surfaces of card 100, but infra-red and ultraviolet light can be used for greater security. Use of various visible light frequencies and not visible light frequencies for display also keeps the public enemy from a data transference connection, face-to-face card communication, or card in POS system connection because it is more difficult to capture signals when using many wavelengths.

The expanded display provided by the first and second light emitting units 122, 124 in the familiar form factor of a credit card can conserve space because it can serve several functions, for example, a Social Security card, a license (e.g., driver's license), security/access card, EZ pass, credit debit and bank cards, keys, provide emergency medical condition information related to the user or user's immediate family, just to name a few. That is, while exemplary embodiments are described herein, the extent of applications of card 100 and system 1 is far reaching and thus not limited to the specific examples described herein as will be apparent to those skilled in the art.

Each of the first light detection unit 126 and the second light detection unit 128 includes a light detecting array or imaging device, such as a charge-coupled device (CCD) including plural semiconductor MOS diodes arrayed across respective major surfaces of card 100 (see, FIGS. 3A, 3C and 4B), each of which can represent a pixel of an image. Light detection units 122, 124 can digitize an imaging signal output from the imaging device, can perform various kinds of correction processing, such as gamma correction, on the imaging signal, and output the result to video encoder 130 to perform encoding processing on the imaging signal and output the result to the processor or controller 110.

Additionally, first and second light detection units 126, 128 of card 100 can be equipped to detect the light created by the card, or the ambient light available in a given setting, or both. Through emission of specific light wavelengths and patterns, from specific portions of the card surface, distance to an object can be determined from detection of this emission and can allow the card to use parallax to determine velocity, acceleration, deceleration of a given target object for display or storage. A snap shot or video of the event can mesh the image data with the movement data for real time or later use. Through spectral analysis, applications to read temperature, substance presence such as sugar (blood sugar) could be provided by applications developers. As card 100 advances and spectral analysis improves, card 100 can be configured to perform real-time forensic scanning of a given object, substance or surface, such as to identify all substances in a given target as done in a blood serum analysis. These functions allow for many possible applications for card 100 and for developers who write applications for card 100 to create an enhanced man-machine interface not dependent upon touch.

The first and second light detection units 126, 128 of card 100 can form an image of objects facing respective major surfaces of the card, and thus the card can operate as a camera in some respects. However, a preferred embodiment of the card does not include a lens set as would a typical camera assembly having focal distances on the order of centimeters, the optical axis of which is typically laid out perpendicular to the imaging surface. Even if some other orientation is chosen, minimization of the optical axis is dependent on minimum lens thickness and maximum refractive index of the materials, which quantifies their ability to bend light and may require great expense or simply become impossible beyond a certain limit. As is known to opticians, glass typically provides an index of about 1.5 whereas one may achieve an index of 2.42 by employing lenses of pure diamond. As the refractive index is a ratio which relates the sine of incident light angle prior to lens to incident angle after the lens, (and which sines may be substituted by their respective actual angles if close to the optical axis, according to the well-known small-angle approximation) the length of the optical axis will always be some multiple of the lens thickness. Furthermore, as optical axes are always perpendicular to the two dimensions of a planar lens which, as is known to the arts of optics, also cannot be reduced below a certain multiple of the lens thickness due to the so-called "thin lens approximation." Thus, lensing requirements place minimum constraints on 3 orthogonal dimensions and, as one of these in the form factor of the card 100 substantially corresponds to the thickness of a credit card, card 100 uses an optical configuration different from typical optical assemblies. In an embodiment, card 100 uses a combination of micro-lensing, pinhole lens techniques and image processing software or simple collection of light by CMOS or CCD, hereinafter sometimes collectively referred to in this document simply as "CCD" pixels, in sufficient density to form a functional image. As will be described in more detail below, since card 100 has no analog optics (such as a traditional lens) and since further, it may be required to display detailed and at times secure images on the major faces of the card, the total amount of display and capture area can be a significant factor for proper functioning according to some embodiments. To provide a wider viewing angle it is possible to emulate an analog lens by varying the substrate supporting the light receiving pixels in order to position the pin hole apertures on the surface of a repeating convex or concave substrate pattern for example, as one would view a golf ball surface or the complex lens of an eye of an insect, such as a dragon fly.

As can be seen, the imaging and display capabilities of card 100 accentuate the "invisible" or buried (hidden) magnetic layers, which can behave as stripes as found on a legacy credit card. The sensing elements (e.g., CCD and magnetic read), if the sensing can detect a shape or pattern and the processing software match it up, the output elements, such as magnetic-out and display can be managed according to what the sensor detects, as explained in greater detail below. In particular, when ambient conditions require additional illumination, the LEDs can emit light, which can include infra-red or ultraviolet, and the CCD can detect it. The CCD can also judge day from night and adjust for lighting conditions.

Each of the first magnetic-in unit 132 and the second magnetic-in unit 133 can detect a magnetic field local to the corresponding major face of card 100. Magnetic-in detection can be provided with micro-miniature layer deposit techniques. For example, a stressed material adjacent to a non-stressed material laid out in an array, where the stressed material will change its electrical value when the non-stressed material is subjected to a magnetic field. In another example, magnetically sensitive piezoelectric crystals can be etched or deposited to the surface of card 100 in an array, capable of varying the resistance or current in the presence or absence of a magnetic field. Digital processing of the signal obtained from an array of magnetic detectors will provide more specific information about the magnetic field received, including any data embedded in the magnetic field.

Each of first magnetic-out unit 134 and second magnetic-out unit 135 can be configured as arrays of magnetic-out pixels that can be controlled to generate localized fields data transfer, for example, between the card major surface and magnetic sensors of a tether I/O device or another user device. "Major surfaces" herein are the outermost substantially planar surfaces of card 100 that face in opposite directions. In an embodiment described later in detail, first magnetic-out unit 134 and/or second magnetic-out unit 135 can be controlled such that they create a magnetic pattern similar to the magnetic stripe of a card without being constrained to any specific position on a major surface of card 100. Accordingly, first magnetic-out unit 134 or second magnetic-out unit 135 can be used to create magnetic data readable by legacy and future card readers. This is further described below.

Because the arrays of pixels of first magnetic-out unit 134 and second magnetic-out unit 135 can occupy an area coinciding in plan view with at least substantially an entire major surface of card 100, stripe positions can be pre-programmed or created as needed based on sensed activity. For example, a magnetic stripe can be increased to extend across substantially the entire major surface of card 100, front and back, and still remain invisible. If legacy equipment is used, card 100 can adapt and communicate the stripe, which can be auto-located at any position and orientation to be read by the reader. The reader can be a legacy POS card reader or another card 100 functioning as a POS system. In an embodiment, a card-to-card POS system can communicate the magnetic stripe based on handshake of the display-to-display according to a pattern established by the first display handshake for the fixed in place point of sale system. Hence, anyone carrying the card can use it as a portable POS system.

Card 100 can include a sound/voice/haptic codec 136 configured to receive a sound or voice signal from either first micro-speaker pixel array 138 or second micro-speaker array 140 (e.g., piezoelectric arrays), encode the signal, and provide the encoded voice/sound signal to processor 110 via bus 108. Sound/voice/haptic codec 136 receives coded sound, voice, or haptic data from processor 110 via bus 108, decodes the data, and generates a signal to micro-speaker pixel array 138 or micro-speaker pixel array 140. Hence, micro-speaker pixel arrays 138, 140 can provide, at least to some minimal extent, functions of a microphone, a speaker, or haptic feedback device.

Authentication unit 142 of card 100 gathers identification information about the card and the user, which in an embodiment can be transmitted to card/user authentication unit 230 of server 200 for authentication of the card 100 and/or the card user. In another embodiment, the card can store biometric data for login authentication to the extent permissible by a security scheme, card processing power, and/or card memory capacity. As will be described later in detail, plural physical characteristics such as fingerprints, capillary patterns, pulse and micro-pulse patterns, voice prints, and retinal or iris prints etc. can be used for identification purposes, for example, at login or during a transaction. Also, an account number, expiration date, PIN number, password and other card information and indicia can be transmitted in encrypted form from authentication unit 142 of card 100 to card/user authentication unit 230 of server 200 for authenticating card 100.

Location unit 144 is a location determining unit, such as a global positioning system (GPS) receiver. Location information determined by location unit 144 is transmitted to the server 200, where it can be utilized by one or more system applications, such as value analyzing unit 232 and tracking unit 236, which are described in detail later in this disclosure. Alternatively, location of card 100 can be derived in other ways, such as by using multilateration of radio signals as in cellular networks, manual entry by user, or through integration to other electronic devices that know their respective location and can share the location data.

Power supply 112 delivers power to system elements of card 100 shown in FIG. 2. The power supply 112 can supply power from any of a number of sources. For example, aside from known RFID powering mechanisms, there is a known method pioneered by Intel in which movable inductors pass power to fixed inductors provided within the card, power transfer via capacitive coupling etc. Of course, the card can also be equipped with its own battery as a battery "layer," for example, a thin film or ultrathin film rechargeable lithium ion or lithium polymer battery will fit within the proposed form factor or any larger form factor.

Power supply 112 of card 100 can include a power management unit to manage, generate, and conserve power, although a power management unit can be included as a unit separate from and communicatively connected to power supply 112. For example, an embodiment can include a power saving mode in which the display is monochrome images. An embodiment can include elements for determining whether to turn off one, both, or portions of the first or second light emitting units 122, 124 (i.e., the dual display units). For example, an embodiment of card 100 can include a tilt sensor, such as a MEMS accelerometer, and/or recognition software that can identify features or level of luminance in an image sensed by the first and second light detection units 126, 128, and control power provided according to the detected orientation, recognized features, or detected luminance. For example, card 100 can include an application that auto-orients any display or to run an application in a specific orientation, and can be developed from tilt and/or accelerometer data. Applications for orientation can also be sensitive to what the card 100 determines it is recognizing from its light collecting input (e.g., light detection at a CCD of the light detection units 126 and/or 128).

In an embodiment, magnetic stripes are provided in the card. In an embodiment, magnetic stripes are positioned between major surfaces of card 100, such that the magnetic stripes are "buried" and not visible on the card major surfaces. One or more magnetic stripes positioned on card 100 can be programmed, for example, according to ISO/IEC 7811, ISO/IEC 7813, and ISO/IEC 4909 standards or otherwise described herein, to include information such as account information, identifying information (e.g., driver's license, credit card, identification card, secure access card), monetary value (e.g., fare cards, gift cards), etc. that can be read/written by card readers/programmers. The magnetic stripes can be generated in four positions (see FIGS. 3B and 5) to allow haphazard insertion of the card into a swipe or slot type reader in any card orientation relative to the reader (e.g., the slot of a reader), and getting a single action to "take" every time regardless of the orientation of the card while swiping or insertion into the reader. Card 100 can be backwards compatible to the older technology of magnetic swipe such that anything "magnetic swipe" or slot insertion type is instantly compatible. Behind the magnetic stripe material can be micro-miniaturized magnetic write heads which will erase and re-write the data found on the stripe under the control of system 1.

FIGS. 3A to 3C are diagrams of an exemplary embodiment of card 100. FIG. 3A is a perspective view, FIG. 3B is a plan view, and FIG. 3*c* is a side view of card 100. As shown in FIGS. 3A-3C, the card 100 includes a first major surface 101, a second major surface 102, a first physical port 103*a*, a second physical port 103*b*, and plural magnetic stripes 104.

FIG. 3A is a perspective view of card 100, which shows a first major surface 101, a second major surface 102 (not explicitly shown in FIG. 3A), and side, or edge surface including physical ports 103*a* and 103*b*. First major surface 101 covers intermixed array 106*a* and second major surface 102 covers intermixed array 106*b*. An intermixed array includes at least two different array units, including but not limited to a light emitting unit, light detection unit, magnetic-in unit, magnetic-out unit, and micro-speaker array. Each array unit, includes plural independently controlled pixels.

In the FIG. 3B plan view, each magnetic stripe 104 is shown in phantom because they are positioned below the outer obverse and reverse (major) surfaces of card 100 (i.e., first and second major surfaces 101, 102), and thus are "invisible." The magnetic stripes 104 are programmable strip regions shown as separate strips, but in another embodiment the magnetic layer could extend over a greater or smaller amount within an area defined by the periphery of the major surfaces 101, 102 of card 100 in the plan view, in which case the strip regions are virtual regions that can be programmed and deprogrammed, as needed, when needed.

FIG. 3C is a side view of an exemplary card 100 including first physical port 103*a* and second physical port 103*b*. In an embodiment, physical port 103*a* and physical port 103*b* have different configurations from each other, for example, an IEEE 1394 interface, a USB (universal serial bus) port, or another interface type physical port. Physical ports can be excluded to the greatest extent possible, or entirely in some embodiments in the interest of improved weatherability, better conformity to the credit card form factor, and resistance to dirt, liquid water, or water vapor that may cause degradation of the internal components of card 100.

Figure 4D:
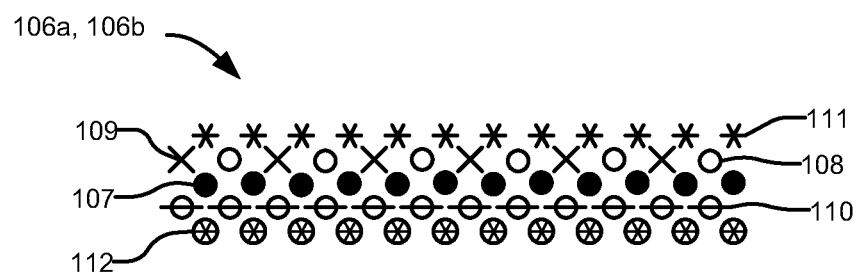

FIGS. 4A to 4D are diagrams of pixel elements that can be used in intermixed arrays of card 100. FIG. 4A shows an exemplary arrangement of arrayed light emitting pixels 107, or display pixels of the first and second light emitting units 122, 124. FIG. 4B shows an exemplary arrangement of arrayed light detecting elements or pixels 108 (e.g., a CCD MOS diode) of the first and second light detection units 126 128. FIGS. 4C and 4D show portions of intermixed arrays 106*a* and 106*b* that are provided on major surfaces 101, 102 shown in FIGS. 3A-3C. FIG. 4C is a diagram of a portion a portion of a major surface 101, 102 of card 100 showing an exemplary embodiment of intermixed arrays 106*a*, 106*b* including both light emitting elements 107 and light detecting elements 108 arrayed on the depicted portion. FIG. 4D shows exemplary intermixed arrays 106*a*, 106*b* including additional types of array (pixel) elements including but not limited to magnetic-out pixels 109, magnetic-in pixels 110, piezoelectric-in pixels 111, and piezoelectric-out pixels 112. Each of the additional pixel elements are arrayed along each of the major surfaces 101, 102 along with light emitting pixel elements 107 and light detecting pixel elements 108. It is to be understood that the intermixed arrangement depicted in FIG. 4D is exemplary and that different types of arrayed pixel elements, more types of arrayed pixel elements, or less types of arrayed pixel elements may be provided having densities different from those depicted and different from one another. It is to be understood that each pixel 107 can include more than one component, such as plural light emitters for color light emission (e.g., using green, blue and red sub-pixels, but also operable in a monochromatic mode) and the different types of pixels of the intermixed array can be arranged having densities that are the same or different from one another.

Figure 5:
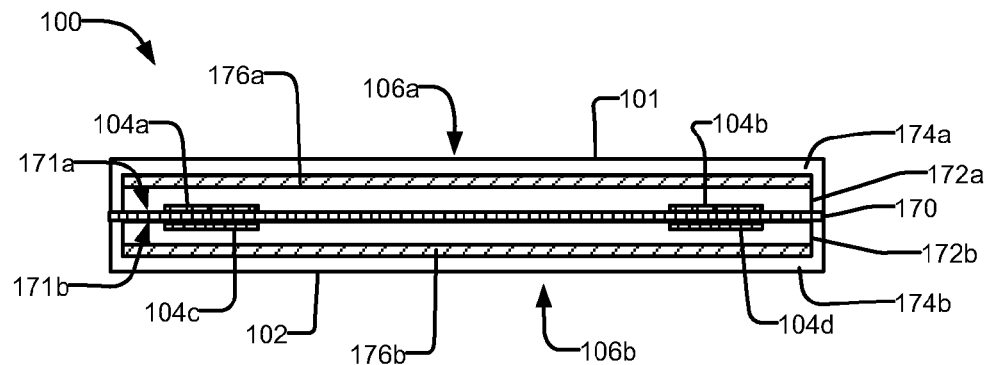
FIG. 5 is a cross section of the card shown in FIG. 3B taken along A-A.

FIG. 5 is a cross sectional view diagram taken across A-A of FIG. 3B and shows details of an embodiment of card 100. As shown in FIG. 5, card 100 includes a substrate 170, which includes electronic elements of the card. The above-described intermixed arrays are positioned or stacked on first major surface 171*a* and second major surface 171*b* of substrate 170 in first and second stacking directions, which respectively run in directions normal to surfaces 171*a* and 171*b*, i.e., in the vertical directions in FIG. 5. A first intermixed array portion 172*a* is provided adjacent to first major surface 171*a* in the first stacking direction; a second intermixed array portion 172*b* is provided adjacent to second major surface 171*b* in the second stacking. A first cover structure 174*a* and a second structure 174*b* are provided so as to cover and seal against respective major surfaces 171*a* and 171*b* to provide a water-free and dust-free environment for the first and second intermixed array portions 172*a* and 172*b*. In the embodiment depicted in FIG. 5, cover structures 174*a* and 174*b* are each a bezel-less molded single film covering and sealing the respective first and second intermixed array portions 172*a*, 172*b*, although a card cover structure can be a bezel type covering structure and/or include additional supporting elements, for example, at the card edges, and may include alignment/supporting structures to assist in aligning and supporting cover structures. Cover structures 174*a*, 174*b* include transparent portions allowing transmission of light from light emitting elements of the first and second light emitting units 122, 124, and transmission of light from outside card 100 to light detecting elements of the first and second light detecting units 126, 128. In the embodiment shown in FIG. 5, magnetic stripes 104a, 104b are provided inside cover structure 174a, preferably on or near major surface 171a of substrate 170; and magnetic stripes 104c, 104d are provided inside cover structure 174b, preferably on or near major surface of substrate 171b. In another embodiment, no magnetic stripes in the form of a film are provided because the function of one or more magnetic strips can be performed using magnetic pixels of first and second magnetic-out units 134 and 135 that can be programmed to produce any field associated with any type card. Another embodiment can include both one or more magnetic-out units and a magnetic stripe for a level of redundancy.

Figure 6:
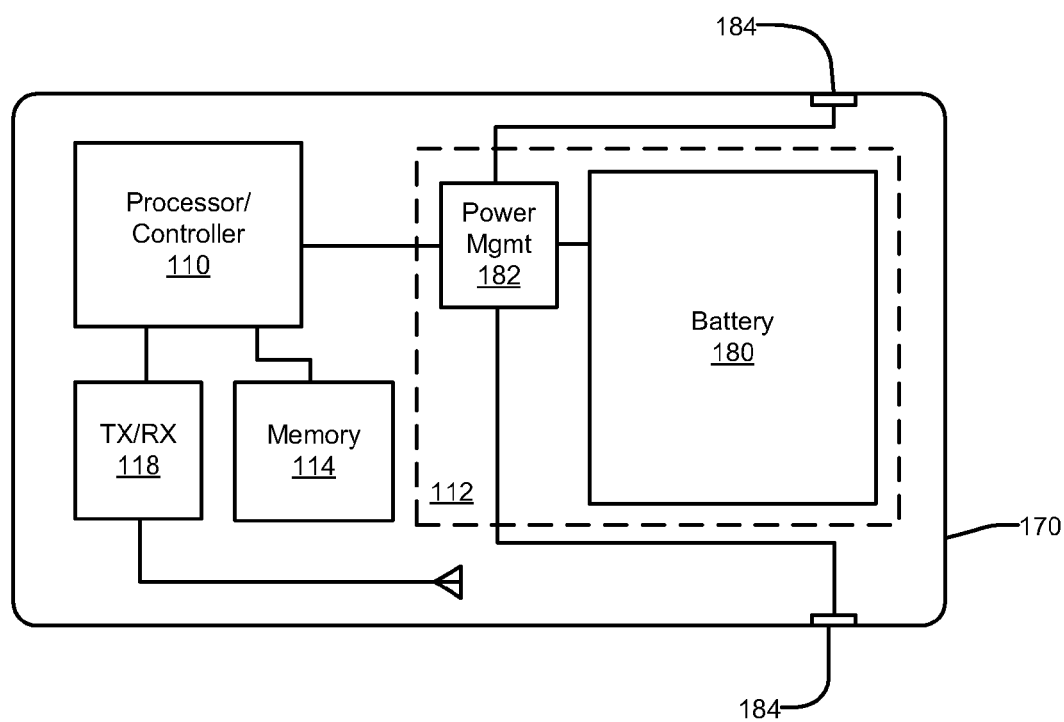
FIG. 6 is a schematic diagram of a substrate of the card shown in FIG. 5 an according to an exemplary embodiment.

FIG. 6 is a schematic diagram of an embodiment of substrate 170, which includes plural electronic devices used to operate card 100 and can serve to provide strength and an acceptable amount of stiffness to the card. In an embodiment, substrate 170 includes a processor 110; a power supply 112 including a battery 180, such as a thin/ultrathin film lithium ion or lithium polymer battery, and power management device 182; memory 114; and other devices such as a tilt sensor, an accelerometer (not shown), and/or other electronic elements. While not shown in FIG. 6, substrate 170 can include at least one serial interface or physical port (see, FIGS. 3A and 3C) (e.g., USB, IEEE 1394 etc.), although embodiments of card 100 may forgo inclusion of any physical ports. The electronic devices included with substrate 170 can be embedded in substrate 170, included in recessed areas, or surface mounted on substrate 170. Substrate 170 can include wire traces, multi-layered wiring, and through holes to interconnect electronic devices with substrate 170 and adjacent first and second intermixed array portions 172a, 172b.

FIG. 6 shows a pair of charge receiving contacts 184 for charging the battery 180 of card 100. The charge receiving contacts can be included as in typical smartcard contacts conforming to ISO standards, but are preferably positioned along the card sides to not interrupt display area, and can also be used to transfer data to and from the device, although charging contacts can be arranged in another manner, for example, somewhere else at the periphery of card 100. Power management device 182 receives voltage/current applied to charge receiving contacts 184 and controls the charging function for battery 180 and/or conditioning of the power signal used to operate the card. For example, card 100 can be placed into a charging stand (not shown) including a pair of charge transmission electrodes such that each receiving electrode contacts a respective charging electrode to charge the battery. Alternatively, card 100 can include a "contactless" type battery charging subsystem including a coil or capacitive charging plate such that card 100 can be placed on a charging surface including a complementary charging coil or capacitor electrode.

FIGS. 7A and 7B show more details of an exemplary card 100, where FIG. 7A shows a plan view of a portion of first major surface 101 and FIG. 7B shows a sectional view taken along B-B of FIG. 7A. As shown in FIG. 7A, card 100 includes substantially identical intermixed arrays 106a and 106b provided in respective multilayer stacks S1 and S2 on opposite faces or sides of substrate 170. In an embodiment, each multilayer stack S1 and S2 includes plural layered arrays. Multilayer stack S1 includes, starting from the layer closest to substrate 170, a light detecting layer 186a, a magnetic-out layer 190a, a magnetic-in layer 192a, a piezoelectric-in layer 194a, a piezoelectric-out layer 196a, and a light emitting layer 198a. Multilayer stack S2 includes, starting from the layer closest to substrate 170, a light detecting layer 186b, a magnetic-out layer 190b, a magnetic-in layer 192b, a piezoelectric-in layer 194b, a piezoelectric-out layer 196b, and a light emitting layer 198b. It is to be understood that the substrate 170 and various layers of stacks S1 and S2 are not drawn to scale for the sake of explaining the layered structure.

Light detecting layer 186a of multilayer stack S1 includes arrayed light receiving/detecting pixels of light sensitive material and is part of the first light detecting unit 126 described above. Light detecting layer 186b of multilayer stack S2 includes arrayed light receiving/detecting pixels of light sensitive material and is part of the second light detecting unit 128 described above. In an embodiment, the first and second light detecting layers 186a and 186b are CCDs, although another light array technology such as CMOS (complimentary metal oxide semiconductor) chips, photodiode array (PDA) etc. can be used as a light detecting layer. The light receiving/detecting pixels are arrayed on each of the surfaces of light detecting layer 186a, 186b facing away from substrate 170 in correspondence with respective light transmitting passages 187a and 187b. With reference to FIGS. 7A and 7B, each light transmitting passage 187a extends between a light receiving/detecting pixel of the light detecting layer 186a and a hole 188a at the upper surface of the multilayer stack.

In operation, light incident on the surface 101 of transparent first cover structure 174a transmits through the first cover structure to each hole 188a, which serves as pinhole type orifice allowing the light to enter light transmitting passages 187a, and the transmitted light travels in a direction of the arrows 189a to a light receiving/detecting pixel of light detecting layer 186a. Similarly, light incident on the surface 102 of transparent second cover structure 174b transmits through the second cover structure to each hole 188b, which serves as pinhole type orifice that allows the light to enter light transmitting passages 187b, and the transmitted light travels in a direction of the arrows 189b to a light receiving/detecting pixel of light detecting layer 186b. For each pixel of first light detection unit 186a and second light detection unit 186b, no material is provided in holes 188a, 188b and corresponding light transmitting passages 187a, 187b, although other transmission media between first cover structure 174a and first light detection unit 186a and between second cover structure 174b and second light detection unit 186b can be used.

Magnetic-out layer 190a and magnetic-out layer 190b respectively form parts of the first magnetic-in unit 132 and the second magnetic-in unit 133, and are magnetic field generators that include addressable pixel arrays that can be used to form magnetic fields in patterns, such as those found on a card magnetic stripe, or to form part of a magnetic transmitter that can communicate with a reading device, such as a card reader or another card. As described above, the pixels of the first magnetic-out unit 134 and second magnetic-out unit 135 can occupy an area coinciding in plan view with at least substantially the entire respective major surface 101 and 102, and can be programmable from which virtual stripes can be derived. For security, an embodiment allows for these virtual stripes to be programmed (activated) "just in time" when the user is present at a POS reader and deprogrammed and deactivated "just after use." In an embodiment, virtual stripes can be created based on gestural or other information associated with movement of the card. For example, when swiping the card through a POS or other reader, the user can be holding card 100 in such a way that it is at an angle unreadable by the reader. Card 100 can learn and determine patterns associated with swiping and determine the orientation of the card when swiping is initiated. Card 100 can be configured to use preferences to match the magnetic stripe data to the virtual card displayed. For example, user can select a specific virtual card from among plural virtual cards for use and the magnetic data out is automatically matched with the account associated with the selected virtual card. Before advancing through the sensors of the reader, card 100 can create, "just in time," a stripe at a location across the portion of the card surface that is readable by the reader, and then deprogram the strip (or reposition to the standard location), "just after use." In this way, the reader will encounter less unsuccessful card swipes and the user less complications with card use.

Magnetic-in layer 192a and magnetic-in layer 192b respectively form parts of the first magnetic-in unit 132 and the second magnetic-in unit 133, and include addressable pixel arrays that can be used to sense a magnetic field to which the corresponding card major surface 101, 102 is subjected to. Magnetic-in layer 192a and magnetic-in layer 192b can be formed from any suitable magnetic sensitive layer that can be formed as a thin film, such as a composite magnetostrictive and piezoelectric material exhibiting a magnetoelectric effect.

Piezoelectric-in layer 194a and piezoelectric-out layer 196a form parts of first micro-speaker pixel array 138, and piezoelectric-in layer 194b and piezoelectric-out layer 196b form parts of second micro-speaker pixel array 140. By using different materials for the microphone and speaker, the speaker and microphone can be biased differently and operated in full duplex mode (simultaneously) using digital signal processing techniques such as echo and noise cancellation. Further, algorithms for the pixel arrays of piezoelectric-in layers 194a, 194b allow for virtual microphones that can steer individual lobes of the microphone's virtual polar patterns towards a particular source, for example, a source location identified via the light receiving/detecting pixel of the light detecting layer 186a or 186b. In another embodiment, a single layer of piezoelectric material can form piezoelectric-in/out pixels providing the function of the microphone and the speaker in half-duplex mode. In another embodiment, the pixels of piezoelectric-out layers 196a and 196b can provide haptic feedback to specific areas of the card in response to a corresponding manipulation of the card by the user or to otherwise alert the user to an event, communication, end of some processing etc.

In embodiments of card 100 having peizo electronics on one or both major surfaces of the card, the card can act as a microphone and as a speaker throughout one or both surfaces of the card. This specific capability can provide a variety of sound emission and collection applications, such as emulating a cell phone for purpose of calling or receiving a call, creating sound, collecting voice for use as a biometric element (such as logging with voice recognition), and sounding alerts or alarms. However, with the conformation of a card, the power and fidelity of the emissions and collection can be limited in its use to some extent due to power limitations and the flatness of the surface. Placement of two cards in stable, close proximity can still use sound as one of the means of handshake and data passage. Due to the peizo electronics being disbursed as pixels, just as the light emitting elements (e.g., LEDs) and light receiving/detection elements (e.g., CCD elements) are distributed, the sound emitted and collected can include many sounds, emissions and collections which are Trojan communications, safely guarding the one or few which are real communications. As used herein, "Trojan" means false and not used at the receiving end. This dynamic forms another data transfer method which, while relatively slow, can emulate the old modem function and add a dynamic for communications between two cards, a plurality of cards, or one card communicating with another machine equipped with the card 100 or elements of the card as an integrated element of the machine. Further, as with the light emitter (e.g., LED) and light receiving/detection (e.g., CCD elements) pixel elements, the peizo-electric pixel elements can be controlled as an array, such as a phase array allowing for directivity.

The pixels of piezoelectric-in layer 194a and piezoelectric-in layer 194b also can be configured to sense biometric data, such pressure fluctuations indicative of a pulse (heart rate) from a finger touching a major surface of the card 100.

Light emitting layer 198a and light emitting layer 198b respectively form parts of first light emitting unit 122 and second light emitting unit 124 and include light addressable emitting elements (e.g., LED, OLED, LCD etc.). While not shown, first light emitting unit 122 and second light emitting unit 124 can include one or more controllers, image processors, and driver modules that process decoded video data from video decoder 120 and display the decoded and processed data on the first and/or second major surfaces of card 100.

While not shown in FIGS. 7A and 7B, and in other embodiments described herein, each of the pixels of magnetic-out layer 190a, magnetic-out layer 190b, magnetic-in layer 192a, magnetic-in layer 192b, piezoelectric-in layer 194a, piezoelectric-in layer 194b, and piezoelectric-out layer 196a, piezoelectric-out layer 196b, light emitting layer 198a, and light emitting layer 198b includes electrode pairs, each electrode connected to row and column electrodes that can individually address a particular pixel for sensing and emission. The electrodes at the outermost layer of the stacks can be transparent, for example, indium tin oxide (ITO) or thin layers of metals such as silver to allow light transmission therethrough. Additionally, while the figures do not show interlayer insulators, such layers would be present between layers of the stack where needed for electrical insulation and isolation, for example between adjacently stacked column/row lines in the stacks S1 and S2.

FIGS. 8A and 8B are diagrams of an embodiment of a card 100A. FIG. 8A shows a plan view of a portion of first major surface 101 and FIG. 8B shows a sectional view taken along B-B of FIG. 8A. Differences between card 100A and card 100 shown include increased length light transmitting passages 387a and 387b provided by way of perforations or holes formed into an array in the substrate 370. Additionally, because first light detecting layer 386a is formed at a level in the stack S2' closer to the second cover structure 174b and on a side of second light detection unit 386b facing substrate 370, and second light detecting layer 386b is formed at a level in the stack S1' closer to the first cover structure 174a and on a side of second light detection unit 386a facing substrate 370, the density of the light receiving/detecting pixel on each face of substrate 370 is less than the embodiment of FIGS. 7A and 7B. Also, the positions or arrangements of holes 388a and 388b respectively formed in light emitting layers 398a and 398b are different from the hole positions/arrangements of light emitting layer 198a, and light emitting layer 198b of the display shown in FIGS. 7A and 7B.

In operation, light incident on the surface 101 of transparent first cover structure 174a transmits through the first cover structure 174a to each hole 388a, which serves as pinhole type orifice allowing the light to enter light transmitting passages 387a, and the transmitted light travels in a direction of the arrows 389a to a light receiving/detecting pixel of light detecting layer 386a. Similarly, light incident on the surface 102 of transparent second cover structure 174b transmits through the second cover structure to each hole 388b, which serves as pinhole type orifice that allows the light to enter light transmitting passages 387b, and the transmitted light travels in a direction of the arrows 389b to a light receiving/detecting pixel of light detecting layer 386b.

The light transmitting passages 387a, 387b through substrate 370 require distributing the plural electronic components and devices used to operate card 100A in a manner so as to accommodate the array of perforations 350. Some or all elements can be distributed between the perforations and/or the various electronic devices can be designed to include the passages.

It is to be understood that the ordering of the layers of each stack S1, S2, S1', and S2' can be different than what is depicted in FIGS. 7A to 8B, although light emitting layers 198a and 198b are preferably situated as the outermost layer of stacks S1 and S2, respectively. Further, embodiments according to the present disclosure may include more or less layers on each side of the substrates 170, 370 than what is depicted, but at least include a light receiving/detecting layers and light emitting layer on each side of the substrate. Furthermore, the light emitting and light receiving/detecting units can be positioned on a same layer or level in each stack S1, S2, S1', and S2', but in such an embodiment it is preferable to multiplex the light emitting and detection functions to reduce noise/interference among the light detecting elements.

Additionally, FIGS. 7A to 8B show exemplary diagrams indicating only the order of elements, not necessarily the sizing or shape and not intending to be limiting as to that which one of skill in laying out and designing, for example, in very very large scale integration (VVLSI), could permutate in accordance with the features and other descriptions of the present disclosure. Also, it is to be noted that use of the thickness of the card for development of depth for light collecting elements, allowing for pin hole lens effects limits light to that which approaches the card at a near perfect right angle, limiting detected light to that which is directly in front of the hole and is reflected (possibly sourced to the LED output of the card, providing self-illumination of an object).

The above description of layouts of components of card 100 is not to be taken as limiting. The idea is to lay out light emission components (which are near the major surfaces and only covered with clear bezels or other clear surfaces allowing light to escape), light collection components that require line of sight to the external portion of the card, pinhole or tunnel structures etc. which, if light absorbing, assure the light collecting pixels receive light that comes substantially perpendicular to the surface and limiting the light that can enter so memory gathers light data collected from the array which can form a reliable image of what is up close to the card. Magnetic and piezoelectric elements for magnetic-in and magnetic-out functionality and aural functionality are able to be strategically placed for maximum effect. The sound producing and sound receiving peizo electronics may need line of sight access to the surface. The magnetic elements do not need line of sight access to the surface and can be buried by components and nonmagnetic layers. Other components can be added in, which emit energy or collect energy, such that the surface design becomes more and more dynamic over time. Some energy must have line of sight for reliable reception, and other energy can be buried in the sub structure. Burying in the layers any and all electronics that are layered at present can include, but is not limited to power distribution, data distribution, signal lines, ground, battery, processing, memory, adaptors such as network adaptors, essentially any and all electronics which can be cognizably embedded into a credit card form factor. For form factors other than the credit card, presuming they are larger, possibilities expand as to what will fit within the form factor's power and size limitations. For any form factor that is smaller, some considerations change, however, concepts of the disclosure remain.

Embodiments of the card 100 according to the present disclosure allow for sharing or swapping of data by way of stacking cards in a holder or stacking the cards directly on top of one another (e.g., during a swap mode function of the cards). In this manner, any data a "master" card 100 (i.e., the card sending data) wishes to share can be distributed to the stacked "slave" receiving cards. Plural cards can thus be loaded with data, such as instructions, plans, social net contents, entertainment items or essentially any data the master card 100 in a given transaction wishes to share. Applications development for data sharing in this mode will very likely make the process of data movement more secure and less time consuming. The card can transfer data more rapidly from its surfaces than through its network connections. For example, card-to-card data transfer configurations can transfer in the 1,000 GBPS speed, or 10-100 times greater than this, while networks cannot, at present, transfer at this massive rate of speed.

The dual-side function of the card allows stacking cards in any manner because the cards can be configured to recognize which major face of the stacked cards are facing one another, handshake, and begin inter-card communication. A dual-side function of the card can include a mode for performing data transfer among plural stacked cards. For example, one or more cards in a card stack could translate data, and thus assure compatible data is received by all cards in a stack data transfer. In a method of encrypting and decrypting data reliably, the cards could each share a portion of data, wherein, only when the right cards are stacked (even limited to the right moment in time) will they combine their data contents and yield a functional data set, representing the decrypted data intended to be transferred. By using data stored in servers, and carrying pointers to the data, the amount of data that can be reliably moved by card 100 using this method becomes unlimited and the security becomes exponentially superior to any other method of data transfer known to the inventor.

In a levitation embodiment, card 100 can include magnetic elements that levitate and position a first card stacked over a second card. These cards operate independently of a physical dock. For instance, passive fixed magnets can be embedded in the core area of the card 100, for example, in the substrate 170 or 370 described above, at positions that will stably levitate the two cards and not interfere with a card reader's ability to read stripe data. While in a levitated state, at least one pixel of one of first or second light emitting units 122, 124 on a major surface 101 or 102 of the first card are aligned with facing pixels of one of the first and second light detection units 126, 128 on a major surface 101 or 102 of the second card, and at least one pixel of one of the first and second light detection units 126, 128 on the major surface 101 or 102 of the first card are aligned with facing pixels of one of the first and second light emitting units 122, 124 on the major surface 101 or 102 of the second card. In an embodiment, the alignment of the above-described facing light receiving/detecting pixels and light emitting pixels can be carried out in a predetermined and secure way.

Figure 9A:
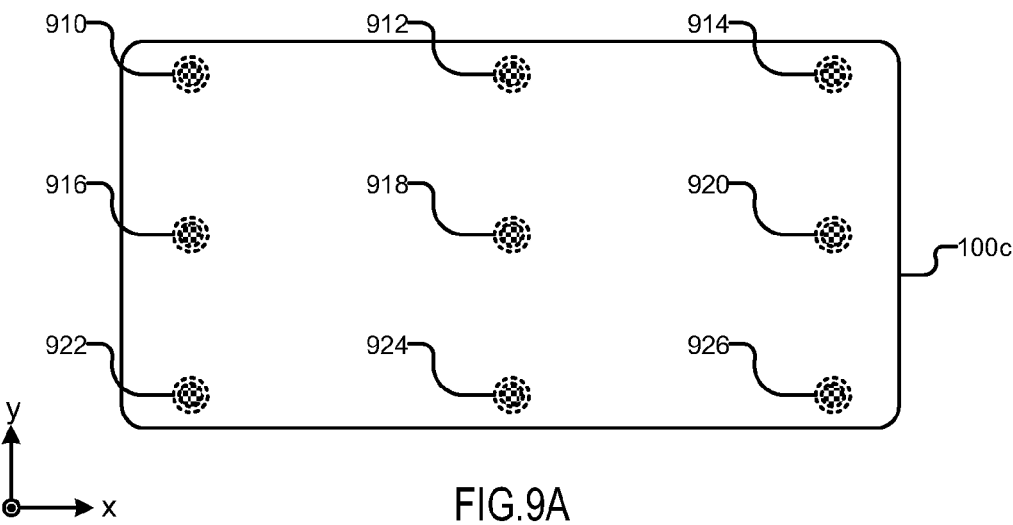
FIGS. 9A to 9C are diagrams illustrating an exemplary embodiment of cards including a configuration allowing one card to levitate over another card via magnetic elements.

In an embodiment, card 100 can include plural current controlled electromagnets and the levitation/positioning controller unit, or Mag Lev unit 147 configured to set current for each of electromagnets to allow other similarly equipped cards to levitate over one another. FIG. 9A show an example of a card 100c including the levitation function, and which can otherwise have any of the card structure disclosed herein. As shown in FIG. 9A, card 100c has plural individual electromagnets 910-926 embedded in a central area of card 100c, for example, embedded in substrate 170 or 370 described above. Each of the electromagnets 910-926 includes a coil in which current can be controlled to emit a magnetic field strength corresponding to the controlled current value. Some or all of the electromagnets 910-926 can be reversible-pole electromagnets such that a polarity of the electromagnet changes according to whether a positive or negative current is applied to the coil of the electromagnet.

Figure 9B:
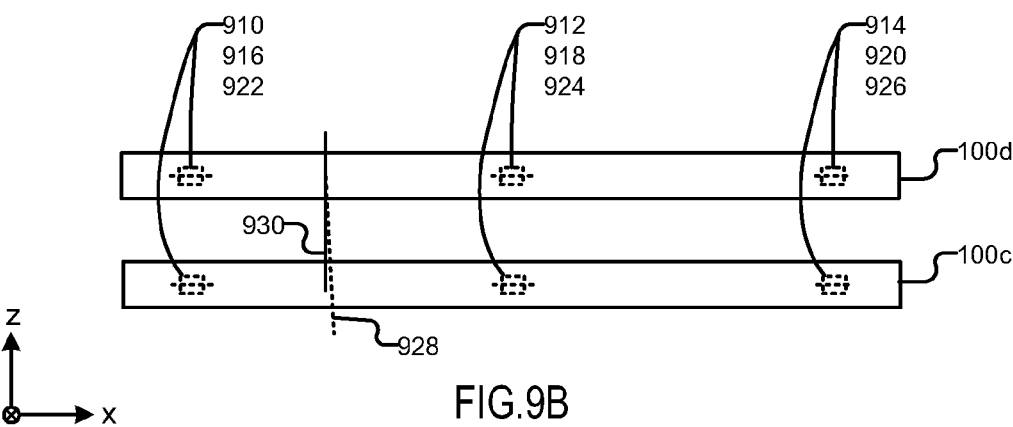

Each of electromagnets 910-926 is electrically connected to a levitation control circuit (not shown), which can be part of data exchange unit 146 shown in FIG. 2, and which can be integrated into card processor 110. FIG. 9B shows card 100*c* and another similarly equipped card 100*d* magnetically levitating in the depicted z-axis direction above card 100*c*. For stability, at least one of electromagnets 910-926 in card 100*d*, for example, electromagnets 916 and 920 of card 100*d* are polarized to attract to electromagnets 916 and 920 of card 100*c*, and a feedback loop can be utilized by the levitation control circuit (e.g., a PID controller) to continuously adjust one or more electromagnets to maintain relative position between the cards 100*c* and 100*d*.

While not shown, each card 100*c* and 100*d* can include electromagnets provided at predetermined angles to provide precise control of magnetic fields that can move card 100*d* and hold it precisely in any of the three depicted dimensions, for example, translating card in the x-axis, y-axis and/or z-axis directions and/or rotate card about the x-axis, y-axis and/or z-axis with high accuracy using electromagnetic variability. In an embodiment, card 100*c* can assume master status and overlying card 100*d* can assume slave status, such that the master card 100*c* controls the positioning of card 100*d*. The distances between various points of cards 100*c* and 100*d* can be determined via one or more pixels of first or second light emitting unit 122, 124 and one or more pixels of first or second light detection units of card 100*c* (or card 100*d*) at different localized positions on the face of the card via emission of specific light wavelengths and patterns from specific portions of the major surface of card 100*c* (or card 100*d*). The distance between cards could be determined, for example, by emitting a known visual image or magnetic image of known size on one card and allowing the other card to view the image of known size use parallax to determine distance between cards.

Figure 9C:
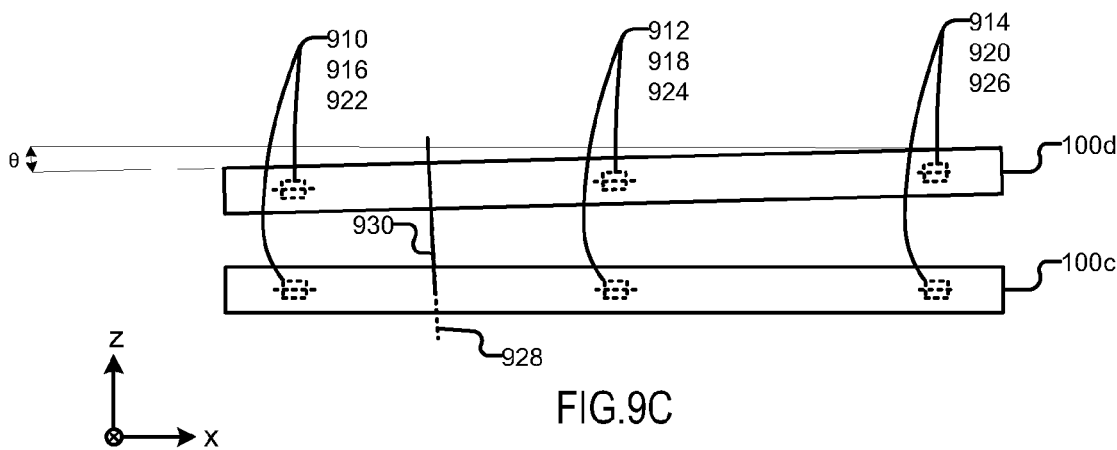

FIG. 9C shows a result of the levitation control circuit levitating card 100*d* by card 100*c* such that card 100*d* pivots about an axis in the y-axis direction though electromagnets 914, 920, and 926 to move the negative x-axis side of card 100*d* through an angle θ in the negative z-axis direction. In an embodiment, cards 100*c* and 100*d* can include one or more light emitters and complementary light receiving/detecting elements (not shown) that align to produce a detected signal, for example, above a predetermined power/duration threshold level, only if aligned when the cards are positioned relative to one another in a predetermined way at least for the initial handshake. For example, FIGS. 9B and 9C shows a dotted line 928 representing a direction in which a light receiving pixel in card 100*c* can receive and detect light, and a solid line 930 representing a direction in which a light emitting pixel of card 100*d* can emit light. As can be seen in FIG. 9B, the light receiving pixel of card 100*c* does not receive and detect a photon stream emitted from the light emitting pixel of card 100*d*, but FIG. 9C shows the directions 928 and 930 align in three dimensions after the adjustment via magnetic levitation control. While FIGS. 9B and 9C illustrate one pair of light emitting and receiving pixels, plural light receiving and light emitting pixel pairs can be set at various relative positions to one other than perpendicular to the surfaces of the cards, for example, at plural acute angles relative to the facing major surfaces of the cards. In an embodiment, communication between the cards can include a form of encryption where the relative position of the cards 100*c* and 100*d* changes periodically in some prescribed way such that communication correspondingly switches between different subsets of light emitting and light receiving/detecting pixels. In this way, cards 100*c* and 100*d* can optically communicate with one another very securely.

It is to be appreciated that the two cards as shown in FIGS. 9A-9C can pertain to a situation in which one belongs to a buyer and the other belongs to a seller, the buyer displays credit card image, the seller displays barcode in which both parties may be required to provide biometric ID and both parties also use the same platform for usual browsing, shopping, and so on.

Figures 10A, 10B:
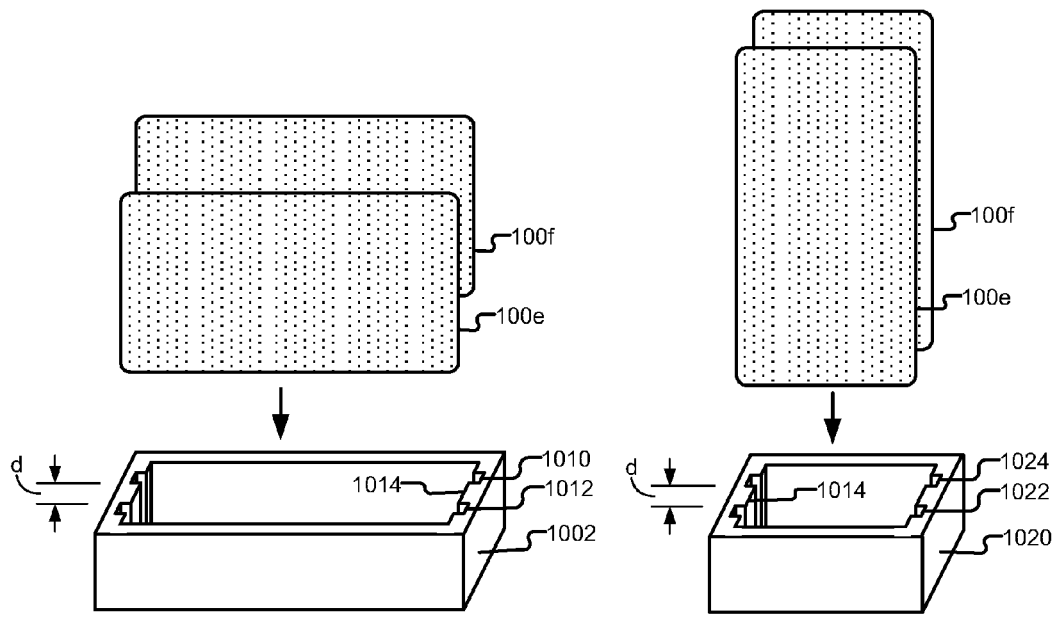
FIGS. 10A and 10B are diagrams of exemplary embodiments of card holding brackets, where FIG. 10A holds plural horizontally oriented cards and FIG. 10B holds plural vertically oriented cards.

FIG. 10A is a diagram of a bracket, or mechanical dock 1002 that can be used to provide a measured space between plural cards 100*e* and 100*f* configured according to the present disclosure. While dock 1002 is configured for horizontally oriented cards, FIG. 10B shows an embodiment of a vertical dock 1020 in which vertically oriented cards 100*e* and 100*f* can be inserted into slots 1022 and 1024. Physical docks can be used for any card-to-card data transfer, such as long duration data transfers between cards, although short transfers can be accomplished briefly holding two cards together. For more secure data transfer, the above magnetic levitation techniques can be used for data transfer of short or long content. The docks 1002 and 1020 also can include a charging function provided by spring loaded or flexible detents that engage charging electrodes of the cards 100*e* and 100*f*, such as the charging electrodes 184 shown in FIG. 6. Additionally, while the height of the docks can be set to cover the cards, the embodiments depicted in FIGS. 10A and 10B allow for use of exposed portions of the cards, for example, user input and control to the major surfaces of the cards, display of an image while charging or transferring data, to alert the user when transfer is complete or when a problem is encountered, or provide other information to the user. It is to be understood that the number of slots can be of any practical size. Further, only one slot can be provided for a charging and or communication dock that can connect to another device via a serial communication and charging line, such as a USB cable.

Two or more cards 100 can be placed in a holder (not shown) which aligns the cards very accurately therein, and the holder can provide external magnetism or physical forces within tolerance so as not to damage the cards, while serving to align the cards with no appreciable air space between cards. For this purpose, pins and guides could be provided as surface features, or, slight notches or grooves on the edges which have no effect on the expected functions of the card 100, but serve to align the card with another, or one card to a device fully integrated to the same technology (e.g., a display on a PC having a portion fashioned as the card is fashioned, and fully integrated to the PC so as to enable all functions using the PC's processor, software and network attachments).

Figures 11A, 11B, 11C:
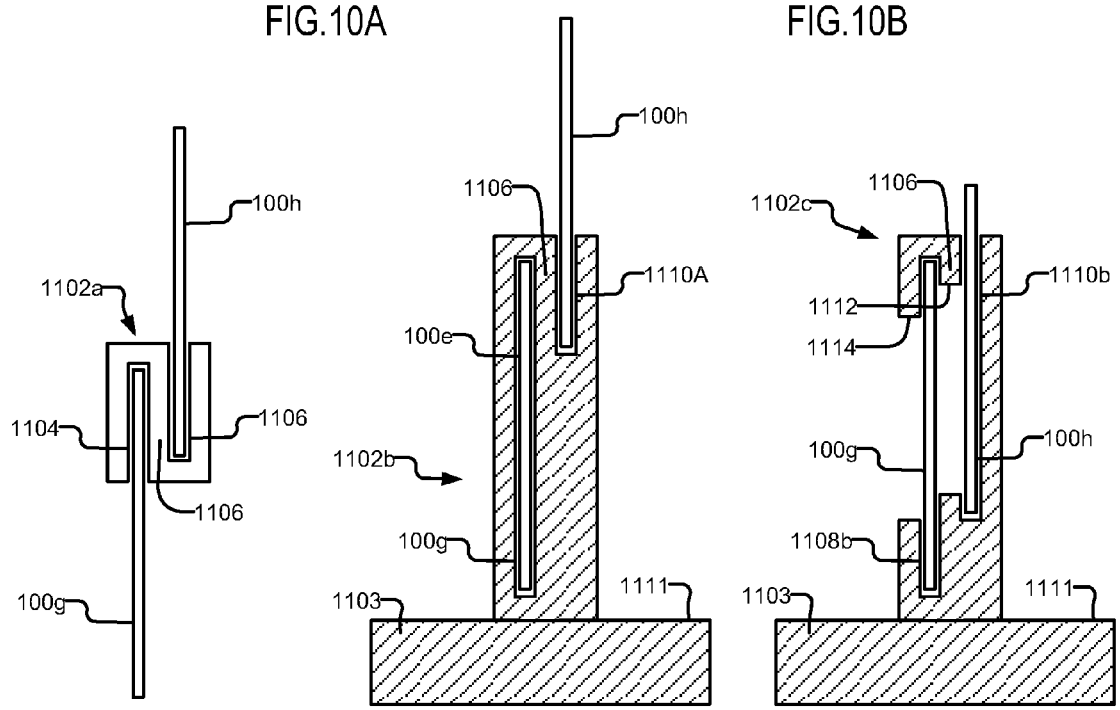
FIGS. 11A to 11C are portable card swipe brackets according to exemplary embodiments.

FIGS. 11A-11C are diagrams of exemplary swipe brackets that can be used as portable POS card readers, for example, to perform transactions at professional offices, conferences, flea markets, festivals, fairs, swap meets, food trucks, between individuals etc., as well as at traditional retail and wholesale environments. These brackets can be used as a docking lock and swipe bracket, and can be adjustable for two different dimensional docking, horizontal or vertical.

FIG. 11A is a side view of a portable swipe bracket 1102*a* according to an embodiment, which the card user can insert card 100g and then swipe another card 100h either horizontally or vertically such that the card 100g can read the virtual or physical magnetic strip on card 100h. At least card 100g is an embodiment of a card according to the present disclosure, and card 100h can be a card according to the present disclosure or a "legacy" type card including a physical magnetic stripe. Swipe bracket 1102A includes slots 1104 and 1106 between which is section 1106, which respectively accommodate cards 100g and 100h. Section 1106 has a thickness allowing magnetic field lines from the magnetic strip to penetrate and be detected by a magnetic-in layer of card 100g, such as magnetic-in layer 192a, 192b described above. While not shown, card 100g can be securely provided in slot 1104 by frictional engagement, enclosed in a variation of slot 104 that is part of an enclosure (not shown), or simply held in place while completing a transaction. In an embodiment, slot 1104 and/or slot 1106 can extend to overlap card 100g and/or card 100h to a further or lesser extent than depicted in FIG. 11A. In an embodiment, swipe bracket 1102A can be hand-held or attached to another object, for example, by an adhesive or a clamping structure.

FIG. 11B is a sectional diagram of an embodiment of a swipe bracket 1102B that can be used as a table-top or counter type swiping apparatus. Swipe bracket 1102B includes a first slot 1108 that forms part of an enclosure housing card 100g, and a second slot 1110A that accommodates a card 100h to be swiped. Swipe bracket 1102B includes a base 1103 that provides support and stability for the upper bracket portion including slots 1108A and 1110A and section 1106, and can be provided as a portion integral with the upper bracket portion or as an attachable piece to the upper bracket portion. In another embodiment, base 1103 is not provided and the bracket portion can be hand-held or placed in on a surface. The upper bracket portion can be oriented and any orientation, for example, an orientation in which the slots 1108A and 1108B are parallel with the base upper surface 1111.

FIG. 11C shows a sectional view of a swipe bracket 1102C, which is a modification of the embodiment shown in FIG. 11B that allows for increased operational features when swiping legacy cards or cards in accordance with the present disclosure. As shown in FIG. 11C, an opening or window 1112 is provided between slot 1108B and slot 1110B to allow card 100g to optically communicate with a card swiped through slot 1110B; and an opening or window 1114 is provided between slot 1108B and the outer portion of bracket 1102C to allow viewing and/or user input to the card 100g. While not shown, at least one of the openings/windows 1112, 1114 includes side portions to support the portion of the bracket forming the upper portion of slot 1108. With the opening or window 1112, swipe bracket 1102C can also function as a data transfer bracket to transfer data between cards 100g and 100h.

It is to be understood that an embodiment of a portable swipe bracket according to the present disclosure can include a power supply to operate card 100g and/or card 100h, charge card 100g, and/or allow for extended use of card 100g while in the swipe bracket. In an embodiment, the brackets can be communicatively coupled or docked to another device, such as a cell phone, laptop computer via serial bus or Bluetooth™, electronic tablet, or a Wi-Fi access node. Additionally, any embodiment of a swipe bracket can include one or more openings or windows of optically transparent material allowing for optical communication between cards and/or to allow for user input to a major surface of the card 100g and/or card 100h. Also, an embodiment of the swipe bracket can include operational elements (not shown), such as hard keys on the bracket portion or the base, to allow for one or both card users to interface with cards 100g and/or 100h and the extended card system (see, FIG. 1).

Figure 12:
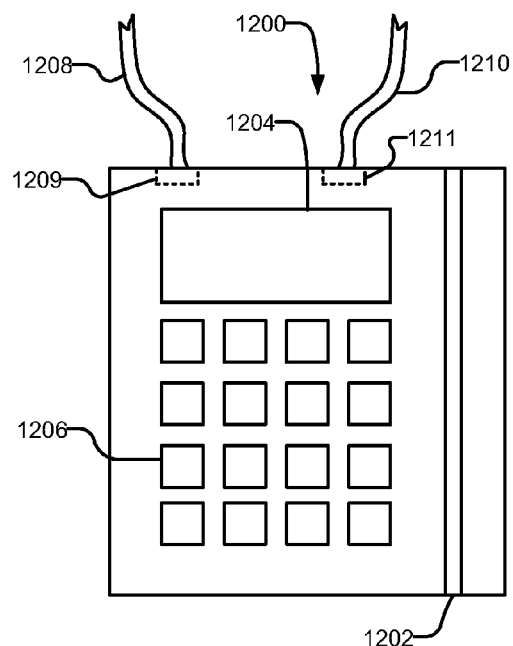
FIG. 12 is a diagram of a conventional or legacy card reader.

FIG. 12 is a diagram of a conventional, or legacy magnetic swipe POS reader 1200, which includes a slot 1202 for swiping a card adjacent to a magnetic head, a display 1204 such as an LCD touch panel display, and a set of operational hard keys 1206, although some readers do not include operational hard keys. Reader 1200 also includes a power feed line 1208 that supplies power to the reader 1200 and a data feed line 1210 that allows reader 1200 to communicate with a remote verification server (not shown). The power feed line 1208 connects to a connector 1209 at the back side of the housing of reader 1200 and the data feed line 1210 connects to a connector 1211 at the back of the housing of reader 1200.

Figure 13:
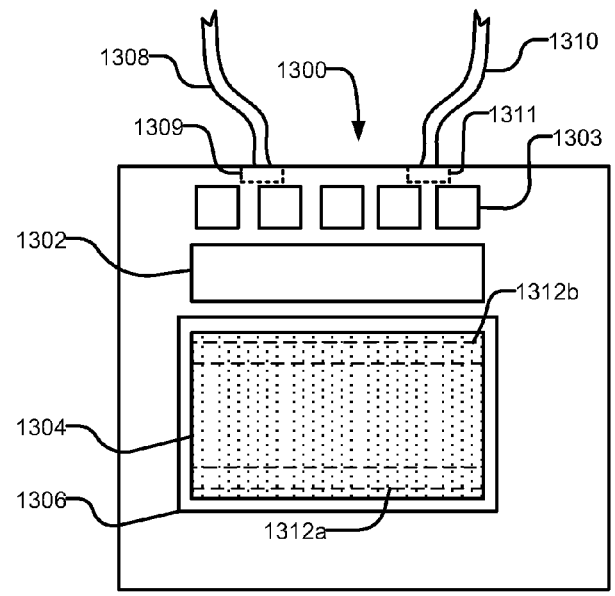
FIG. 13 is a diagram of a point of sale (POS) card reader according to an exemplary embodiment.

FIG. 13 shows an exemplary POS card reader 1300 according to the present disclosure. Unlike the legacy card reader 1200, card reader 1300 does not include a slot for swiping a card and instead reads and writes in a flatbed manner. As shown in FIG. 13, reader 1300 also includes an auxiliary display 1302 and operational hard keys 1303, although another embodiment may not include one or both of an auxiliary display and operational hard keys. To perform a card read, the user places a card in the area of the display 1304, which is surrounded by frame 1306. A power feed line 1308 supplies power to the reader 1300 and a data feed line 1310 allows reader 1300 to communicate with a remote server. The power feed line 1308 connects to a connector 1309 at the back side of the housing of reader 1300 and the data feed line 1310 connects to a connector 1311 at the back of the housing of reader 1300.

Frame 1306 around the display 1304 can be configured to hold the card square to the surface. For example, an embodiment of reader 1300 can include two adjacent sides of frame 1306 raised above the outer surface of the display 1304 and including a corner to assist a user in placing the card on the display and allow the user to slide the card off in a direction away from the raised sides. In another embodiment, the entire frame is raised above the outer surface of display 1304 and ejectors (not shown) having, for example, a plastic (soft) bottom on left and right side, cock the card up so the user can get it back without difficulty. In an embodiment, the magnetic levitation function of the card can also be present in a more modern version of the terminal-based point of sale system that allows the point of sale system to levitate the card, which eliminates touch or contact. This feature can prevent the spread of disease and protect the card from wear and tear.

Display 1304 can include elements of the card of the present disclosure and at least include light emitters and light receivers/detectors, such as those described above with respect to the first/second light emitting units 122, 124 and first/second light detection units 126, 128, and a magnetic stripe reader/writer along at least areas 1312a and 1312b. In this way, reader 1300 can optically communicate with a card according to the present disclosure and can read magnetic stripes of both legacy cards and cards configured according to the present disclosure.

Figure 14A:
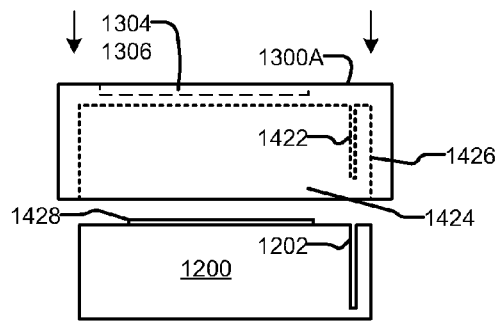
FIGS. 14A to 14C are diagrams illustrating a card reader configured with a legacy card reader using exemplary conversion techniques.
Figure 14B:
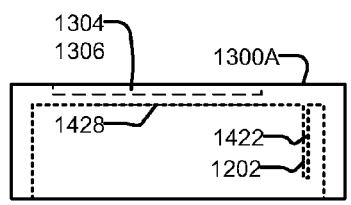
Figure 14C:
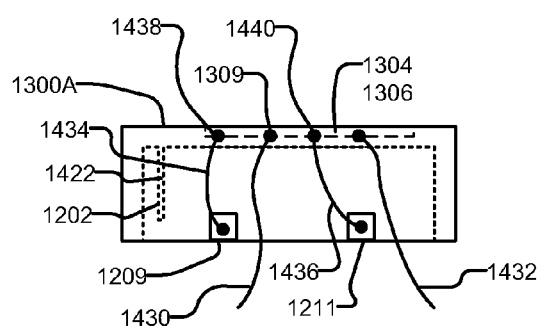
Figure 18:
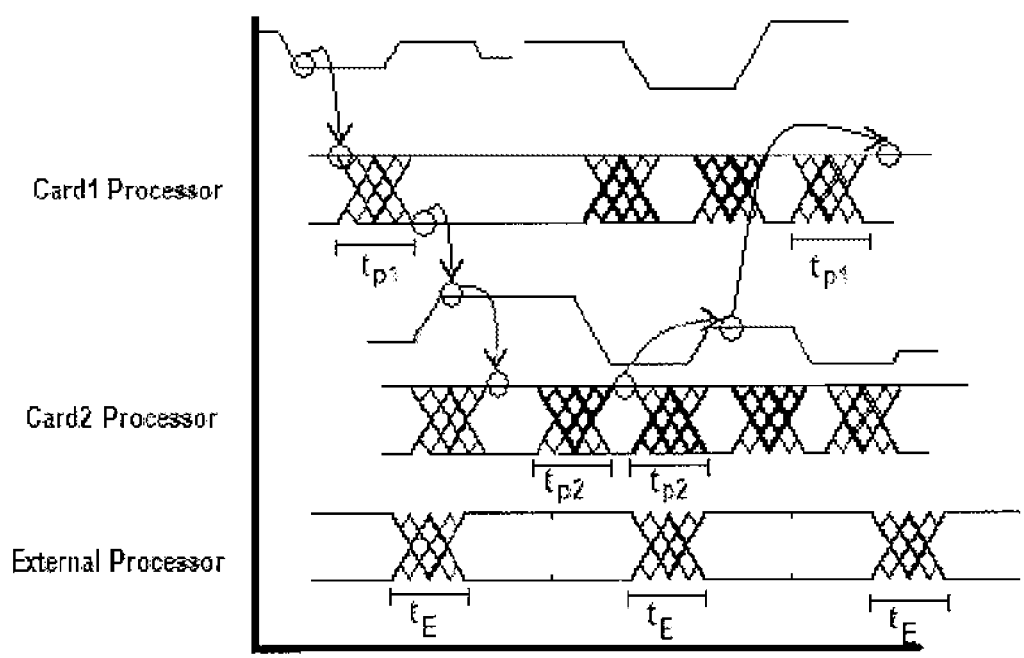
FIG. 18 is a timing diagram showing issues that can arise in the transference of data between cards in a docked stack, or involving an external POS device. At least some data must be relayed through an intermediate card in some cases, and acknowledgement or other data may also pass in a direction at times opposite the direction of data transfer. Processor latencies are approximately illustrated for a system which may include multiple cards and/or an external processor.

While legacy readers can be replaced with a reader according to the present disclosure, such as reader 1300 described above, there may be a need to communicate through a legacy type card reader (i.e., swiper box) because the POS system will not run if it does not see its old swiper box. In such a situation, the old swiper box can be emulated using a fast and easy configuration that converts a legacy magnetic swipe POS assembly to a form more suited to advantageous use of the card features disclosed herein, particularly the optical ones including flatbed read and write, without removing the old unit. As shown in FIG. 14A-14C, a vendor may simply affix an optical display/reader emulating the card of this disclosure to the old assembly (or a new display/reader much like the card of this disclosure), simplified attaching mechanism, such as industrial 2 sided tape and a cover designed with rubberized gaskets so as to dock solidly with the legacy reader. It may also be necessary to load software into the POS system of the kind which is known in the art or readily configurable to manage proper operation of the elements described herein.

FIG. 14A is a front view diagram of the legacy card reader 1200 and a reader 1300A, which is conversion modification of the above reader 1300. The reader 1300A includes a member 1422 insertable into the slot 1202 and sidewalls 1426, which are shown in phantom behind the front panel 1424 and guide the reader 1300A to cover the legacy reader 1200, although another embodiment may not include extension 1422 and/or sidewalls 1426. An adhesive 1428 is provided on the legacy reader 1200 (and/or the reader 1300A) and the reader 1300A is slid over the legacy reader, as shown by the arrows. FIG. 14B is a front view diagram showing the installed reader 1300A. FIG. 14C is a rear view diagram of the installed reader 1300A showing a wiring configuration for connecting power and data lines between the legacy reader 1200 and reader 1300A. Lines 1430 and 1432 correspond to the old data and power lines 1208 and 1210, respectively, and are now connected to the incoming power connector 1309 and data connections of the reader 1300A. Line 1434 connects between a power-out connector 1438 of reader 1300 and power-in connector 1209 of legacy reader 1200 to provide a power tie-in between the readers 1200 and 1300A, and line 1436 connects between the a data-out connector 1430 and the data-in connector 1211 to provide a data tie-in between the readers 1200 and 1300A.

FIG. 15A is a diagram of a tethered version of user card 100 according to an exemplary embodiment, although embodiments of card 100 can be configured as tethered or non-tethered versions. A tether or patch cord device 1510 can connect to another device 1502, which includes a head end 1514 that interfaces with card 1500 and a tail end 1516 that connects to device 1502 through an interface such as a serial port of device 1502, and a cord 1518 including wiring and/or optical fiber and attaching head end 1514 and tail end 1516. Tether device 1510 communicates with at least one port of card 100 that is accessed with optics and/or magnetics.

Tether device 1510 can be used to gather data from card 100 and pass it to another device, such as device 1502, and pass data and/or power to card 100 from the other device 1502. The tether can also be used to configure and/or reset the card. Device 1502 can be, for example, a cell phone, a smart phone, an electronic tablet, a laptop computer, a transformer device providing transformed power, a vehicle having a compatible or adaptable interface. Contemporary versions of these devices generally have a port, such as FireWire™, USB, HDMI, 100faseT, or some other type of serial or parallel port, which would serve as the interface for tail end 1516 of tether device 1510.

While FIG. 15A shows an embodiment in which tether device 1510 is magnetically attached to a major surface 101, tether device 1510 can be provided adjacent a major surface 101 or 102 of card 100 in a number of ways, including providing a suction cup type attachment on the tether head end 1514 to attach to the card surface, including or utilizing a physical bracket or clamp holding a surface of the tether to the surface of card 100, including or utilizing a clip that holds plural surfaces of a tether to each side of card 100 at the same time, or some other mechanism that maintains relative positioning between card and tether 1510. In an embodiment, tether 1510 can be hand held against the card surface. In an embodiment, tether device 1510 can be part of a dual sided tether allowing for redundancy or higher data transfer speeds, and a clip, clamp, or bracket can hold the plural surfaces of such a tether to each side of card 100 at the same time. A clip could attach and become immobilized through magnetics to allow for rapid and simplified disconnect from card 100.

FIG. 15B shows a side view diagram of an exemplary embodiment of tether 1510. Tether device 1510 can have an angled configuration (e.g., right angled) where head 1514 meets cord 1518 or no angle at all such as an in-line configuration. The tether shown FIG. 15B is a in-line tether 1514 including portion 1520 including a magnetic element, which can be a permanent magnet or electromagnet, or ferromagnetic material that is attracted to a complementary ferromagnetic material, or permanent magnet or electromagnet provided in card 100. These complementary magnetic materials and formed of a shape and positioned such that tether head 1514 attaches to a predetermined area of the major surface 101 or 102.

In an embodiment, light receiving detecting units 126 or 128 working with processor 110 can recognize the approaching tether using either image recognition or optical communication between card major surface and tether head surface and accordingly illuminate or otherwise indicate on the approached major surface 101 of card 100 an area of card 100 including the magnetic device to which to attach tether head 1514. The tethered version of card 100 can draw power from the host device 1502 to allow card 100 to operate power intensive elements, such as display-related elements. For example, the tether head 1514 can house a wireless power delivery mechanism, such as a moving solenoid in the tip of the tether that interacts with a coil (not shown) embedded in card 100 to provide a charging current. The tether can be modular. In an embodiment with tethering enabled, server 200 can determine whether or not card 100 is in proximity to a designated cell-phone or mobile device, for example, it is more likely to be legitimately used by the proper user if one or both the two designated devices are in proximity and can be disabled if not.

FIG. 15C is a front view diagram of tether 1510 showing a surface 1522A of head 1514. In an embodiment, head surface 1522A can include optical elements and/or magnetic elements, such as intermixed arrays of light emitting pixels, light receiving/detection pixels, magnetic-in pixels and magnetic-out pixels similar to magnetic and optical elements present below major surfaces 101 and 102 of card 100. Tether head 1514 includes conversion circuitry (e.g., microelectronics) that can convert a serial or parallel data stream from serial port in tail 1516 to data transmitted over optical and/or magnetic based channels established between the card 100 and tether 1518, and convert received optical and/or magnetic data and convert the received data to serial or parallel data stream to be transmitted to the interface at tail end 1516 of tether 1510. When attached to major surface 101 or major surface 102, card 100 and tether 1510 perform magnetic and/or optical handshake in which tether 1510 passes it identification information and optically and magnetically communicates with the connected device 1502. Hence, tether 1510 can deliver industry standard communications formats at the tail end 1516 through conversion electronics powered in and housed in the tether, for example, in head 1514. It is to be understood that the head surface 1522 may include any subset of intermixed pixel arrays, for example, only light emitting pixels and light receiving/detection pixels. Tail ends of tethers, such as tail end 1516 shown in FIG. 15B, can include such common devices as ear buds, headsets, speakers, etc., for example, instead of a serial or parallel interface.

FIG. 15D is a side view diagram of a tether 1510a that includes heads 1514a and 1514b at respective ends thereof. Each of the heads 1514a and 1514b are substantially identical and can be the same or similar to head 1514 described above. The present embodiment can be used to provide optical connection between card 100 and one end 1514a of tether 1510a, and optical connection between the other end 1514b of tether 1510a and another optical and/or magnetic interface. For example, tether 1510a can be used to transfer optically transmitted data from card 100 to a cell phone or a computer display including an intermixed array similar to the card 100. In an embodiment, each head 1514a includes conversion circuitry (e.g. microelectronics) at both tether ends 1514a and 1514b. For example, one or more CCD pixels provided at one tether end 1514a can receive one or more photon streams received from card 100 and convert the received photon stream to an electrical signal, which in turn is converted back to a photon stream by conversion circuitry at the other tether end 1514b. A similar conversion can be made in the opposite direction from tether end 1514b to tether end 1514a.

In another embodiment, tether 1510a can include optical channels through the entire length of cord 1518a such that the conversion circuitry described above is not needed. FIG. 15E is a front or rear side view of a head 1514c, where surface 1522b of head 1514c includes optical fiber 1524. While FIG. 15E shows a bundle of 7 individual optical fibers, head 1514c can include more or less fibers.

In an embodiment, card 100 and system 1 allow for cloning cards. Card-to-card cloning can be appreciated by considering the cards shown in FIGS. 9B-9C, for example, in which one card 100d is the card to be cloned, or "original" card, and the other card 100c is a destination card in accordance with the present disclosure. FIGS. 16A and 16B are a diagram of an exemplary legacy card that can be cloned using card 100. As shown in FIG. 16A, a first major surface 1601 of legacy card 1600 includes an indication that it is a driver's license, an image of the licensee 1602, an image of the licensee's fingerprint 1604, a smaller image of the licensee 1606, a retinal scan 1608, and other information and images such as identification information, an expiration date, and a watermark and/or hologram (not shown). FIG. 16B is a diagram of a second major surface 1610 of legacy card 1600, which can include a magnetic stripe 1612, a bar code (not shown) and other information typically found on the reverse side of a license. Of course, FIGS. 16A and 16B show but one type of a seemingly endless variety of cards that can be cloned using card 100 and system 1 according to the present disclosure. The types of "cloneable" cards include credit cards, bank cards, business cards, brokerage cards, secure identification cards, entry cards, and others. As another example, a Social Security card could be among the items stored in card 100 or accessible to the card so card 100 and system 1 can serve as secure storage and displayer of official single- or multi-identification cards or displayable information. As can be seen, card 100 and system 1 can provide positive, certain, reliable, and encrypted information, such as identification information, for the user.

FIG. 16C is a diagram illustrating the cloning operation being performed between card 100 and legacy card 1600. Card 100, being in full size credit card conformation, is capable of capturing all art, text, graphics, images, holograms etc. present on the surface 1601 of card 1600 using the light detection unit 126 or second light detection unit of the major surface 101 (or major surface 102) of card 100 facing first major surface 1601, as indicated by the arrows between the cards. After capturing the information of first major surface 1601, card 1600 is flipped and the process is repeated to capture information of second major surface 1610. The captured information of card 1600 can be stored in the card and/or server 200 (see, FIG. 1), for example, in memory 114 of card 100 or in database 250 accessible by the transaction/ID/access card management unit 234. When selected, the captured images of the major faces 1601, 1610 of card 1600 can be displayed with mirror-image correction and can be displayed simultaneously with the mirror-image correction so that the result is a digital clone of the analog legacy card. It is to be understood that some legacy cards may require capture of only one a single-side of the card. In this situation, an embodiment of card 100 can be configured to display the captured card single-side image on only one major surface 101 or 102 of card 100, or both major surfaces 101, 102 of card 100 can display the same single-side captured image.

Magnetic stripe (or magnetic layer) used to communicate or handshake while cloning helps keeps counterfeit devices out of the stack. In other words, the combination of display close in and magnetic stripe makes it very hard for public enemy to get into the mix, without making a complete counterfeit device. Without the proprietary encryption combinations disclosed herein, when the counterfeit is asked to handshake and set up its magnetic stripe or magnetic image using portions of the whole surface, for the second stage handshake, it will fail. Additionally, there are typical standards in data processing, including encryption during transmission and reception. The card 100 and system 1 disclosed herein, in some embodiments, emphasizes initialization of a connection and just the primal handshake. These steps can also incorporate the aural embodiments described throughout this specification, with respect to piezoelectric elements included in card 100, adding the aural tertiary function of sound out and in, across the entire surface on both sides of card 100.

In another embodiment, a card pertaining to medical insurance or other medical products services can be emulated or cloned using card 100 and system 1. In this case, the medical card may well not have any stripe, but instead includes a bar or Qr code or the like in the place where a stripe may be, perhaps on the back of the card. It is possible that an emulation of such a card will not be properly displayed, especially if both sides are required to be imaged. Typically such cards are read by medical support personnel who may be in a hospital environment or small office where magnetic stripe equipment may not be available, but optical capture of essential images may nevertheless take place.

Such medical-related cards are further often required to be cloned. In the United States, for example, health insurance is often linked to employment so that in any given household, though one person may primarily be the owner of the card, many others may be required to carry them.

Benefits to secure transactions in the case of medical cards may not only include verifying that the card user is authorized, but also in the case of avoiding medical mistakes. In accordance with and embodiment, a certain procedure or diagnosis may be securely associated with a certain person, even if the person is unconscious or unresponsive, as in the case of an anaesthetized person scheduled for surgery or an accident victim who has a known condition. In such a case, the person's biometrics can easily be made still available, for example, a fingerprint. Thus it may be verified on the way to the operating room that corrective surgery to the right limb of the right person, for example, is being applied, and the same card may still continue to contain all of the information pertaining to diagnosis, provision of secondary medical treatment such as physiotherapy, allergies, prescriptions and so on. A person thus securely tracked could potentially even be moved last-minute to a different facility without fear of losing track of information. Naturally the same virtual card, complete with other stored cards, could also be used by an enterprising user to negotiate treatment rates and other details while still in a medical waiting room or simply arrange to pay wirelessly for continued parking while the procedure is ongoing, or make appropriate purchases. Since the device can, as mentioned elsewhere, serve purposes of value to a hospital, an incentive exists for the same hospital to allow patients to use the device in such a way not to overly interfere in the way known to cell phones in such environments. The hospital may further have power to restrict use of the device, if desired or necessary.

As technology advancements evolve, the card will have more pixel density (light emitting, light receiving, magnetic-out, and/or magnetic-in) per unit of measure (e.g., square inch). As such, the newer cards can always input data from older ones. Compatibility for basic card-to-card communications (i.e., face-to-face) is assured, since increased pixel density requires only a knowledge of how to align to prevent misalignment, as may be appreciated by considering two cards show in FIG. 17 in which the pixel densities of the two cards is unequal. As shown in FIG. 17, an older card 100 in accordance with the present disclosure can have a pixel density of X×Y and a newer "next generation" card 100' can have a pixel density, for example, of 10X×10Y, as illustrated by the relatively darker shading of card 100'. Newer card 101' can auto-program for compatible data transfer by array assignment in blocks. For example, as shown in FIG. 17B, one pixel of card 100 can translate to 100 pixels of card 100'.

In this way, the present disclosure provides a device that, while keeping all the POS and internet marketing capabilities, gives the user an incentive to adopt this specific form factor with maximal two-way display in place of other solutions.

This would represent perhaps one of the only technologies that allows the card to increase its throughput 100 fold as the technology evolves, yet, still communicate fully with older cards. The architecture of the data transmission and reception means does not have to change, only the density changes (until such time as it is desired to change the individual pixel emission or individual light detection (e.g., CCD) collection algorithm and even then, the older methods can still be automatically supported). As densities grow ever higher across the surface of card 100, it becomes more and more possible to increase the presence of invisible water marks, pixels which do not detract from an image, as the human eye cannot detect them, however, advanced software can detect the pixels intended to provide a unique identifier for the image and, authentication methodologies, such as water marking. One way to accomplish this method is to use frequencies which are highly specific for the pixels which represent the water mark. Another method is to know, when the image is properly rasterized, which pixels are intended for human viewing and which ones are to be interpreted as more than the image, forming the water mark.

Returning now to FIG. 1, the functions carried out by server 200 is now described. Server 200 includes a processor 228, plural functional units, and a database 250 for carrying our various functions of the system 1. The functional units include a card/user authentication unit 230, a value analyzing unit 232, a transaction/ID/access card management unit 234, a tracking unit 236 that track card usage, patterns and other historical information related to card 100 and user, a docking unit 238 that manages docking of card 100 with various devices, and a data exchange unit 240 that manages data exchange function not handled by card 100, although embodiments of server 200 can include additional or fewer functional units.

The card/user authentication unit 230 handles processes related to identification, login, logout and related security features. In an embodiment, the card/user authentication unit 230 can require a "hard login" by the user that includes taking a series of biometric readings from the card user via authentication unit 142 of the card, which can be as numerous and performed in a given sequence, to uniquely identify the user with essentially perfect certainty and log the identified user into the card and the services supporting the card. As a user desires or as a system requirement, this could typically be periodic, for example, as a once a day event, while further use of the card (each actual use) still may require a minimum contingent biometric login, i.e., a "soft login" as compared to a hard login, so as to add to the security aspect. Should the user drop the card or lose it, based on time elapsed from that event, proximity (distance) from the card as detected by other docked elements the user carries, or a predetermined number of unsuccessful soft login attempts, the card may partially or fully log out and go into a fully secure mode requiring the maximum amount of login steps to recover the card's functionality In an embodiment, the card 100 login can migrate into computer and electronic device screens where, once the user has hard logged into the card 100, logging into machines during the hard log period (e.g., one day thereafter) may be accomplished with a swipe or holding the card to the other computer or other electronic device's screen, when and where designated (e.g., the larger screen of a computer or other device can tell you where to place your card for logging or other data transfer). As such, the assurance from the card and the assurance from the service supporting the card that the user is identified, passes in a simple step rather than a complex and time consuming series of steps. The user takes the complex logging steps perhaps once each day, and sets how long these complex logging steps hold until again required, or for what size or type transaction the user wishes the card and service to demand the complex logging steps, versus, a shorter form of logging (less biometric verification). Thereafter, logging to services through a machine, such as that presented as one traverses a network, can be accomplished with the hard and soft logging functions of the card, even to the extent of satisfying and replacing login tests such as the CAPCHA™ (Completely Automated Public Turing test to tell Computers and Humans Apart), as obsolete. In an embodiment, card/user authentication unit 230 can have the card take at least one, and preferably two or more forms of biometric readings from users via authentication unit 142 of the card as the card is used for any transaction, essentially in near real time or real time, and can shut the card down and halt a transaction if the affirmed (confirmed) biometric data is not present within a preset minimum of time, such as within a few seconds of the card read or write, to guard the user from identity theft or any other form of fraud. The level or hierarchy of biometrics required for a transaction can be set by the system 1 and/or as a preference of the card user, or a combination of both the system 1 and card user. For example, a user can set a hierarchy requiring at least one more biometric type reading than a hierarchy of biometric reading(s) set by the system 1.

As can be seen, the card and system disclosed herein allow highly secure use of card 100 and all of its capabilities through the heavy login procedure performed less frequently and the lighter login procedure performed more frequently, for example, as frequently as with each transaction. The heavy login procedure, although time consuming, thereafter, leverages the fact that the device will not fully log off from system 1 unless the user does not again use the card with the lighter login procedure within a given amount of time, or unless proximity alarms or any other alarm (such as a tamper alarm) are tripped, forcing the heavy login procedure to be undertaken again. Because all procedures can be encrypted and are complex, such as a high definition read of a finger print, the heavy login procedure being perpetuated throughout the day under these specific conditions provides considerably greater degree of protection to the user compared with merely requiring the lighter login procedure per transaction, without the existence of the heavier login procedure.

In an embodiment, kirlian examination of an object can be added to the biometric login function handled by authentication unit 142 of the card and/or car/user authentication unit 230 of server 200. In this embodiment, card 100 can provide charged coupled device (CCD) or light reading elements and magnetic read elements, which together with authentication unit 142 and/or card/user authentication unit 230, can closely examine the spectrum of an object, such as a finger, to the extent of mapping with a video and with still images, the kirlian field of an object, or the magnetic field of an object, or both. That is, by close examination of still shots, i.e., comparatively analyzing shots taken in the order and time differential the shots were taken, and video frames of the object's kirlian field, or magnetic field, or both, authentication unit 142 or card/user authentication unit 230 can draw conclusions about that object. One such determination is the presence of a pulse, by way of the action of capillaries and heartbeat of a living mammal. Another determination is analyzing a fingerprint or the kirlian field of the user's finger. Another determination is the micro-pulse placement within a capillary system which is unique per individual just as a fingerprint, and the overlaying maps of micro-pulse, capillary and fingerprint are equally unique, per individual. By combining these types of data with other metrics, such as capillary pattern, the login function can take this combination of data and process it to decide if the threshold for pass (or fail/deny), has been met.

The value analyzing unit 232 can carry out tasks normally associated with the user, such as having to cut, carry, or even scan in or purchase and then carry coupons and other discount codes, determine whether offers are locally available. In an embodiment, for example, in nearby stores, when the user is in a given location, value analyzing unit 232 can utilize location information generated by location unit 144 of card 100 and search network 210 to determine local deals or other offers and generate and communicate a message to card 100 to alert the user to such other opportunities pertinent to the transaction at hand or a transaction the user has indicated as being one in which he/she is about to undertake. Accordingly, the user can be kept aware of details relating to any deals that are available in the surrounding area while the user is in the process of shopping and purchasing goods and services. In an embodiment, value analyzing unit 232 can notify the user of offers or opportunities related to a transaction in the process of being made, but not yet finalized, which are not necessarily local to the user's geographic location or in a bricks and mortar venue.

In an embodiment, value analyzing unit 232 or alternatively, a service within card 100 can provide numerous filters or prerequisites or preferences that a user can set to indicate willingness to accept certain information provided by sellers or brokers while filtering out a wide variety of what would be considered unwanted advertisement(s) as part of the service supporting the card.

The disclosed card and system allow for simple and wide-ranging agreements that personalize the content of user-desired information. For example, when a card user creates a want list, or hears from the system 1 that an item on the list is more than 80 percent off, the user can be warned via card 100 that an object which meets with his/her criteria is available and within reasonable proximity, proximity being yet another factor the user can set as a filter which may be distance to the item in question.

The system 1 can distribute and decentralize the POS station, such that this mobile device may act in this capacity.

The transaction/ID/access card management unit 234 of server 200 carries out credit card functions (e.g., management of credit card functions) for the card 100. In an embodiment, card 100 can have an overall conformation that is compatible with credit card and other legacy embedded card swipe or read mechanisms. Card 100 can thus access older technology of magnetic swipe such that anything "magnetic swipe" or any legacy slot type insert magnetic reader is instantly compatible. Because there is a display, a lot of boundaries become "unbounded." It becomes unnecessary to display the credit card number, for example, just perhaps the last 4 digits only. If a user selects a function of the card, he can see all, if and when needed, as a guard. Bear in mind, one use of the card is to emulate all the hard cards, front and back, first through scanning face to face, then, by way of the display.

An embodiment of card 100 and system 1 allows for automated access to the contents of servers on networks by way of mining data related to an item (e.g., goods, services, rentals, or other item associated with a financial transaction) in a pending purchase of or an item the user may be considering in the process of purchasing, via communications unit 118 and network 210, and rather than only taking information from server 200, can provide information to server 200 to be added to previous information, redirect the information to another end point on network 210, or just redirect information from one place to another with the assistance of server 200. This serves to allow the user to traverse a venue over time, shop for items and scan them in, updating server 200 so the processing of the transaction and gathering of any perks, discounts and coupons can happen automatically, just as the tabulation of the bill of sale and payment methods are being processed in server 200, such that when the user arrives at the venue exit for final checkout, the preprocessed bill of sale and all transactions intended as one master transaction can be presented as completed. The tabulation can occur with no perceived delay for the user, or other patrons waiting in a cue (e.g., in a line behind the user). This also implies, although card 100 itself may only have memory capacity of x, through this method, capacity far greater than x, even to the extent of 1 million times x and exponentially greater still, can be directed and controlled by the card 100. In a sense, the card 100 can serve as a highly advanced memory stick with an almost unlimited storage capacity, i.e., limited only by storage capacity available to card 100 at server 200, for example, in database 250 and service backing the card.

In an exemplary transaction application, card 100 is used to scan an item, identifies the item and communicated with server 200. The value analyzing unit 232 of server can: (1) alert the user that an online venue has a better price or other better value for the item compared with the current venue and can facilitate a purchase at the online venue; (2) alert the user that the item is available at a lower price at another location, for example, a location near the user's location using location information from location unit 144; or (3) item price acceptable price, as determined by value analyzing unit 232, and the user decides to keep the item or to put back on shelf (a second scan or other action on the card can update the "put back" status). This can be repeated for every item the user considers using card 100 and items scanned and not "put back" remain in the user's cart (which can be a real or virtual cart). Card 100 keep a list of each kept item (i.e., in the cart) and card 100 forwards the list to server 200 via value analyzing unit 232. Until checkout, value analyzing unit can continue to search for all available perks related to each kept item. At checkout, card 100 passes the list of kept items to the venue's POS system electronically, although server 200 can pass all items in the cart to the POS system via network 210. In an automated embodiment, server 200 forwards the list and all gathered related perks to the POS system, and the POS system resolves the perks with the prices and charges the users account. In another embodiment, the POS system can handle some or all the functions carried out by server 200. In a legacy system or system that does not participate in the automatic checkout and resolution of perks, card 100 can present images to the user of bar codes for coupons or similar items that the user can redeem at the POS system. At the time of payment or prior to that time, value analyzing unit 232 or transaction/ID/access card management unit 234 can automatically select a payment method card, the user can select via display gesture recognition, and thereafter the card display the card, or the last used card can be displayed (for example, according to preferences), and card 100 also displays magnetic out data related to the selected payment method. The user can close, or complete the transaction card by swiping card 100 having the selected and displayed payment method and providing a signature.

Post-transaction, value analyzing unit 232 can have selected, for, example, XXXCreditCorp, which agreed to terms associated with use of card 100. Server 200 can, post-transaction re-address the transaction to: re-pay for each item differently or even pay for one individual item with multiple payment methods based on the information in the transaction/ID/access card management unit 234 related to the cards stored therein; apply coupons or other perks us to a limited date as a price protection guarantee; apply for rebates, provide information related to, and secure extend warranty; and other post-transaction conditions included with the agreement. Post-transaction actions can be preference-based, or preset by the system 1. "Best value" herein is used to indicate, but is not limited to, discounts from coupons, reduction in prices from specials, promotions, giveaways, etc.

Many capabilities and other aspects of the user card and system of the present disclosure are described in terms of sequences of actions to be performed by a processor or controller, which can be elements of a computer system or other hardware capable of executing programmed instructions, for example, a general purpose computer, a personal computer (PC), a special purpose computer, a workstation, a personal communications system (PCS), a mobile (cellular) telephone, a mobile telephone with data processing capability, an RFID receiver, a gaming console, an electronic notepad, a laptop computer, a global positioning system (GPS) receiver, or other programmable data processing apparatus. It will be recognized that in each of the embodiments, the various actions could be performed by specialized circuits (e.g., discrete logic gates interconnected to perform a specialized function), by program instructions (software), such as logical blocks, program modules etc. being executed by one or more processors (e.g., one or more microprocessor, micro-controllers, a central processing unit (CPU), application specific integrated circuits (ASICs), digital signal processors (DSPs), digital signal processing devices (DSPDs), programmable logic devices (PLDs), field programmable gate arrays (FP-GAs), and other devices designed to perform the functions described herein, and/or by a combination of any of the above. For example, embodiments can be implemented in hardware, software, firmware, middleware, microcode, or any combination thereof. The instructions can be program code or code segments that perform necessary tasks and can be stored in a non-transitory machine-readable medium such as a storage medium or other storage(s). A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents.

Circuitry and other hardware of the card's communications unit 118, such as a transmitter, receiver, transmitting unit, receiving unit, transceiver etc. can provide functionality, for example, through the use of various wireless communication networks such as a WWAN, a WLAN, a WPAN, and so on. The terms network and system are often used interchangeably herein. A WWAN may be a CDMA network, a TDMA network, a FDMA network, an OFDMA network, a SC-FDMA network, and so on. A CDMA network may implement one or more radio access technologies (RATs) such as CDMA2000, Wideband-CDMA (W-CDMA), and so on. CDMA2000 includes IS-95, IS-2000, and IS-856 standards. A TDMA network may implement GSM, Digital Advanced Phone System (D-AMPS), or some other RAT. GSM and W-CDMA are described in documents from a consortium named "3rd Generation Partnership Project" (3GPP). CDMA2000 is described in documents from a consortium named "3rd Generation Partnership Project 2" (3GPP2). A WLAN may be an IEEE 802.11x network, a WPAN may be a Bluetooth network, an IEEE 802.15x, or some other type of network, the CDMA may be implemented as a radio technology such as universal terrestrial radio access (UTRA) or CDMA2000, the TDMA may be implemented as a radio technology such as a GSM/general packet radio service (GPRS)/enhanced data rates for GSM evolution (EDGE). The OFDMA may be implemented by a radio technology such as institute of electrical and electronics engineers (IEEE) 802.11 (Wi-Fi), IEEE 802.16 (WiMAX), IEEE 802.20, E-UTRA (evolved UTRA), and the like. The techniques may also be used for any combination of WWAN, WLAN and/or WPAN. The techniques may be implemented for use with a Ultra Mobile Broadband (UMB) network, a High Rate Packet Data (HRPD) network, a CDMA2000 1X network, GSM, Long-Term Evolution (LTE), and/or the like.

In an embodiment QED (Quantum Entanglement Device) devices can be introduced to intermix quantum computing and quantum communications within system 1 and card 100, which adds to the security of system 1 and card 100. At some point, it will be feasible to equip one side of card 100, both sides of card 100, and/or all surfaces of card 100 with QED generating and detecting pixels. At the point where point of sale systems incorporate QED capabilities and when a public quantum entanglement network is established, all of the various methods and capabilities of system 1 and card 100 will be enhanced to the extent that communications will become utterly secure. In an embodiment, items to be scanned, which can include tangible items such as another card or an item in a store or intangibles, such as a service agreement or web site, can include quantum entangled particles which can be photons, electrons or other particles which are mated to a known entangled particle stored in a quantum entangled trap. With this evolution an item marked with a quantum entangled particle, can be identified as to its authenticity, its history and down to the unique instance of that item.

As used herein, the term "memory" refers to any type of non-transitory machine-readable medium, whether long term, short term, volatile, nonvolatile, or other memory and is not to be limited to any particular type of memory or number of memories, or type of media upon which memory is stored. Memory described herein, such as system memory 114 and database 250, can additionally be considered to be embodied within any tangible form of computer readable carrier, such as solid-state memory, magnetic disk, and optical disk containing an appropriate set of computer instructions, such as program modules, and data structures that would cause a processor to carry out the processes described herein. A computer-readable medium may include the following: an electrical connection having one or more wires, magnetic disk storage, magnetic cassettes, magnetic tape or other magnetic and optical storage devices (e.g., compact disc (CD), laser disc, digital versatile disc (DVD), floppy disk and Blu-Ray™ disc), a portable computer diskette, a random access memory (RAM), a read-only memory (ROM), an erasable programmable read-only memory (e.g., EPROM, EEPROM, or Flash memory), or any other tangible medium capable of storing information and combinations of the above. Memory can also include buffer memory that holds transmission data to be transmitted by the transmitter of communications unit 118 until the data is transmitted and/or data received by the receiver of the communications unit 118 until the received data can be processed. Although FIG. 2 shows memory 114 as separate or external to processor or controller 110, memory may be implemented within processor or controller 110 or another processing unit.

In an embodiment, card 100 has a credit card form factor, size, shape and thickness of a standard swipe card and processor 110 is preferably a microprocessor or microcontroller chip that manages files stored in the memory 114 assigned to the card applications via a card operating system (COS), and memory for carrying out these functions is preferably a combination of nonvolatile (e.g., EEPROM or flash) and volatile (e.g., ROM) solid state devices. In an embodiment, the type of COS used in card 100 is a dynamic application card operating system that enables developers to build, test and deploy different on card applications securely. Card memory also includes at least one programmable magnetic stripe that stores information magnetically.

It should be noted that the system of the present disclosure is illustrated and discussed herein as having various modules and/or units which perform particular functions. It should be understood that these modules and units are merely schematically illustrated based on their function for clarity purposes, and do not necessarily represent specific hardware and/or software. In this regard, these modules, units and other components may be hardware and/or software implemented to substantially perform their particular functions explained herein. The various functions of the different components can be combined or segregated as hardware and/or software modules in any manner, and can be useful separately or in combination. Thus, the various aspects of the disclosure may be embodied in many different forms, and all such forms are contemplated to be within the scope of the disclosure.

The bidirectional display of the card 100 with optionally full PC functionality and having invisible magnetic layer which can be instantly programmed to function as stripes thus allows for the greatest resolution display, for example, to view an otherwise unseen water mark or hologram, while at the same time providing versatile credit-card form factor functionality either in legacy magnetic stripe readers or in an equally secure optical financial transaction.

The display has many uses. Because the display is an output device, it may be used to augment the magnetic swipe. For ID purposes, but also, to alert the user to other opportunities pertinent to the transaction at hand or, a transaction the user has indicated as being one in which he/she is about to undertake, to get the full details of any deals he or she is entitled to.

As is the case with current VVLSI, pixel, or CCD related technology, we are embarked upon mission to see continually increased density and lower power consumption and waste. HD TV is but one example, however, there is merit in densities beyond what is useful to the human eye. These super high densities yield card-to-card, and card-to-device (equipped with technology similar to card 100) communications pathways that are difficult to clandestinely intercede within. The combinations of higher density of any pixel type, sound, light, magnetic or other, and the intermixing of these types to handshake, encrypting within each protocol, thereafter, the use of the pathways to send and receive data and, the use of many pathways to output Trojan signals tightens the card-to-card and card-to-device security to so high a level, not only would a public enemy have to have the same technology or better, they have to physically get in between the two cards or card to device, they then have to discover which signals are real and which are Trojan, thereafter, break encryption across multiple protocols, such as light, sound and/or magnetic. Further, the present disclosure is not to be limited to two cards or card to device communication, but is applicable to any device with this technology fully integrated, communicating with another device with this technology, fully integrated. Always, with a super computer, there are odds and calculation which provides for how long it takes to interpret and decrypt a signal. However, in this case, the public enemy must crack billions of possible pathways to then know what to process. At this time, the inventor believes it would be impossible to crack the communications pathway and clandestinely access the data.

Further, use of dark processing and dark memory in the card can add yet another level of protection. In this disclosure, the concepts of dark processing and dark memory mean VVLSI circuitry from which query functions have been removed. Thus, the circuitry can take in data, process, run software and output data but has had its troubleshooting and inquiry functions removed at the factory and will not allow new programs to be entered into the array, or, new programs can be entered but only through a complete re-burn cycle which can be detected). By incorporating the elements of dark processing and dark memory (and all other supportive components or circuits which could be otherwise queried), the public enemy gains nothing through dissection of a given one of a card according to this disclosure.

A user interface and apparatus that determines other features of objects for identification of the object can be used with the system, along with image processing to recognize or measure. This works with virtual touchscreen and fingerprinting with a general machine vision approach.

The whole surface being a light receiving/detection device takes away from the complexity of "scanning a finger print" and brings in the new complexity of "scanning more of the finger, perhaps the whole finger in 3-D (meaning, all sides). When the card of the present disclosure scans a finger, (or thumb, throughout this specification included in the word "finger") it may scan the whole finger for more certain ID, by requiring the finder to be rotated during scanning. It could be, card 100 may supplant a driver's license and States adopt the idea to save money. The States get to charge the same at DMV, take your picture, but after that, you get the full license via electronic communications. The States could even have similar technology at their POS terminals requiring your in-person capture of your license.

In this way, the present disclosure provides a device that, while keeping all the POS and internet marketing capabilities, gives the user an incentive to adopt this specific form factor with maximal two-way display in place of other solutions. In some embodiments the card may emulate a touch screen without actual touch, by virtue of being able to detect through the imaging pixels and process internally, using advanced image processing techniques (e.g., DSP (Digital Signal Processing)). Thus, the card user can navigate through screens and make selections of display icons and files as though using a touch screen. Some embodiments may provide a lens, or microlens arrangement along the surface, gathering light to a patch of CCD or CMOS pixels to form a net sum image based on the (possible multiple and/or non-visible) frequencies of light being detected. Card 100 encompasses a credit card surface area capable of detailed up close images, such as retinal scan, finger print or a plastic credit card pressed up against the card. Images captured in this manner may aid in emulating the old card, thereby acquiring the look of the old card and its magnetic data. A user may then store the old card in a safe place and never need carry it again.

This smarter card, as envisioned by the present disclosure, provides many new uses as a tool for vendors. For example, in the case that a vendor or vendor's representative may wish to display an image of merchandise not readily available for viewing, a corresponding bar code can be provided on the representative's smart card, enabling a sale to take place without further arrangement. In such a case both POS and buyer cards must dialog securely using optical media since availability of a card-swipe reader is not guaranteed.

The card is bidirectional. It can send and receive data simultaneously. In the face to face mode, with almost no air gap, the card could routinely use its infra-red and ultra violet as well as visible outputs and inputs to detect any membrane put in to intrude. Thus data can pass from card to POS, for example, and POS to card. When card is docked, or, if it has a wireless adaptor, the card can also send and receive data through that connection. By combining handshake and data transfer across optical, magnetic and aural pathways, such as connection is impregnable to any third party interference, sent as it is from screen to screen data is passed between numerous pixels or banks of pixels. Much of the output and input emitted by most of the pixels could be Trojans, further intended to throw off the public enemy.

Some embodiments may include forcing the data passage and decryption to go in stages, so there is time for the card to gather in the perks and apply them.

The card can take on the "personality" intended, corresponding to the card chosen as "active" and can indicate it with its display. The display can also serve as a communications tool. As POS systems become more feature rich, the card can, for example, pass a facial image and ID info to the POS operator.

So, rather than having to ask for an ID, the card is the ID, doubling as the credit card or debit card. The picture is encrypted in and can carry the state logo and driver's license info, which certifies that the card, the VISA account and the image of the user, are all one in the same, e.g., the card cannot be stolen if the image on it of the user is very clearly identifiable, and carries the state encrypted water mark assuring that the user's identity is passed with the transaction in order to minimize impact to the economy from fraud. The POS system, if improved, could blow up the picture of the user, thus enforcing the idea that the person needs to match. Further, the POS system could incorporate its own CCTV camera and compare the person's real, face-to-face image with that just passed from card 100. Therein, automatic alerts could be tripped to protect the venue and the real user and owner of card 100.

It could be said, as a side bar note, card 100, being endowed by emission and collection capabilities on both sides, and with a possibility of a plurality of emission and collection technologies, uses at least one of magnetic and optical, for an embodiment now, which reaches back to incorporate legacy readers, and may add more read and write technologic functions to evolve to the future point of sale systems. An example would be to use the mag, light and aural aspects in a flatbed type POS system, handshaking, passing data and emitting many Trojan signals, to absolutely lock out the public enemy.

A business such as a restaurant, building material store, or courier can employ or subcontract to mobile employees to interface with customers. Card 100 can assist in this regard, in that it is a portable POS in its own right. For example, food table-service personnel, floor-walkers, or delivery workers can be equipped with wire-free devices to provide help information from the store database, accept payment from customers, or to simply communicate on a casual basis. The restaurant may provide a mobile platform, such as that proposed in the present disclosure, for employee use. Further, savings to the employer can result if employees use their own device if care could be taken to create a barrier such as a login account between personal and work-related software running on the same platform. If an employee has card 100 already, that employee's card 100 can becomes automatically known to the restaurant network as a function of the card and its supportive services.

Furthermore, a buyer may wish to inquire about related art work not on display. Seller may show, for example, a slide show of related art held in inventory, with barcodes demonstrably associated with each slide show item to assure the buyer of accuracy of the transaction. Thus, the present disclosure provides for an improved decentralization of the POS, especially in that temporary staff may contribute to the smooth functioning of the business without requiring a large investment. Decentralizing the POS provides at least these benefits.

The card can read more than bar codes. It actually can look at the item and scan any other markings to help ID it or find close matches. This works with virtual touchscreen and fingerprinting with a general machine vision approach. A user interface and apparatus that determines other features of the object (like color, texture) for identification of the object can be used with the system. This implies by its nature, a two or three dimensional search function which further implies, libraries of images which are more pixel-ized than current data structures. More pixels matter, because software can detect them and compare images in a search and as such, the idea that there can be more uniquely identifiable images is supported by the ever increasing pixel densities. Arguably, two watches, side by side, made by the same manufacturer, scanned in 3 dimensions, cannot be identified one from the other at say 1 million by 1 million by 1 million pixels per square inch. However at 100 billion by 100 billion by 100 billion pixels per square inch, in a completely accurate scan of the items in question, there will be visible, vast differences between the "like" objects, so much so that 1 million of these objects will be immediately uniquely identifiable one from the next, due to manufacturing processes leaving unique markings on each item, at that level of magnification 100 billion pixels per planar image, reveals.

As part of POS system improvements, data can be passed in two groups. Group 1 is the items you are buying, if pre-scanned, or the POS operator has to scan them all in and the card picks up the list in its first receipt of data. The card then asks the supportive service for any and all perks based on the list, and they are applied. Now, the payment is rendered. The data burst needed to pass the coupons and payment method(s) constitutes Group 2. These data bursts need only be tenths of a second in duration and tenth's of a second apart.

When the items are already coded uniquely, nothing needs to be touched, just loaded on your cart and go. Your POS could, if the item codes (e.g., bar, ocr, or qr code) are not unique, additionally the user may add his or her own to the box, or, ours displays one master OCR (bar code) or Qr and that one code points to a server file with all the items in it already. The intent is to give the venue's POS system all the data, either face to face, or through the internet or another network, before you arrive at the front. Thus it is only necessary for the user's device to correlate a single Qr or OCR bar with the POS system, which would point their system to a single record already in their server which your personal/portable point of sale system already processed in. The latency and processing time for the POS is reduced, as may be appreciated by considering the timing diagram shown in FIG. 16 in which the external processor corresponds to a POS Bar Code reader and only one card is present.

Within this feedback loop involving a number of integrations, encryption, security, forensics, the fingerprint of the user may be re-verified to state records for each transaction with this feedback loop. The display, perhaps looking like today's holographic driver's license (e.g., the state of Virginia uses holographics) now includes a finger print. In general any part of the body could be "imprinted" as a biometric and the whole surface of the finger may be included for a higher form of security. So too, with objects the user will have on their person, such as using a scan of their watch as a step in logging, or their lip print, or ear print.

Further security may be provided by software methods. For example, as each card has 3 different elements on two sides, for a total of 6 total base elements: 2 displays, 2 magnetic stripe surface, and 2 CCD surfaces. Each one gets a unique ID so when you do any form of transaction, those unique ids are passed. Counterfeiter is surely not going to get in. The same application of unique identifiers assigned permanently to each element, applies to each side equipped with peizo, for the in and the out function.

In a modern, adapted POS (system) we can make this claim as we use the bidirectional display to interface, and we could take a snap shot of the print of the user to complete the transaction.

Later, for auditing, the card passes the snap shot to a server, while the POS also has the same snapshot. We can audit and reconcile the event, proving it was you and no record has been falsified. Store owners and credit card companies are a bit powerless to fight when users say their card was stolen and a given purchase was "not them."

The display may serve as ID. POS operator can check ID as the card is scanned. Any time a transaction is contemplated, the user can show electronic ID. As the platform becomes more commonplace with increasing users ID with proper encryption and perhaps state authorization may replace older forms of ID. The display is designed to emulate a driver's license. The credit card form factor, is an accepted standard. Emulate a driver's license underscores the shape (form factor) even further.

In today's high speed and complex world it is easy to appreciate how a blurring may develop between security commerce. Thus, a credit card may be required for a transaction, but a driver's license or other document may be additionally required under certain circumstances: age-sensitive purposes, medical transactions, and so on. Furthermore in a world of increasing security concerns and also the increasing technological capabilities to replace POS personnel with machines it is easy to see that the need for security in transactions is likely to increase.

Previous efforts to convert personal wireless devices, such as the cell phone, have produced a myriad of interfaces, some built in to a cell phone, some as dongles or apparatus attached to the cell. In all cases, the care disclosed herein is instantly backwards compatible by way of its programmable magnetic layer, as described further herein.

As described in more detail below, joint transactions involving multiple cards may occur. Furthermore, such transactions could entail the passing of optical data (since certain operations, as described in the same place, may involve multiple cards 100 according to the present disclosure without a magnetic POS reader), which becomes complicated for other reasons, such as cards with secure optical data encoded in areas which normally correspond to the location of a magnetic stripe. Coordinating the juggling of display data between cards, such as moving the display on one card to get around the obstruction of an opaque magnetic stripe on another, would add latency time and multiple steps to processing which would encumber the transaction. Thus, a need exists for smart cards capable of optical dialogues in which the magnetic stripe is rendered transparent so as not to obstruct data. In the case where transactions as described herein, or parts thereof, have access to a magnetic stripe reader, the smart card may augment the functionality (such as security and so on) through the use of specific, modulated, handshaking or other variations in magnetic data to accompany the optical data.

As applicant has verified, a thin film display which may serve the display purposes as described herein, provides no substantial impediment to magnetic fields. Since the thin film display may act to create whatever display it is directed to create, the micro coil or other generator of the magnetic field may be behind, or beneath it, and if necessary an opaque layer may lie between the two simply to prevent hardware details from "showing through" and becoming confused with the image. In the interest of providing the display with a uniform background, the opaque layer may cover a greater extent, possibly including the entire area of the card under the display. Additionally these same attributes may apply to both sides of the card.

Furthermore, in a preferred embodiment the display covers the magnetic stripes to marry mechanical form factor with prior appearance. Thus, the device appears as pure pixel fabric, corner to corner on both sides. But the magnetic stripes are nonetheless, there, and utterly symmetric directionality.

The fingerprint passed can be taken from the card last known. The security system and the card can both report to their respective networks. The card can report to its dock when next docked. The two different data events (from the perspective of the card and from the perspective of the security lock) can record all these details for forensic analysis if ever needed. Security and transaction protection are hallmarks of card 100 and system 1: ecommerce with proof of identity per transaction (with recording of all data).

The Bar Code or Qr code, merely encrypts all of the coupons applicable to a user's purchase.

This represents two different loops. The "transaction," which is utterly secure, such as at a POS transaction, can be shared with other services, but only the minimum, mandatory necessary data and none of the encryption method, key, or images used. Logical complete closed loop in two directions. Two different loops.

In an embodiment, there are plural layers associated with essentially the whole of the face of the card and alternatively, on both sides of the card. Card 100 may have a way, in addition to cell-dock software as else shown, to create handshake routines etc.

LED (Surface mount)
CCD (Just below or offset from LED)
MAG OUT/IN (again, just below/under the CCD layer, and no need to offset from either CCD or LED, but, may act on tiny crystals with dopant causing the crystals to change opaqueness in presence of a magnetic field (e.g., see FIG. 4D, more complex array and FIGS. 7A to 8B).

In an embodiment, the light emitting portion of card 100 has an opportunity by way of its design. The light emitting portion can emit colors not in the human visual range. While the human eye cannot detect certain modulations, the light receiving/detection unit 126, 128 (e.g., CCD) on the other end can detect them with utter certainty. The patterns sent across allow for a highly complex handshake event, sync up, and encrypted logging. This can include, for example, colors not visible to the human eye and patterns which change as a function of time.

The magnetic-out and magnetic-in, could be formed as two layers in some embodiments. The same peizo or micro coil that sends magnetic data can also receive it, so we can salvage the dual functions from one layer. The density of magnetic "pixels" is not needed in concentration so much as it is for DISPLAY technology. Only enough magnetics in a given unit area to make a field of strength X (where X is a sufficient value to write to legacy readers), matters in terms of density and placement. The density only has to trick a stripe reader or existing magnetic reader into "seeing" the magnetic data pass by.

In an embodiment, some elements in the light emitting unit 122, 124 and/or light detection unit 126, 128 can be configured, for example, utilizing MEMS and NEMS technology, to move predictively or in a predetermined manner according to a voltage or field generated external or internal to the card, for example, according to a magnetic field generated. As such, light going out or in card 100 can be modified slightly by the magnetic field generated by card 100 or from an external source. The magnetic component can thus modulate the light signal. The light signal can also act as a carrier in the classic sense, carrying data at higher frequencies. Also, array elements of other the intermixed arrays present on card 100, for example, elements of an array of the magnetic-out unit 134, 135 can be similarly configured to move according to a voltage, current or field etc. from an applied source. Such modulators, for example, low frequency modulation of the light, can allow for a sophisticated way of performing a handshake negotiation.

The card may further use an embedded sound element and communicate with a jingle, get the POS operator to scan a user's coupons first (or codes present on physical or virtual coupons, such as barcode and Qr), then process the transaction.

Deals for goods or services can be based on user agreement to share market data (e.g., while preserving their personal sensitive data) or through purchasing and presenting a "groupon" (or any coupon requiring money up front in exchange for the coupon) just as a purchase is made to get the better deal overall, or card 100 can generate an alert that there is a better deal within X proximity for a specific product or service for a given user. Interfacing and transmitting this type of information to older legacy POS systems can be accomplished in a number of ways, for example, card 100 can present bar codes for scanning readable by legacy POS systems. Further, retrofitting legacy POS systems to accommodate card 100 is shown in figures identified elsewhere in this specification.

Alternatively, one may bypass a legacy POS system, generate an entry into the vendor database (store owner) and present an independent receipt that certifies the vendor has been paid, such that the items are now the user's property and the user can remove the items from the store premises. In this way, card 100 can operate as a portable POS system. Also, venues can stop investing in their own POS systems and use the system 1 described herein. The vendor needs only determine that the person trying to remove "X" from the store, paid for X by transaction "Y" (proof of purchase). In view of this, the ability to identify every object uniquely can improve the POS system and automate inventory maintenance function for venues and stores to every party's benefit. For example, system 1 and its server 200 could integrate to the venue's inventory management system to decrement for purchased items and increment for returns.

In an embodiment, card 100 can log a user into a public transportation system. For example, logging can be performed at any time before a next stop (e.g., using a wireless communication between card 100 and a transportation system reader). This provides the user more time and less grouping of people at transportation system bottlenecks, such as at a reader when entering the train station. Government, municipalities and businesses also want more security, and the biometrics of the card will provide this enhanced level of security. For example, these biometrics may be synchronized and sent with the wireless communications described herein.

In an embodiment, a door or lock (not shown) can include, or otherwise be associated with a display system using a configuration similar to card 100 (e.g., including intermixed array surface technology of card 100 generally depicted in FIGS. 3-5, 7A-7B and 8A-8B) such that it is compatible with card. In an embodiment, a user can provide card 100 in a holder such that it faces the display, does a handshake with the display system of door or lock along the lines of the previously described handshake, and determine that it knows the card using an identifier, such as card XXXYYYZZZ that is unique to a user. Next, the holder with card 100 has to pass the second security measure before allowing entry through the door or unlocking the lock. In the second measure, card 100 can pass a code, finger print, or other data including biometric data.

For the biometric data, card 100 can take or more biometrics as described herein, including two or more biometrics from a single target. For example, a finger print, a capillary map of the same finger etc. Additionally, biometric readings can be taken from a target object (e.g., finger, thumb) on or near the surface at any position on the surface, from different target objects (e.g., both a forefinger and a thumb) from both sides of card 100 when dual sided, and multiple biometrics for each object on each side. This type of multipart authentication/verification also can be used for any other application of a user card 100 described herein. Further, card 100 can be associated with controls for uses such that a biometric is associated with that use (that moment). In this way, a command issued by a user, the user's identity, or failure to issue a command can be tracked and the card locked when a predetermined condition is not met. For example, card 100 can generate a display: "TOUCH HERE WITHIN 5 SECONDS TO CONTINUE," and if the user does not, or the biometric does not match that associated with the card, the card locks and the last known biometric to touch or command the card is noted and stored.

In an embodiment, a door can have the same display technology as card 100 so placing the card in the holder, which can be an insert into a slot, if allowed to stop moving for say 1/10th of a second, the handshake and command passes with encryption. An embodiment can require plural cards 100 to gain access, such that the cards 100 are presented together in a holder (not shown), or, presented in a predetermined order. The card holder in the lock, door or other portal, container etc. in such an embodiment can hold two or more cards to allow the cards to pass data most efficiently. For higher security to gain access, one user can pass a card to a second, who puts the passed card in the holder and transfers personal info to the first and vice versa. The holder can be bypassed for small transfers, but for bigger ones it can result in higher speed (better alignment). Governments, institutions, business etc. may want card 100 to send some kind of indication for any data transfer between two people, to a master file which keeps track, with the promise is not to invade privacy, but to protect the citizens from anything nefarious, track bad people (criminal) etc.

Card 100 can come with alignment holes (not shown) and pegs or corner delimiters (not shown) which could be present on a cell phone or other device intended to dock with the card to dock two or more cards, face to face, where each card straddles the pegs (or is held between delimiters). This can allow for aligning pixels to thousandths of an inch of tolerance or greater. Perfect alignment (i.e., where a maximal amount of transmitting and receiving pixels are aligned) implies maximum data transfer rates. In an embodiment, alignment mechanisms can be presented as peripheral grooves (not shown) on the edges of card 100, which do not interfere with the function of the card and are too small to matter to human observers, for alignment needed between cards 100 and to assure pixel-to-pixel alignment is as near perfect as needed to provide a solid connection and handshake, and then permit data communications. Magnetic levitation between cards can be utilized to achieve highly sensitive alignment, as described herein.

For less formal data transfer between two users, an embodiment can include two users simply holding their cards 100 together face-to-face by hand or providing one card over another card placed on a surface, and then request for a short passage of data (e.g., by navigating a screen displayed on one or both of the facing cards). In the case of a small block, for example, no particular alignment is needed because a slower mode of communication is acceptable. For example, pixels can be combing to make a single transmitting beam from one card, which is received by a group pixels on the other surface. While this may be slower than a pixel to pixel data stream, it could be operated in a faster mode if the single pixels send modulated data by way of frequency (color) modulation, and the light receiving/detection device (e.g., CCD) can detect the frequency differential fast enough. In this manner each pixel connection across the gap compares to a single data stream. This "connection" could potentially be millions of times faster than a standard fiber optic connection, which this is emulating (per pixel). Also, each display inherently knows the distance to the other by parallax estimation. Additionally, when face-to-face, card(s) 100 can bidirectionally transfer data. As can be understood from the present disclosure, there are many benefits to a combined output and input pixel design from two bidirectional displays of comparable dimensions that contain both light emitters and light receivers placed in proximity to one another.

In an embodiment in which two cards 100 or a card 10 and other device including technology similar to the card have different sized major surfaces, data can spread across the entire surface of the smallest of the bidirectional displays, i.e., the larger display automatically down-sizes operation of pixels for communication or display to meet the smaller bidirectional display up to pixel-for-pixel in a better aligned situation, or a less number of pixels present in the overlapping areas, by self-sizing and auto-sizing the larger bidirectional display to the smaller bidirectional display as illustrated in FIG. 17c. As shown in FIG. 17c, card 100 is placed in an overlapping manner against a larger surface 100i including display technology similar to card 100. The transfer of data can use a maximum number of available communicative pixels based on the least common denominator of available communicative pixels, alignment etc.

Card-to-card data transfer, card-to-system, or network data transfer (and system or network to card data transfer) can take advantage of the optical and magnetic communications aspects of card 100, while also leveraging biometric aspects of the card. In a manner of speaking, card 100 acts as a portable memory with biometric verification at each stage of use, and provides a much more secure method of data transfer not found on legacy portable memories, for example, memory sticks.

In an embodiment, light emitting units 122, 124 and light detection units 126, 128 can use shared semiconductor circuitry for efficiency. For example, light emission and light collection could be performed by a single integrated junction. With this configuration, card 100 can pass data in both directions at the same time in the same action in a single pixel position. For example, two users may hold cards facing each other. Software can be written so that neither user nor card 100 gets a transfer acknowledge unless the "card-to-card" swap of data concludes successfully. Thus, transferring data, such as business info or personal info, becomes a simple process without the need for network connections to email or text, and is further enhanced in the manner described above to include emission and collection of data from the same pixel.

In an embodiment, a bidirectional emission and scan of OCR, bar code, Qr code or another readable format can facilitate simultaneous emission and detection between two card(s) 100 or other similarly equipped devices. The unique structure of the surface allows scanning and emitting light at the same time in the same area. For reading and writing, for a small amount of data, such as the items the user is buying and the credit card the user is going to use, this information can pass with the user's card 100 emitting a coherent beam of information, in one bandwidth of light, and the receiving POS system can pick up the beam on any group of pixels and gather in this small amount of data.

In an embodiment, the display on card 100 can be usable as a remote display for another device, such as a cell phone (or other device, such as an electronic tablet). For example, the display of the device and the display of card 100 can run in parallel, to show, for example, videos to friends with easier, better viewing angles or to have a second display that is independent, for info you may want to be able to see, such as while eating. The display of one or more cards can be combined to form one larger display. The card can be placed in a slot on a mobile device, while the mobile device lays flat. The card has its tether or a connection in the slot to the side of the card thus it may have 2 or even 3 displays (back side too). This allows multi person viewing for example at a table with guests. In an embodiment, card 100 can have remote control over any host device, to provide convenient operation of the device, such as if it were an iPhone and the iPhone incurs a damaged internal display.

The synthetic crystal used on watch crystals and how hard and scratch resistant they are, can be possibly modified for use here, as a final outer layer of card 100. Then, one could also apply simple peel off covers. A protective coating for card 100 can be peeled off to apply new ones, which stick well to the surface, so as not obstruct operation of any machine. In the core of card 100, electronic VVLSI can be provided, or deposited on mylar, similarly for durability. Other core components can include carbon fiber, silica and silica compounds, titanium and titanium alloy.

Card 100, with its unique biometric assurance and network juxtaposition (can sit between two networks, such as a public network and a point of sale system, which is network based but private and encrypted), can report certain data of the user's personal data to a unique engine forming a service to which he or she gladly subscribes. This service can tell other users, the best deals based on outcome. The user may be able to put together a personalized best deal, using some network available discounts and coupons, but also, other deals such as the user may creatively find. Therein, the data, forming a "best way to purchase" method used at point of sale, is broadcast, archived and made "searchable" only through this unique method.

A point in a network or PC where we want to let data pass. Normally, data cannot pass. The card docks and creates a bidirectional connection to complete the communications path. The dock for this is made of two displays, in parallel, programmed to ignore one another. When the card is inserted, each side of the card can negotiate a connection to its corresponding surface and then, if other conditions are met, data can flow through the card. The card can maintain a record of the data flow event and if we wish, the actual data which was allowed to flow. All events get unique identifiers assigned.

Later, when the card is eventually docked at its home base station, it can report all of its transactions with the unique identifiers. The server (and service), which monitors card event reporting, performs an audit. This is a very tight security card to card exchange translates to a social net connection.

The card can have its own wireless transmitter, receiver or transceiver and use it accordingly. It is also a device and runs dependently or independently as it is programmed. Cloud attached, but also, able to emulate the cloud. The card can be capable of mesh networking. The dock for the card could evolve into a transceiver and battery so the card may function as a server in order to perform mesh networking. Thus lower power is needed to pass data to other such devices, because there are simply so many out there: each recycles and boosts the communications of the next/other.

Stripes could just be internal, embedded underneath the display. Magnetic lines of flux passing through the display from behind need not bother the display at all. There will be no interference. LED and transistor junction technologies are not affected by magnetic flux. Also, because it is possible for the card to know when it is being swiped, it can conserve power by powering up the magnetic strips during swipe. Also, the magnetic energy could be boosted during swipe, because the card knows it is in motion by way of CCD data, so the one swipe usually works out, even in a weak reader.

The card may generate its power with a coil embedded as in the RFID key ring FOB (electronic), however, with the display in the card, it would take massive power in contrast to a coil approach which receives power when close to the flat bed that you scan to pass data from the fob to the receiver. The key FOB can get method could apply here, or spinning magnets concealed in proximity, which allow the power transmission in the wireless context. So that is probably a better solution, long term, to pass extra power to the card when close to the POS dock. The card may further boost a signal along the magnetic rail which will be communicating the data, as the card is swiped, for example by using a machine vision-type wide-ranging image processing capability which provides touch screen emulation as well as bar-code or biometric scanning can also be used to recognize or measure and to anticipate significant events for efficient power management.

The genome is used interchangeably as one would use their name, social security number, driver's license, other ids, or finger print or retinal scan. The parallel data transfer capability makes it possible to just use your whole genome. Part of the image transferred is your base genome; the rest will be what makes you unique among the base applied. Base genome image (1 of a million) and your differences (about 1 billion) will still take under 1 tenth of one second, if there are a 100 million pixels involved all working in parallel, sending serial data.

If magnetic stripe is whole surface, to coordinate the direction of magnetic-out data, the card needs to sense it is going into a stripe reader or ATM (automated teller machine) slot, which it can do with the CCD, to then set the data on the magnetic and its direction.

Logically, when swiping the card in one of the 4 possible directions, the direction can be preset and we need not detect the direction of swipe. However as an additional feature software may detect the swipe motion with the CCD and set the magnetic write to put out the data in the direction of the swipe.

The card is otherwise programmed but dormant, so as not to interfere with other cards or memory storage in proximity. The combination of CCD and LCD on the card allows the card to time when it is swiped, so as to cause electromagnetic elements in the stripe area to energize more strongly in sync with the swipe. This keeps EM noise down when the card is not being swiped. Another use of the combination of light receiving/detection (e.g. CCD) and light emission (e.g., LEDs) aspect of card 100 is to allow for a man machine interface to be built into card 100, e.g., touchless touch screen emulation with distance, trajectory, velocity detect capability as well as identification of unique objects. Card 100 also would be able to "see" when it is docked in its own docking station. It could "see" the user using the card to make a record of it. It could be used to scan a bar code, or display a bar code (Qr codes etc.). Many "apps" can be generated because card 100 would have these abilities. For example, one application is the development of a language for signing, which could be universal sign language, from which one could communicate with the card silently, with the hands or fingers. The language could also be proprietary. The more streamlined and efficient, the more transactional information the user can pass (instructions, inputs) to card 100.

Card 100 could have all address books inside, for procurements intended to be shipped to others. The user can pass the data reliably as to whom he or she wishes to ship the item to, or, multiple items, all-in-one procurement, but with each item going to a different destination. So, during POS, one swipe not only completes the procurement, the addresses for each item are passed and the venue mails them out (e.g., remote to AMAZON).

Another exemplary application is the office lunch, where people get together for a meal, each with their own cc arrangements and perks. At the end of the meal, all the cards go in a stack to split the meal evenly. The users need not carry cash to take advantage of this method. In order to be used with existing restaurant systems, the card designated the master may have, by agreement with credit card companies and possibly other intermediaries, the ability to represent itself after all the dividing has been accomplished, as the sole card to be used in the transaction. Then it simply goes in the restaurant wallet and gets run through the legacy POS. All cards will be charged thereby as agreed in the dock or with the financial entities in separate sessions. In the case where such a transaction might require biometric ID as described above to be used with the credit card, software might arrange to allow the biometric scan to be performed on cards separately prior to placing them in the stack.

The system would be (or could easily be engineered to be) very resistant to a huge solar flare causing any radiation, as well as electro Magnetic pulse and other anomalies such as dirty bomb. Embodiments of cords (tethers) are typically fiber, converting to copper internal to the cord. The elements of a network are all in the substrate so we shield the substrate and there is no vulnerable point other than the legacy equipment.

A card according to the present disclosure can also incorporate all material necessary to encompass net positive buoyancy so the card will float in water, reliably. Of note, in one preferred embodiment, the card has no physical ports anywhere on its surface, assuring water tight function and operation without degradation of metallic connector surfaces and without allowing any ingress opportunity for moisture or dirt.

Card 100 can further be able to shut the card down upon loss or biometric logging failure and go into a mode where the card can only be queried as to how to contact the true owner of the card, or, the card can provide minimal data, such as a low power, low resolution display to allow the individual who finds it to return it to its rightful owner using the US Mail or another carrier. The display might further operate by means of a motion-sensitive screen-saver or the like to maximize length of time the owner information is available. In an embodiment, card 100 can carry prepaid postage or some arrangement with USPS for this purpose.

In other exemplary embodiments, a network or website allowing users who have used or surplus items for sale can get together with people who need these items. If a convenient match is found, either because of proximity or because of convenient scheduling in common, a meeting may be arranged and secure transactions takes place at a public location. A "vending" user may wish to display merchandise using the display of card 100 and the cards may transact secure personal information positively identifying each party to the other. In the absence of any dock hardware or POS equipment, an embodiment of card 100 can supply the necessary support to conduct such a transaction optically. The same consumer who wants these restaurant and shoe deals can be the consumer who wants to sell things. A secure exchange of ID might further take place in similar manner because the same consumer might work as night watchman, hardware store employee, waiter etc. An employer in such businesses may agree to let the employee use his or her own smart card for such work purposes, thus providing an incentive for the employer to allow the employee to remain connected while working, an arrangement which may benefit both.

Card 100 can also encompass the incorporation of power distribution, battery, RFID, network adaptors, Wi-Fi, Bluetooth™, processing, memories, extreme angle LED and CCD pixels, and other magnetics intended for use as immobilizing means for stacking the cards in preparation for very high level, encrypted and hyper-secure data transfer. In the realm of VVLSI and flexible (flexure without harm to the circuitry) electronic surface production, these novelties will fit within the form factor and will improve as various improvements are incorporated into the VVLSI production techniques and equally, with improvements in miniaturization and manufacturing techniques used throughout the world. Therein, the inventor also anticipates possibilities such as incorporation of repeaters for networks, mesh networking and the device housing or comprising a server, rather than just being limited to a processor or a processing function.

Several dynamic issues surround the success of the services offered and the form factor of card 100. At the same time, more technology can be incorporated as the ability to increase pixel density on a supportive surface improves. The sensitivity of a read function will increase with time, improving the power consumption attributes of embodiments of card 100. Wireless mechanisms to communicate with the card and power it also will improve over time. It is the success of the "card" form factor, its minimum hardware features that differ from the prior art, its immediate cross compatibility with legacy POS systems and devices requiring magnetic swipe or read, and the services possible to deliver to the card, which sets the card and system disclosed herein apart and preserves their future. Because this card communicates bidirectionally and has a backing service, the transaction complexity can change, as described herein. As mentioned in this specification, the incorporation of like technology into all machines and networks, software and services to be used by a given user, allows the user's effort required to make themselves known and logged to the card, to be repeatable with less effort during the course of a given period of time, such as a day. Systems, software, services, transactions, networks, machines and vehicles, locks, other users etc. need to know the identity of the user requesting access or use. The card and system disclosed herein can radically change the dynamics involved in assuring that the user is identified with absolute certainty while providing dynamic advantages to the user, thus preserving precious commodities and protecting our planet from negligent waste.

The present disclosure taken with all that its teachings provides further direction to other embodiments not explicitly disclosed herein. Accordingly, the present disclosure is not intended to be limiting in any manner or form. With reference to FIGS. 7A to 8B in particular, the VVLSI and flexible construction techniques (i.e., able to be flexed without damage to any component or element) take into consideration all prior art on this subject. Accordingly, the layouts for the form factor, in a most preferred embodiment being a credit card sized form factor, become seemingly limitless. It is to be understood that any of the features and technology described herein in association with card 100 can migrate into other electronic devices to improve integrated command and control over those electronic devices. The more devices which utilize the card and system disclosed herein, the more the card can integrate to the like technology in a given device, improving security and trust.

Additionally, given the massive development of networks, services, electronic devices, personalization, protection of identity and ecommerce, as well as social networks, the card and system of this disclosure will be very well positioned to gain a massive following in a very short period of time. This drives the final benefit, centering upon the developer universe, which will seize upon any and all opportunity to further develop card 100 and system 1. This will take card 100 and system 1 to many places, however, the inventor feels in scope, breadth and complexity, the reader can now envision where the card and any subsequent use of the same technology in differing conformations (PAD, tablet, PC, laptop, TV, flat panel screen etc.) will lead. They keys remain, certainty as to who is using the card, certainty as to which card it is and which elements of the card were involved in a transaction, certainty as to the events which transpire, trust in the transaction process and payment methods and the belief that the user, above all else, is served in the best manner possible while conserving time, fuel and not causing detrimental harm to the environment. The card and system disclosed herein can provide a mechanism to access to needs of a user needs in a given day in an efficient and effective manner possible, while preserving the environment to the greatest extent possible.

The user device and system disclosed herein supplants the prior art with a new design, in part, because the design lends itself to the development of seemingly infinite applications for the user to enjoy, much like the evolution of the cell phone. Accordingly, this new design provides platform development opportunities, much like that which has been seen and experienced in the personal computing, portable computing and cellular telephone arena. The opportunity to foster the development of endless "apps" for card 100 and system 1 is made available through the specific and highly advanced hardware and network connection provided by card 100 and system 1. As will become apparent from the present disclosure, the user device and system according to the present disclosure also offers many different directions in which the concept can pioneer new methods of communicating with security and certainty, protecting the investment from obsolescence.

The user device and system disclosed herein take advantage of the full range of possibilities available with advancing technology, to create a credit card form factor-based usable smart system that substantially eliminates the need for the user to continue to carry at all times, a wide range of hard-copy items and portable devices. The portability of the card allows a user to perform a wide range of activities normally limited to non-portable devices, in connection with the user's mobile activities. For example, a user can carry, easily pocket, or otherwise secure a card according to the present disclosure while performing any of numerous physical activities (e.g., jogging/running/walking, biking, touring etc.), and thus have at the ready all the functionality of the card without having to carry more bulky and damage-prone devices.

Further, the user device and system disclosed herein use the concept of personalizing and automating the purchase process to include up-to-the-minute information that may be available on a network, such as the internet or cell network, to indicate special offers that may be available to the user, which may depend on the user's GPS-determined (or network determined) location with respect to a wide range of retail outlets including restaurants and grocers, who have a greater need to distribute their wares in real time, while they are still fresh and acceptable to their clientele, which in this instance, arrives to the user through card 100.

As some examples of real time retail venues who must find users in need in a critical and limited period of time, grocers carry fresh produce which may be discarded and represent a total loss, while restaurants have capacity and perishables which may also go to waste if the venue cannot book customers in sync with their capacity and consumables availability, again representing a total loss to the venue. These are only two venue classifications and examples, there will be countless others which may be venues, individuals, institutions, governments, who have critical need to eliminate waste and make their distribution of product and service, highly efficient to those users within reasonable time and may also require reasonable distance/proximity.

Thus, an aspect of this specification is that the card and system are not necessarily limited to any use or function disclosed herein because the development of a smart card, which presides between users and their social and ecommerce activities, as well as personal, business, job and securities related activities and computing activities (such as secure storage, secure access and remote activities) is something believed new and untapped.

Furthermore, since more and more online services are available to sellers as well as buyers, future use or function of a card according to this present disclosure and its applications, may well entail agreements between retailers, credit-card companies and users or groups of users, to make commerce and other activities flow more freely. Legacy cards and systems primarily focus on the form factor of the standard swipe card, to also provide mobile benefits and automation from within the card or sourced from a service and network supporting the card.

Further, the card and system disclosed herein can integrate the preemptive decision to buy, or the actual decision to buy, with all of the user's data, so as to automatically access the best possible deal(s) at point of sale, or preempting to ask through a network-based service for a better deal, per item to be purchased.

Basically, the card and system disclosed herein can evolve to incorporate and maintain compatibility with legacy systems of ecommerce based on bank cards, credit cards and the like, evolve into a POS system, or integrate with more preferred methods of POS integration and interface.

An embodiment of card 100 and system 1 can combine some or all of the user's available payment methods, all discounts, coupons and other perks that the user's supporting network service can provide, shopping methods the user can access from the history of other users who take advantage of the services supporting the card and system, allowing the user to take on massively complex payment methodologies acceptable to the seller, apply the best coupons and discounts (and other perks like double coupon, triple coupon, frequent flyer miles, rebates, free extended warranties or low cost extended warranties, free gift cards, gasoline or fuel purchase credits and so forth) transactions with a single action (e.g., swipe). A user could purchase 20 items, 20 different ways using 20 different payment methods and 60 different discounts and perks, with one action and with no wasted time. The user can benefit by being told what order to collect the items to be purchased, to save time and get through the venue in question as efficiently as possible. This suggests there can be professional shoppers who lead the way and record their steps, geographically, providing selection by selection specificity, to help other users (potential shoppers) not only save time, but also, save money and get the very best discounts. Accordingly, the service which supports a user device according to the present disclosure can automatically reward the professional shopper, who could work out schemes to save the most money by working hard locally on shopping "primers" and recording all the pertinent details to conditionally or unconditionally share with other users, which includes micro-instructions to the users on precisely where to go, what to do and then, how to check out to receive the maximum amount of discount while saving the maximum amount of time. Time is a very big element for all shoppers because time can have monetary or other value to the user, and also can translate to miles on the road (wasting fuel), which are at present very costly and taxing to the planet. For example, if shoppers were to become just 20% more efficient, money can be saved, energy conserved, pollution reduced, and user time increased at home or at work. The benefits in becoming more proficient in shopping and procurement patterns and payment methodology become significant when the maximum amount of automation is applied, as provided by a card and system according to the present disclosure.

Professional shoppers can keep all these elements in mind and develop, as well as share their schemes and primers, and be automatically rewarded for their leadership, through the system 1 and more so, through its supportive services and networks, reaching out to and touching the subscriber base. To further leverage the disclosed card 100 and system 1, communications between all users and professionals could be funneled through a social network, causing success stories to go viral and benefit even more individuals.

In an embodiment, applications developers can be granted access to user's data, to the depth the user allows, in return for more discounts, better overall deals, easier to use solutions to the user's requirements and so, unlike any other user device and system known to this inventor, the system disclosed herein can finally pay the user for the user's willingness to pass their demographic data to a service provider, acting through the services which support card 100. It is to be understood, however, that nothing herein is intended to limit the services to exclusively supporting the user through card 100.

More and more, the reader can see, there is clearly a need for a compact form-factor, reliable and secure consumer device with improved versatility and expanded functionality to host these applications. Card 100 can be considered as "one card that does it all." The extent of functionality of card 100, however, will correspond to services side of the equation, i.e., the services that can be delivered in a network connection to the card.

The present disclosure provides a user device having a card form factor and surface hardware features that take advantage of magnetic, optical and aural energy output and input, so the user device can interact with a wide variety of real world situations and the information found on a real or virtual object, or interact with information deliberately deposited on real world items. The disclosed processes are secure and complete so as to be highly specific when the software identifies and acts upon a user action, while the use of card 100 to conduct legacy type transactions (inspect, buy, return, share, post etc.) becomes increasingly less complex for the user. This expansion of methodologies allows each and every item with which the user interacts to become uniquely identified. Such unique identification can come through markings indicating the same, or, transactional "history" recorded during a live transaction event.

Embodiments of the card allow for development of tracking methodologies using unique identifiers embedded in card 100, representing the major components found on each side of the card and the card itself, to be combined with any unique identifier that can be associated with an object or line item in a transaction, or any unique identifier which can be associated with any other tangible or intangible item, including but not limited to a unit of currency, such that the use of said object, tangible item or intangible item is tracked and thus related to the user's specific transaction or action which first identified the unique identifier. As an example, a transaction involving any form of virtual currency could track the use of each unit of currency or unit groupings (a 1 unit, 2 unit, 5 unit, or 20 unit transaction being fundamentally equal to a us $1, $2, $5, or $20 note), wherein, a law enforcement agency could track the use of such units from transaction to transaction, with utter reliability. Another use is to track, for warranty purposes and fraud avoidance, the unique instance of an object by way of its unique identifier. In this disclosure, the term unique identifier means an identification method, such as a number, text, or even a unique image or sound, or combination thereof, which in being unique, and in being associated with an object, such as appearing on the object, or, appearing in a data base as a unique entry which can be solely related to the object in question, allows a processing system and thus also a user to identify a unique object with certainty. Any of these identifiers can be combined with the system's ability to track the history of an object, a tangible good, an intangible good, a unit of currency, or any other tangible or intangible object to which a unique identifier can be assigned to build upon the confidence of a system. The provenance of the item in question is established through the history development and unique identifiers, allowing for a forensic examination of the object's true history, providing trust and certainty to any user who will become involved in any manner with the object. This also builds a more universal trust for many users, trusting a system, such as a monetary system, to be assured there is no cheating, no counterfeiting without reasonable means to audit and control such public enemy actions as counterfeiting. The same can be said for any system, such as equities transactions, purchase of anything of value from small to big ticket, and any item which will require proof of ownership for any purpose, with great certainty. Clearly, a bar code or Qr code, which is limited in its capacity, can lead to a correlated entry in a data base, providing the user and the tracking systems, with more information than the code provided initially.

Exemplary embodiments provide for data synchronization of all devices a user owns and operates, through the card or the service supporting the card. In this manner, data sync, re-sync, restoration and conversation of data for all the devices the user operates, is made available through card 100 and the services supporting the card (or other iterations of the disclosed card and system, such as PC screen, cell phone screen, POS screen other device with the same technology, fully integrated).

Embodiments of card 100 according to the present disclosure incorporate new technologies for the emission, detection, recording and external writing to media. These technologies can enhance the developmental aspects of the system and include any form of positioning systems (such as GPS), networking including wireless, automatic display adjustment including orientation based on user preferences and orientation detection components, rumble generator that does not draw from power as much as current generating device necessary to give tactile or haptic feedback, a regional rumble generation on the surface that users will be more able to detect with their fingertip (e.g. blind users), or a braille generating mechanism providing a complete language interface based upon tactile and also synchronized vocal driven information (e.g., the peizo speaks and the braille system provides tactile characters such that the blind individual can read from the card with ease, presuming they are trained in braille). A tether attached to card 100 can convert data to sound, such as a card interface that generate a headset interface the card can detect and drive automatically, for example, for a blind individual, or, any individual who wants to have voice driven feedback from the card. Similarly, card 100 provides a two way voice driven pathway, in which a microphone can associated with the headset and two way voice, where the card converts voice to text.

In an exemplary embodiment, the system 1 and card 100 can store and relate information about the card owner, their immediate family, and/or others who may be with them on a given outing, to the available local facilities and goods available. In one example, the medical condition and infirmities, allergies and the like for a card user are known to the card and the system can continuously or intermittently track mapping and information to the closest resources relating to the medical condition, infirmity or allergy. Equally, the card can include a mechanism through which law enforcement, paramedics and other professionals may access this information to speed the diagnosis of a given individual who merely has their card on their person, but is incapacitated. This aspect of the disclosure will, without any doubt, save lives.

Embodiments of card 100 and system 1 make it possible for professional shoppers to forge ahead of the users and record their shopping steps, both geographically and transaction(ally), to allow other users to "follow in their footsteps" and gain the same benefits and rewards while saving the maximum amount of time and money. In so doing, the professional shopper could be rewarded for their participation through subscribership and direct payment associated with the services and network support of card 100.

Embodiments of card 100 and system 1 can organize a user's opportunities in commerce, which includes rain checks, items sought, discounts, coupons or rebates with time limits, any gift cards the user owns or, gift card associated discounts, so as to keep the user informed of these expirations. As a calendar is needed, this same system can keep track of reservations and cancellation of reservations for the user. A user may be queued for a reservation at a restaurant and card 100, as well as its supporting network and services, can alert the user if the reservation has been confirmed. Wait times to venues could also be displayed, which can take the form of wait time to arrive for a confirmed reservation or, wait time before a reservation can be either confirmed or denied by a user to a goods or services provider.

An embodiment of card 100 and system 1 can allow for a card user to associate his/her card with one or more cards of other card users, such as in a group membership relationship. For example, card 100 can allow for presenting data as is part of a social net, but not viewable by any participants within the social net, except on their card and only in the presence of the user, such as, during a face to face discussion. This "I will show you mine if you show me yours" concept allows users access to data that is not shared under any circumstance other than face-to-face or within some spatial range, and with the proper software function, not maintained in the receiving card as a permanent memory. Proximity related and conditional display of data is implied by this design feature.

Embodiments of card 100 and system 1 can include artificially intelligent (AI) software that programs the hardware of the card, as needed, just in time. In an exemplary embodiment, the magnetic layer of card 100 can be programmed to function as a magnetic stripe output in synchronization with the user's motion and intent. In this manner, card 100 can be swiped in a slot type reader in any logical position whatsoever, even with card 100 at an angle or using a corner of the card. The "AI" can adjust because the card provides essentially a light receiving/detection device across a whole surface, inbound light analysis, digital signal processing (DSP) and object identification and tracking) which can be image processed and from this inbound data, the software can process the imaging and anticipate the user's intended function of card 100, based on a given motion and the environment immediately surrounding the card, programming the necessary elements "just in time" and conserving energy in so doing.

An embodiment of a card and system of the present disclosure further leverage the presence of AI to shut the card down upon loss of the card or biometric logging failure and go into a mode where the card can only be queried as to how to contact the true owner of the card, or, the card can provide minimal data to allow the individual who finds it to return it to its rightful owner using the US Mail or another carrier. Card 100 can carry prepaid postage for this purpose. In an embodiment, while a card is shut down into a secure mode, may also allow a new finder of the card to hold the card up to their own, or to a display which is equipped as card 100 is equipped, which will contact the true owner of the card using such communications methods as a text, or tweet, email or other text type connection which then allows the new surrogate of the card to either meet up with the true owner, each providing identity information if they like (identities are guarded initially, as the card could just be dropped in the mail and arrive back to its true owner) or, providing proximity and timing data, manually, or automatically, so the two different users can locate one another. The card and system can include provision of automatic bounty for the finder of a lost card, charged to the user, to encourage all users to protect their cards from accidental loss and to increase chance of return if the card is lost. For minimal assist to the finder of a lost card, a bar code displayed on the card could associate with a data entry in a server, such that legacy devices can scan the code (bar or Qr) and still be provided with ability to contact the owner of the card without divulging identity of the user/owner who lost the card.

An embodiment of a card and system of the present disclosure can include a write function for the magnetic surface and/or the light emitting portion of the card surface to alter a magnetically sensitive or optically sensitive material outside of the card, respectively. Thereafter, the card is able to magnetically and optically read the altered surface reliably. An example would be to imprint a magnetic OCR or Qr code, or a proprietary code to a magnetically programmable surface. Another example would be to imprint a photo sensitive material using the light emitting portion of the card. The light emitting portion is intended to use light above, within and below the visible spectrum, as will the light receiving/detection (e.g., CCD) portion to detect light from above, within and below the visible spectrum. When the two writing techniques are combined, for writing to another card, or to a machine with the same technology equipped and integrated to the machine, or just a paper label or surface on an object, the object can be permanently or temporarily marked with both an optical image and a magnetic image, where the image is in actuality a set of recoverable (readable) data. The level of encryption can be left to the amount of "pixels" that can be printed and then recovered, either magnetically or optically. An erase function may either return the written data to original stasis, or if the target is not able to be returned to original stasis, the target could then be written over and altered enough to be illegible. This function has many uses, one of which is to pre-label items purchased inclusive of a unique identifier written on the item, where upon query by any third party, the user can present a bill of sale, purchase order, receipt, or any other needed document, proving ownership of the item in question. The writing function can deliberately overlap elements of the written construct, or write with no relationship between the magnetic imprint and the optical imprint. Both may be invisible to the naked eye. Since all the imprinting contains unique identifiers, the unique identifiers associated with the optical write, versus the different unique identifier assigned to the magnetic write, are retained in a data base, or shared with a remote data base, such that upon any new read of the written magnetic and optical data, the unique identifiers, once recovered, must match with the previously stored data. This can serve as a very unique and powerful method of managing items to be purchased, or inventoried, with reliability and trust. For surfaces, such as a box, housing new inventory (or used inventory) based on the dynamics of the material, space can be provided for multiple write and overwrite functions, if for example, the material cannot be returned to stasis and must be permanently marked out so as not to be recordable any longer.

The card and system of the present disclosure allow for development of the card hardware to take advantage of the two sides and their hardware design, so as to allow information on one side of the card to be immediately displayed or converted and displayed on the other. As such, any application from simple magnification of a target (e.g., an image taken by a CCD on one side of the card is displayed in magnified form on the other side), to conversion of bar code to useful information, translation of a language, conversion of a monetary figure, identification of the identity of a unit of money, such as a paper note or coin and its value (with conversion or other useful information) is made possible by the dual sided hardware of the card. In such areas as stamp, coin, rarity, jewelry and other small object with high value areas, the card could serve as an invaluable tool in identifying the object and immediately providing condition and value data, or, store the object you have scanned for future use or evaluation.

The card and system of the present disclosure allow, per terms of service (TOS) between a user and a main service provider, and per TOS of any agreement between the user and applications developers who are approved by the main service provider, to then allow different application developers to have different access to the user's data based on filters and limitations the user sets or is permitted to set based on the TOS. Additionally, the applications developers can be given controlled access to the display of the card and other elements of the card, and the data stored on the main service provider's servers. The main service which supports the card is going to typically have the least restricted or non-restricted access to the user's data. Sharing any information or data with any entity, however, must follow the law, the terms of service with applications developers and the user's (TOS) agreement. User's data is not limited to the card and its internal transactions, but extends to all services to which the user subscribes which can be accessed by the card. For example, this can mean at a minimum and without limitation, credit card, airline, bank, insurance, brokerage and other accounts, again, with limitations set by the user. As can be seen, applications developers can gain increased access to otherwise private user data because users would be more willing to agree to share their otherwise private data if they can see what they receive for that level of sharing.

The user device and system according to the present disclosure can allow massive expansion of what a transaction may be, such as, opening of an electronic lock, locking an electronic lock, starting a piece of machinery, shutting down a piece of machinery, checking the status and diagnosing a piece of machinery, accessing video or snap shot information about a subject, the meeting of a person and the exchange of identity data for later viewing, updating a social network as to a user's activities, editing and deleting a user's social network activities.

This disclosure recognizes the need for segmenting out social ecommerce as its own field of endeavor, focus on localized, regional and national (as well as international) aspects of commerce as it applies to card owners and develop applications which leverage this new industry. For purpose of this disclosure, although not limited to small ticket purchases, most social activities in a given period of time, such as a day, involve much procurement of small ticket items such as food, energy, fuel, transportation and groceries. Allowing users to gain access to better methods of accessing frequently needed tangible and intangible goods and services, will help the user save money and be more efficient with their time and more "green" with their consumption habits.

The card and system disclosed herein can foster the creation and expansion of the social network's ecommerce share experience, wherein, as patterns emerge which appear to be of interest to users who are present on a social net, the information is shared according to algorithms developed by developers with the positive feedback of users guiding the development.

An embodiment of the card and system allows by preference the suppression of all query of the user at moment of final checkout to protect the user's rights and preserve the user's time. Examples include no cash back, no donations, and no help needed versus, cash back, donations and help needed to load the user's items into their vehicle (or other help). In all these cases, the provision of preferences serves to pre-process these requests so the venue can better serve the user before and as they arrive at the final checkout station. Even such minor elements as having enough cash for the user can be covered by way of preprocessing and passing the data indicating that the user is now approaching checkout or is the next patron to be serviced. In this way, the teller is pre-emptively alerted so as to have enough cash, forms, rebate certificates, offers, someone to assist the user, any equipment needed to assist the user, just to name a few examples, all serving to make the shopping experience and venue's servicing efforts more efficient and thus, more enjoyable for employee of the venue and user, alike. Further automations allow for pre-processing or rapid automated real time processing at POS to include automated redemption of coupons, or automated purchase of applicable (purchasable) coupons with automatic application and just in time for the transaction, automated processing of rebates, requests for rain checks, extended warranties, automated selection of payment means per item, to capture maximum discount, perk, frequent flier miles or any other benefit. This also benefits all the other patrons at the venue and reduces the costs for the venue by keeping the line moving and the checkout process, wholly efficient. Everyone, i.e., all parties involved in a transaction, benefits.

It is to be understood that the disclosed concepts are not limited to a card, and that the disclosed design of the surface of the card can migrate to the surface of tablet, laptop and desktop computers, as well as any other computer based systems that may include control systems for vehicles, factories, military applications and other applicability. The novelty of a dual sided display, which is implied by the card design, changes how people interact with a computer and invites interaction from both sides of the display, used now as both an output and input device. This design should not be confused with touch screen technology as it incorporates a different method of detection for objects approaching the screen and although the design can emulate touch screens, the user need not touch the screen to select and use a virtual object, tool or other virtual control.

An embodiment of a card in accordance with the present disclosure can be made to be net sum positive buoyant, so the card will float if dropped in liquids, such as water. In providing a water proof conformation, the card can be taken reliably into difficult conditions while still reliably allowing the user to use it without hesitation or risk to their connected device or transaction. A user, for example, would refrain from taking their computer or cell phone in the rain, but embodiments of a water-proof card breaks from this convention.

Card 100 and system 1 provide a platform that, aside from its myriad of features and support from a digital network and the users of that network, provides demographic data for the owner of a given unique card to enjoy. Card 100 and its supportive platform represents a fertile opportunity for applications developers to focus on the hardware functions of the card to develop more and more applications through the software and the network-based functions the card can easily and readily access. The data from all users can be maintained as fully secure, while patterns users exhibit, which can be shared without affecting the security or identity of a particular user through automated redaction or secure processing, may benefit all users and may be incorporated into primers (schemes) and applications provided to the user with a high degree of automation for the user to enjoy. It must be remembered at all times, the high degree of automation provided through the services, networks and the hardware of the card, is considered to be a key set of factors which will relate to the user's acceptance, frequency of use, and enjoyment of the card.

The card and system of the present disclosure makes it possible for other hardware and software functions to migrate into the convenient form factor provided herein, with its capabilities and common presence before users provides a platform opportunity for further functions and integrations to the fullest extent the hardware and software can host. Examples range from remote control of PCs and data bases to wireless control over appliances in the home or office, emulation of a compass with positioning and mapping, proximity related search functions, hazard warning capability and more.

The card and system of present disclosure to cause further changes in such systems as POS systems, as the card makes its way into the market and forces change in these legacy embedded systems. For example, the POS can track when a user buys, or leaves any object which requires a return. The card could then alert the user when the return is warranted and provide guidance, such as when and how to travel to the venue to save the most time and fuel costs.

Card 100 and system 1 disclosed herein allows for incorporation of emerging technologies that serve to miniaturize the components of the card and increase density, such as a given CCD pixel density and/or LED pixel density, for example, to increase the memory storage capacity or processing power, to decrease the power consumption, to yield certain specific expectations for the evolution of the card. In one such critical evolutionary factor, the card can host pixel densities which are far beyond the norm because users will no longer be seeking better photos, better videos or service to high definition media players and devices. Rather, such a high density of pixels allows for better and better encryption methods and more secure transfers of data as all pixels need not be involved in a data transfer and many, if not all, could send Trojan signals to further enhance security. Only one aligned pixel is needed to transfer most data and in very short time (under one second). Card to card communications, or, card to a device equipped with a similar surface as to the card, will allow the use of these higher and higher densities of magnetic pixels, light emitting pixels and light collecting pixels, even aural pixels, to increase the complexity of handshake, encryption and data transfer between these devices.

Exemplary embodiments described herein provide an optical interface, pixels to pixels, e.g., LED to CCD, and vice versa, when cards 100 are brought into close proximity, or a card and another device likewise equipped with features disclosed herein. This interface provides a high degree of security from card-to-card or between a card and a POS, or other receptacle such as an ID card reader, or for restriction of personnel access to a secure facility or controlled entry to an event, such as a football game.

Card-to-card data transfer, or card-to-system or network data transfer (and system or network to card) can take advantage of the optical and magnetic communications aspects of the card, while also leveraging the biometric aspects of the card. In a manner of speaking, the card becomes a portable memory stick with biometric verification at each stage of use, and a much more secure method of data transfer not found on traditional memory sticks. Since card 100 can be held between thumb and forefinger as well as index finger, and scanning can be performed from all of the card's major surfaces, we can image biometric data from more than one object, for example, from three fingers and a somewhat oblique view of the fingers, which is a very difficult view to falsify in terms of biometric falsification or emulation. A retinal scan can be added, which requires the user to hold card 100 in the same manner, but up to their eye for a brief second to gain the retinal scan, thus incorporating three fingers and the eye features, and in going further, require a scan of the both of the user's eyes, representing a super-high level of biometric logging, used if and when needed. This can discourage even the most arcane method of biometric falsification, reducing any likely fraud attempt to the extortion of the user, for which we could incorporate silent communications methods for the user to take advantage of.

An embodiment of the card can incorporate all material necessary to encompass net positive buoyancy so the card will float in water, reliably. This can be done by assuring enough gas is trapped in the design of the card to offset its mass or weight, acting as a distributed swim bladder. In an embodiment, the card has no physical ports anywhere on its surface, assuring water tight function and operation without degradation of metallic connector surfaces and without allowing any ingress opportunity for moisture or dirt. As disclosed herein, embodiments can include ports that are accessed with optics or magnetics, and a magnetic layer is leveraged to use as an anchor for a magnetic-attach tether.

As to power delivery, disclosed card embodiments can used any of a number of sources. For example, aside from known RFID powering mechanisms, there is a known method pioneered by Intel in which movable inductors pass power to fixed inductors provided within the card. Of course, the card can also be equipped with its own battery as a battery "layer," for example, a thin film rechargeable lithium ion battery will still fit within the proposed form factor or any larger form factor. If the card is able to detect its surroundings happen to be liquid, such as beneath, as it is floating in a lake, it may emit a finder signal which is electronic, and a visible light signal, to the extent possible while preserving internal power. The light frequency emitted can be determined by an internal analysis of the ambient light, selecting light frequencies which are more able to be seen by humans. The card could also wait until night fall and use a frequency of light most likely to be seen by humans, such as in the yellow color spectrum. With a proximity beacon and light, the card can draw in a search team or individual searching so they may recover the card with ease. The proximity wireless electronic signal may be weak and limited in its range, but the light emission, being controlled, could be so band restricted that a searcher can use a device tuned to the frequency to "see" the card, even when human eyes cannot.

Card 100 can also encompass the incorporation of power distribution, battery, magnetics specific to the induction of wireless power, RFID, network adaptors, Wi-Fi, Bluetooth™, one or more processors, memories, extreme angle LED and CCD pixels, tactile or rumble elements and other magnetics. Additional magnetics which do not interfere with the cards functions are intended for use as immobilizing means for stacking the cards in preparation for very high level, encrypted and hyper-secure data transfer. In the realm of VVLSI and flexible (meaning flexure without harm to the circuitry) electronic surface production, these novelties will fit within the form factor and will improve as various improvements are incorporated into the VVLSI production techniques used throughout the world. Therein, the inventor also anticipates possibilities such as repeaters for networks, mesh networking and the device housing a server, rather than just a processor. Mesh networking brings forth the possibility of each card 100 or any dock that is present to support the card, passing regional groups of user's data from one card to the next, acting as repeaters, so as to reach a reliable source of network connection in a given venue. In this manner, although all data is continually maintained under encryption so as to segregate it and only allow a user to see his/her own data, the ability to extend the reach of a wireless network is enhanced through this incorporation of a mesh network architecture and distribution strategy.

In an embodiment, the card 100, server 200 and value analyzing unit 232 work together to enable aspects of social commerce and ecommerce. Social commerce includes the sharing and using of information between users to make venue-based (brick and mortar) commerce more efficient and less costly. Social ecommerce is the same as social commerce, applicable to virtual transactions or transactions conducted exclusively over a network by a user. In example, while professional and semi-professional commerce experts may make a living by developing or finding and connecting users to coupons, discounts, groupons, and other forms of remuneration, sharing with users of card 100, these same individuals can further develop schemes for obtaining the items related to the coupons etc., with the most efficient possible action, based on a given user's location. This may include providing maps not just to local venues, but within the local venue itself. As such, server 200 and value analyzing unit 232 can further develop intelligent algorithms allowing for a user to preemptively scan in all the coupons etc. they are interested in, so the server can develop a shopping plan for the user. The user can also scan in the actual items, or obtain bar codes to scan from a network, such as the internet. These can be scanned from a standard display by card 100. The user can then be instructed by card 100 how to obtain the items locally at the lowest possible cost in one trip, or, if several trips make the cost lower, that information can be provided to the user. This can include mapping instructions from one point to another and within the venue itself. When a user scans in a coupon etc. this can tell server 200 and value analyzing unit 232 this is an item of interest for the user. The system 1 can then continue to look for the best deal(s) that include all coupons etc., and the best way to pay for the transaction. Venues many times have policies which allow a user to redeem a coupon etc. after actual point of sale. Venues may also have policies which provide for price protection for a certain period of time, post point of sale. A venue may also make an agreement with the owner of system 1 and card 100, to provide these protections to the users of card 100 for better or longer periods of time. As such, for each item a user has scanned in a coupon (for) or has scanned in a venue and placed in their cart, according to the terms of the aforementioned policy, server 200 and value analyzing unit 232 will continue to seek more coupons etc. and methods of payment to the limit of the policy and agreement. Therein, if a user forgets to look for coupons etc. and the server 200 and value analyzing unit 232 continue to seek these coupons etc. for a period of time permitted by the policy and agreement of the venue, these coupons etc. may be redeemed automatically and applied as credits, post point of sale. When an actual sale occurs, all items involved in the sale trigger server 200 and value analyzing unit 232 to start the search for coupons etc. and payment means which can be post transaction applied to the sale to the limit of the given venue policy and agreement. If redeeming coupons etc. at point of sale and the point of sale system of a venue cannot accept the coupons etc. in one data upload, then the card may present each coupon etc. by way of bar or Qr code for scanning by the point of sale system. Interestingly, if the venue cannot accept the coupons etc. at actual moment of the sale, but the venue permits post transaction crediting, applying the coupons etc. and other payment means in a batch process, or a one by one process, since this is fully automated and requires no human intervention, it can all be done post point of sale. The idea is to streamline shopping, maximize benefit to users of card 100 and minimize work effort for the venue while also making the shopping experience better for other clients of the venue (those waiting in line behind the user in question here). Social commerce and ecommerce methods such as these, as applied to users of card 100 and other shoppers who do not have card 100, as well as the venue in question, will find viral support because everyone obtains a benefit and no one is losing anything in the process.

That which is claimed is:

1. A communication device, comprising:
a substrate having a first side and a second side; and
a multilayer stack positioned on the substrate, the multilayer stack including a plurality of pixel elements stacked in a direction perpendicular to the substrate, the plurality of pixel elements including at least one pixel element configured to provide an output in a direction away from the first side of the substrate, and at least one pixel element configured to receive an input passing entirely through at least one layer of the multilayer stack.

2. The communication device of claim 1, wherein the plurality of stacked pixel elements includes at least two pixel elements having an output in a direction away from the first side of the substrate or at least two pixel elements having an input, wherein the input to at least one of the two pixel elements having an input passes entirely through at least two layers of the multilayer stack.

3. The communication device of claim 1, further including a plurality of pinhole passages, each pinhole passage of the plurality of pinhole passages extending in a direction perpendicular to the substrate and through at least one layer of the multilayer stack to another layer of the multilayer stack.

4. The communication device of claim 3, wherein the plurality of pinhole passages is arrayed over substantially the entire first side.

5. The communication device of claim 3, wherein each pinhole passage of the plurality of pinhole passages includes an interior, and the interior is coated with a material that reduces the reflection of light.

6. The communication device of claim 3, wherein each pinhole passage of the plurality of pinhole passages is centrally located in the multilayer stack.

7. The communication device of claim 1, wherein multilayer stacks extend over substantially the entire first side.

8. The communication device of claim 7, wherein multilayer stacks extend over substantially the entire second side.

9. The communication device of claim 1, wherein the multilayer stack is a first multilayer stack positioned on the first side, and a second multilayer stack is positioned on the second side.

10. The communication device of claim 9, further including a plurality of pinhole passages, each pinhole passage extending through the first multilayer stack and through the substrate to a layer of the second multilayer stack positioned on the second side of the substrate.

11. The communication device of claim 1, wherein the multilayer stack includes a light emitting pixel element and a light detecting pixel element.

12. The communication device of claim 11, wherein the light emitting pixel element is configured to transmit light in a first direction, and the light detecting pixel element is configured to receive light from a second direction that is opposite the first direction.

13. The communication device of claim 11, wherein the light detecting pixel is positioned between the light emitting pixel and the substrate.

14. The communication device of claim 1, wherein the multilayer stack includes a light emitting layer and a light detecting layer.

15. The communication device of claim 14, wherein the light emitting layer is configured to transmit light in a first direction, and the light detecting layer is configured to receive light from the first direction.

16. The communication device of claim 14, wherein the light detecting layer is positioned between the light emitting layer and the substrate.

17. The communication device of claim 14, wherein the multilayer stack further includes a piezoelectric-out layer, a piezoelectric-in layer, a magnetic-in layer, and a magnetic-out layer.

18. The communication device of claim 1, wherein the multilayer stack is configured to include a magnetic-out layer.

19. The communication device of claim 18, wherein the magnetic-out layer is configured to acquire a magnetic pattern that represents magnetic data.

20. The communication device of claim 19, wherein the multilayer stack includes a light detecting pixel element, the communication device further includes a controller configured to receive input signals from the light detecting pixel element and to transmit control signals, the magnetic-out layer is configured to receive the control signals and to establish a magnetic pattern, the light detecting pixel element is configured to transmit the input signals to the controller indicative of a biometric feature, and the controller is configured to transmit control signals only when the input signals indicative of a biometric feature meets at least one predetermined condition.

21. The communication device of claim 1, wherein the multilayer stack includes at least one layer configured to receive a biometric input.

22. The communication device of claim 21, wherein the biometric input is at least one of a finger print, a gesture, a voice, and a face.

23. The communication device of claim 21, wherein the multilayer stack is configured to receive multibiometric inputs and to transmit data corresponding to the multibiometric inputs.

24. A communication device, comprising:
a substrate having a first side and a second side; and
a multilayer stack positioned on the substrate, the multilayer stack including a plurality of pixel elements stacked in a direction perpendicular to the substrate, the plurality of pixel elements including at least one pixel element configured to provide an output and at least one pixel element configured to receive an input; wherein
the multilayer stack is configured to include a magnetic-out layer, the magnetic-out layer being configured to acquire a magnetic pattern that represents magnetic data; and
the multilayer stack includes a light detecting pixel element, the communication device further includes a controller configured to receive input signals from the light detecting pixel element and to transmit control signals, the magnetic-out layer being configured to receive the control signals and to establish a magnetic pattern, the light detecting pixel element being configured to transmit the input signals to the controller indicative of a biometric feature, and the controller being configured to transmit control signals only when the input signals indicative of a biometric feature meets at least one predetermined condition.

25. A communication device, comprising:
a substrate having a first side and a second side;
a multilayer stack positioned on the substrate, the multilayer stack including a plurality of pixel elements stacked in a direction perpendicular to the substrate, the plurality of pixel elements including an outer surface, at least one pixel element configured to provide an output, and at least one pixel element configured to receive light as an input; and
a plurality of pinholes extending from the outer surface through at least one layer of the multilayer stack to terminate at the at least one light receiving pixel element, each pinhole of the plurality of pinholes configured to transmit light from the outer surface through the at least one output pixel element to the at least one light receiving pixel element.

* * * * *